US012783731B2

(12) United States Patent
Chen et al.

(10) Patent No.: US 12,783,731 B2
(45) Date of Patent: Nov. 3, 2026

(54) PRIVACY PROTECTION METHOD AND RELATED DEVICE

(71) Applicant: Huawei Technologies Co., Ltd., Shenzhen (CN)

(72) Inventors: Ying Chen, Beijing (CN); Yi Zhao, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 18/685,132

(22) PCT Filed: Aug. 4, 2023

(86) PCT No.: PCT/CN2023/111245
§ 371 (c)(1),
(2) Date: Feb. 20, 2024

(87) PCT Pub. No.: WO2024/037360
PCT Pub. Date: Feb. 22, 2024

(65) Prior Publication Data

US 2025/0139292 A1 May 1, 2025

(30) Foreign Application Priority Data

Aug. 16, 2022 (CN) ......................... 202210983312.3

(51) Int. Cl.
*G06F 21/62* (2013.01)
*G06F 3/0481* (2022.01)
*H04M 1/72445* (2021.01)

(52) U.S. Cl.
CPC ........ *G06F 21/6263* (2013.01); *G06F 3/0481* (2013.01); *H04M 1/72445* (2021.01)

(58) Field of Classification Search
CPC ............... G06F 21/6263; G06F 3/0481; G06F 3/04842; G06F 9/543; G06F 21/6245; G06F 21/84; G06F 2203/04803; G06F 16/958; G06F 3/0482; G06F 21/60; G06F 21/62; G06F 21/604; H04M 1/72445
See application file for complete search history.

(56) References Cited

U.S. PATENT DOCUMENTS

2008/0256601 A1* 10/2008 Dutta .................. G06F 21/6209 726/3
2018/0335998 A1 11/2018 Callaghan

FOREIGN PATENT DOCUMENTS

CN 111782424 A 10/2020
CN 112637185 A 4/2021
CN 112698966 A 4/2021

* cited by examiner

*Primary Examiner* — Lesa M Kennedy
(74) *Attorney, Agent, or Firm* — Slater Matsil, LLP

(57) ABSTRACT

A currently existing HTML and JS are extended, so that a server may generate information about a web page based on an extended HTML and an extended JS script. In addition, an electronic device may support the extended HTML and the extended JS script, so that the electronic device can support a user in performing read/write permission setting, content detection setting, content life cycle management, and the like on a clipboard.

20 Claims, 37 Drawing Sheets

PRIVACY PROTECTION METHOD AND RELATED DEVICE

CROSS-REFERENCE TO RELATED APPLICATIONS

This application is a National Stage of International Application No. PCT/CN2023/111245, filed on Aug. 4, 2023, which claims priority to Chinese Patent Application No. 202210983312.3 filed on Aug. 16, 2022. Both of the aforementioned applications are hereby incorporated by reference in their entireties.

TECHNICAL FIELD

Embodiments of this application relate to the field of terminal technologies, and in particular, to a privacy protection method and a related device.

BACKGROUND

With rapid development of terminal technologies and network technologies, web page accessing gradually becomes an important way to obtain information in people's life.

Currently, when a user accesses a web page by using an electronic device (for example, a mobile phone), some web pages may insert a large amount of information (for example, promotion information and personal sensitive information of the user) into a clipboard of the electronic device without the user's knowledge. This invisibly infringes personal privacy of the user. If some web pages forcibly store personal sensitive information (for example, information such as a card number, a certificate number, and a mobile phone number) of the user to the clipboard, the information may be leaked when the user accesses another web page or application (Application, APP). This brings many troubles and risks to the user, and user experience is poor.

SUMMARY

Embodiments of this application provide a privacy protection method and a related device, to effectively protect user privacy, avoid a risk of privacy leakage, and improve user experience of web page access.

According to a first aspect, an embodiment of this application provides a privacy protection method, applied to an electronic device, where the method includes: The electronic device detects an operation of accessing a first web page by a user; the electronic device obtains first setting information for the first web page, and displays the first web page, where the first setting information indicates that the first web page is granted read permission and/or write permission on a clipboard; and the electronic device processes content on the clipboard based on the first setting information.

The method according to the first aspect is implemented, so that when the user accesses a web page, the electronic device may obtain permission setting information of a clipboard that is granted to the web page, and determine, based on the permission setting information, whether the web page can read content on the clipboard and/or write content into the clipboard. In this way, privacy of the user can be effectively protected, a risk of privacy leakage can be avoided, and user experience can be improved.

In a possible implementation, that the electronic device processes content on the clipboard based on the first setting information specifically includes: If the first setting information indicates that the first web page is granted the read permission on the clipboard, the electronic device allows the first web page to read the content on the clipboard; and/or if the first setting information indicates that the first web page is granted the write permission on the clipboard, the electronic device allows the first web page to write first content into the clipboard.

In this way, the user may control whether the web page can read the content on the clipboard or write the content into the clipboard, to avoid that some web pages arbitrarily read the content on the clipboard and lead to the leakage of user information, or write the content into the clipboard and carry on malicious promotion and other behavior, so as to improve a user privacy protection effect. Therefore, a problem that the web page reads the content on the clipboard or writes the content into the clipboard without the user's consent and without the user's control is resolved.

In a possible implementation, after the electronic device processes the content on the clipboard based on the first setting information, the method further includes: The electronic device obtains second setting information for the first web page, where the second setting information indicates whether the electronic device clears the content on the clipboard after detecting an operation of closing the first web page by the user; and when the electronic device detects the operation of closing the first web page by the user, the electronic device processes the content on the clipboard based on the second setting information.

In this way, when closing the web page, the user may control whether the content on the clipboard is cleared, so that the content on the clipboard is prevented from being leaked to another web page/application, and a risk of information leakage is reduced.

In a possible implementation, that the electronic device processes the content on the clipboard based on the second setting information specifically includes: If the second setting information indicates the electronic device to clear the content on the clipboard after the operation of closing the first web page by the user is detected, the electronic device cancels displaying the first web page and clears the content on the clipboard when detecting the operation of closing the first web page by the user; or if the second setting information indicates the electronic device to clear the first content written into the clipboard by the first web page after the operation of closing the first web page by the user is detected, the electronic device cancels displaying the first web page and clears the first content when detecting the operation of closing the first web page by the user.

In this way, when closing the web page, the user may control whether the content on the clipboard or the content written by the first web page into the clipboard is cleared, so that the content on the clipboard or the content written by the first web page into the clipboard is prevented from being leaked to another web page/application, and a risk of information leakage is reduced.

In a possible implementation, the first web page is any web page or a specific web page.

In this way, the user may perform related setting of the clipboard for web pages (namely, any web page) on all websites, or may perform related setting of the clipboard for a web page (namely, a specific web page) on a single website, so that flexibility is strong and user experience is improved.

In a possible implementation, that the electronic device obtains first setting information about the first web page specifically includes: The electronic device displays a first setting interface, where the first setting interface is used by the user to set whether to grant the read permission and/or write permission on the clipboard to the first web page; and the electronic device detects a first operation performed by the user on the first setting interface, and the electronic device stores the first setting information.

In this way, the user may actively set the permission on the clipboard. After the setting is completed, the electronic device may store the setting information, so that a problem that the web page reads the content on the clipboard or writes the content into the clipboard without the user's consent and without the user's control is resolved.

In a possible implementation, that the electronic device obtains first setting information about the first web page specifically includes: When the first web page accesses the clipboard, the electronic device displays a first window, where the first window includes first prompt information, and the first prompt information prompts the user whether to agree to grant the write permission on the clipboard to the first web page; and if the electronic device determines that the user agrees to grant the write permission on the clipboard to the first web page, the electronic device stores the first setting information, where the first setting information indicates that the first web page is granted the write permission on the clipboard.

In this way, when the first web page attempts to access the clipboard (for example, when the first web page attempts to write content into the clipboard), the electronic device may display a pop-up window to prompt the user whether to agree to grant the write permission on the clipboard to the first web page, and the first web page is allowed to write the content into the clipboard only when the user agrees. This resolves a problem that the web page writes the content into the clipboard without the user's consent and without the user's control.

In a possible implementation, that the electronic device obtains second setting information for the first web page specifically includes: The electronic device displays a second setting interface, where the second setting interface is used by the user to set whether to clear the content on the clipboard after the first web page is closed; and the electronic device detects a second operation performed by the user on the second setting interface, and the electronic device stores the second setting information.

In this way, the user may actively perform life cycle policy setting on the clipboard. After the setting is completed, the electronic device may store the setting information, so that the content on the clipboard or the content written by the first web page into the clipboard is prevented from being leaked to another web page/application, and a risk of information leakage is reduced.

In a possible implementation, that the electronic device obtains second setting information about the first web page specifically includes: When the electronic device detects the operation of closing the first web page by the user, the electronic device displays a second window, where the second window includes second prompt information, and the second prompt information prompts the user whether to agree to clear the content on the clipboard or the first content after the electronic device detects the operation of closing the first web page by the user; and if the electronic device determines that the user agrees to clear the content on the clipboard or the first content after the electronic device detects the operation of closing the first web page by the user, the electronic device stores the second setting information.

In this way, when the user closes the web page, the electronic device may display a pop-up window to prompt the user whether to agree to clear the content on the clipboard or the content written by the first web page into the clipboard after the electronic device detects the operation of closing the first web page by the user. When the user agrees, the electronic device may clear the content on the clipboard or the content written by the first web page into the clipboard, so that the content on the clipboard or the content written by the first web page into the clipboard can be prevented from being leaked to another web page/application, and a risk of information leakage is reduced.

In a possible implementation, if the first setting information indicates that the first web page is granted the write permission on the clipboard, that the electronic device allows the first web page to write first content into the clipboard specifically includes: The electronic device detects whether the first content includes information of a first type, where the first type includes one or more of the following types: malicious, illegal, privacy, and promotion; and if it is determined that the first content does not include the information of the first type, the electronic device allows the first web page to write the first content into the clipboard; or if it is determined that the first content includes the information of the first type, the electronic device displays a third window, where the third window includes third prompt information, the third prompt information prompts the user whether to allow the first web page to write the first content into the clipboard, and if the electronic device determines that the user allows the first web page to write the first content into the clipboard, the electronic device allows the first web page to write the first content into the clipboard.

In this way, when the web page attempts to write the content into the clipboard, the electronic device may detect whether the content that attempts to be written into the clipboard includes illegal, malicious, promotion, or privacy information. If the content includes such information, the electronic device may prompt the user that there is abnormal behavior on the web page and whether to continue writing the content into the clipboard. If the user agrees, the content is allowed to be written into the clipboard. If the user rejects, the content is not allowed to be written into the clipboard. In this way, after the write permission on the clipboard is obtained, content may be detected to better protect user privacy, avoid serious consequences, and ensure normal browsing experience of the user.

In a possible implementation, the electronic device stores third setting information and fourth setting information. The third setting information indicates that the electronic device detects, by using a first detection tool, whether the first content includes the information of the first type, where the first detection tool is provided by the electronic device or provided by a third party. The fourth setting information indicates that the electronic device displays the third window when determining that the first content includes the information of the first type.

In a possible implementation, the electronic device detects whether the first content includes the information of the first type, and the method further includes: The electronic device displays a third setting interface, where the third setting interface is used by the user to set the first detection tool and set whether the electronic device displays the third window when determining that the first content includes the information of the first type; and the electronic device detects a third operation performed by the user on the third setting interface, and the electronic device stores the third setting information and the fourth setting information.

In this way, the user may actively set a detection tool used by the electronic device to perform content detection, and may actively set whether the electronic device displays the third window when determining that the first content includes the information of the first type.

In a possible implementation, before the electronic device displays the first web page, the method further includes: The electronic device sends a first request to a server, where the first request indicates the server to send information about the first web page to the electronic device; and the electronic device receives the information that is about the first web page and that is sent by the server, where the information about the first web page includes a first JavaScript script. The first JavaScript script includes an application programming interface API, and the API is used by the electronic device to read the first setting information or the second setting information.

In this way, the electronic device may read the setting information for the clipboard based on the API in the extended JS script.

In a possible implementation, the first web page is a web page in a browser application, or the first web page is a web page displayed by a browser-like application.

According to a second aspect, an embodiment of this application provides an electronic device. The electronic device includes one or more processors and one or more memories. The one or more memories are coupled to the one or more processors. The one or more memories are configured to store computer program code, where the computer program code includes computer instructions. When the one or more processors execute the computer instructions, the electronic device is enabled to perform the method according to any one of the possible implementations of the first aspect.

According to a third aspect, an embodiment of this application provides a computer storage medium. The computer storage medium stores a computer program, where the computer program includes program instructions. When the program instructions are run on an electronic device, the electronic device is enabled to perform the method according to any one of the possible implementations of the first aspect.

According to a fourth aspect, an embodiment of this application provides a computer program product. When the computer program product runs on a computer, the computer is enabled to perform the method according to any one of the possible implementations of the first aspect.

DETAILED DESCRIPTION OF ILLUSTRATIVE EMBODIMENTS

Figure 1:
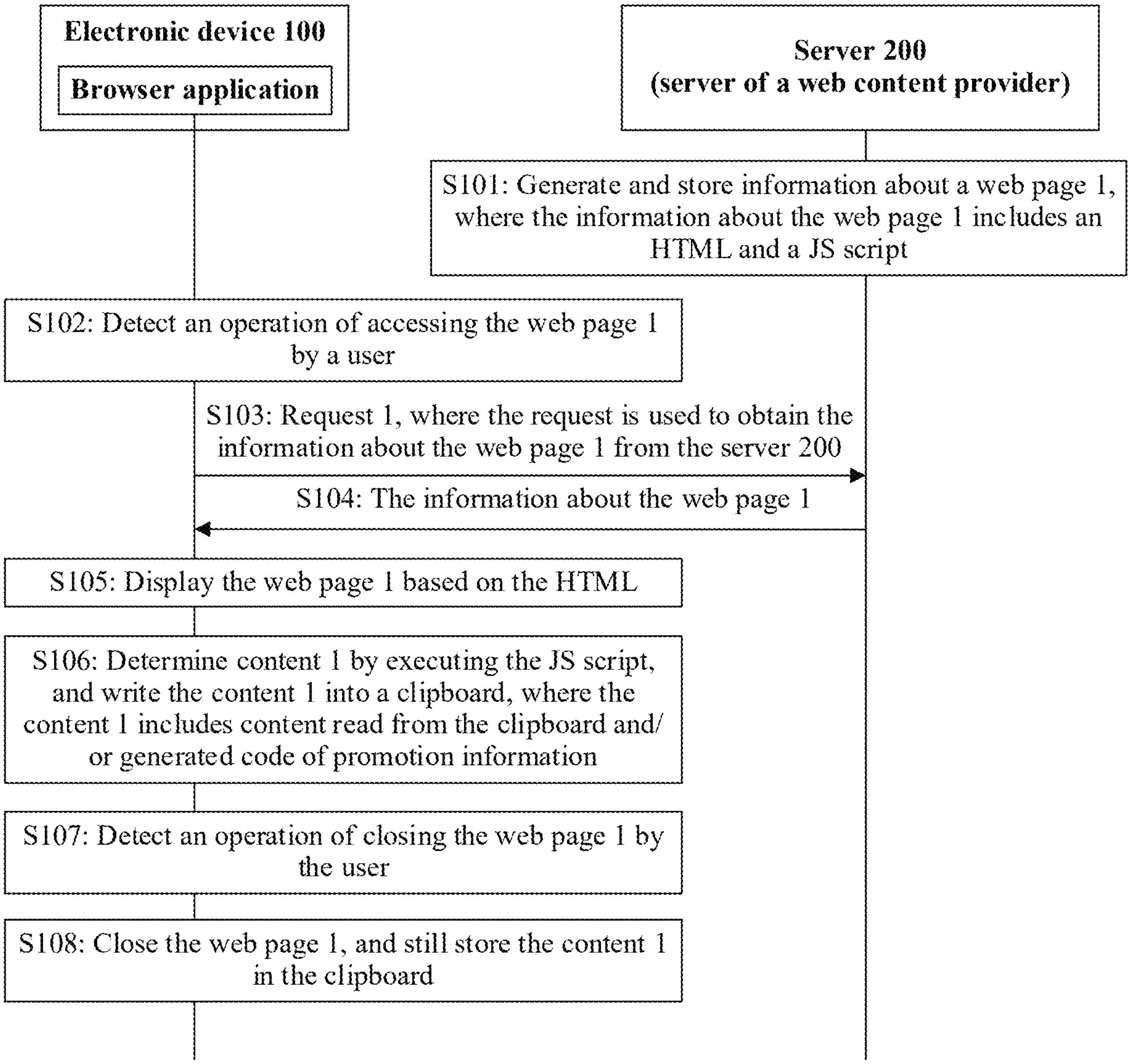
FIG. 1 is a schematic flowchart of accessing a web page and inserting information into a clipboard by an electronic device according to an embodiment of this application.

The following clearly and completely describes the technical solutions in embodiments of this application with reference to the accompanying drawings in embodiments of this application. In the descriptions of embodiments of this application, unless otherwise specified, "/" indicates "or". For example, A/B may indicate A or B. The term "and/or" in this specification merely describes an association relationship between associated objects, and indicates that three relationships may exist. For example, A and/or B may indicate the following three cases: Only A exists, both A and B exist, and only B exists. In addition, in the descriptions of embodiments of this application, "a plurality of" means two or more.

It should be understood that terms "first", "second", and the like in the specification, the claims, and the accompanying drawings of this application are intended to distinguish between different objects, but are not intended to describe a specific order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes unlisted steps or units, or optionally further includes other inherent steps or units of the process, the method, the product, or the device.

An "embodiment" mentioned in this application means that a particular feature, structure, or characteristic described with reference to this embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in this application may be combined with another embodiment.

A term "user interface (user interface, UI)" in the following embodiments of this application is a medium interface for interaction and information exchange between an application program or an operating system and a user, and implements conversion between an internal form of information and a form that can be accepted by the user. The user interface is source code written in a specific computer language such as Java or an extensible markup language (extensible markup language, XML). Interface source code is parsed and rendered on an electronic device, and is finally presented as content that can be identified by the user. The user interface is usually represented in a form of a graphical user interface (graphical user interface, GUI), and is a user interface that is related to a computer operation and that is displayed in a graphic manner. The user interface may be a visual interface element such as a text, an icon, a button, a menu, a tab, a text box, a dialog box, a status bar, a navigation bar, or a Widget that is displayed on a display screen of the electronic device.

With rapid development of terminal technologies and network technologies, web page browsing gradually becomes an important way to obtain information in people's life.

Currently, when a user accesses a web page by using an electronic device (for example, a mobile phone), some web pages may insert a large amount of information (for example, promotion information and personal sensitive information of the user) into a clipboard of the electronic device without the user's knowledge. In this case, the user does not know this, but if the user opens an input method or view the clipboard, the user may find the unknown information, such as "^quCYkpfnQq^exxxxxxx". The user may use a specific tool to transcode and restore the information. Consequently, it can be found that the information is a type of promotion information. If some web pages forcibly store personal sensitive information (for example, information such as a card number, a certificate number, and a mobile phone number) of the user to the clipboard, the information may be leaked when the user accesses another web page or application (Application, APP). In this way, personal privacy of the user is invisibly infringed, many troubles and risks are brought to the user, and user experience is poor.

FIG. 1 is an example of a specific process in which an electronic device accesses a web page and inserts information into a clipboard according to an embodiment of this application.

As shown in FIG. 1, an electronic device 100 may be an electronic device (for example, a mobile phone) used by a user to access a web page, and a server 200 may be a server of a web page provider. For example, the user accesses a web page by using a browser application, and the browser application may be installed on the electronic device 100. The following describes in detail specific steps included in the process.

S101: The server 200 generates and stores information about a web page 1, where the information about the web page 1 includes an HTML and a JS script.

Specifically, the web page provider may generate and store information about one or more web pages by using the server 200. The information about the one or more web pages may include the information about the web page 1, and the information about the web page 1 may include the HTML and the JS script.

The HTML (Hypertext Markup Language, hypertext markup language) is an identification language, and may include a series of tags. Document formats on a network can be unified by using the tags, so that scattered Internet resources are connected as a logical whole. An HTML text can be a descriptive text including HTML commands and the HTML commands can illustrate words, graphics, animations, sounds, tables, links, and the like. With the HTML, information to be expressed can be written into HTML files according to a specific rule, and identified by an application (for example, a browser application), and the HTML files can be "translated" into recognizable information, namely, a web page seen by the user.

The JS (JavaScript) is a high-level and interpreted programming language. The JS is a prototype-based, first-class function-based language, is a multi-paradigm language, and supports object-oriented programming, imperative programming, and functional programming. The JS can provide syntax to manipulate a text, an array, a date, a regular expression, and the like.

In this embodiment of this application, the HTML may be used to describe content on a displayed web page. The JS script may be used to read related information on a clipboard, generate code of some information (for example, promotion information) required by the web page provider, and write the related information read from the clipboard and the generated code of some information required by the web page provider into the clipboard.

S102 to S104: The browser application of the electronic device 100 detects an operation of accessing the web page 1 by the user. In response to the operation, the browser application of the electronic device 100 may send a request 1 to the server 200, where the request is used to obtain the information about the web page 1 from the server 200. After receiving the request 1, the server 200 may send the information about the web page 1 to the browser application of the electronic device 100.

Figure 2A:
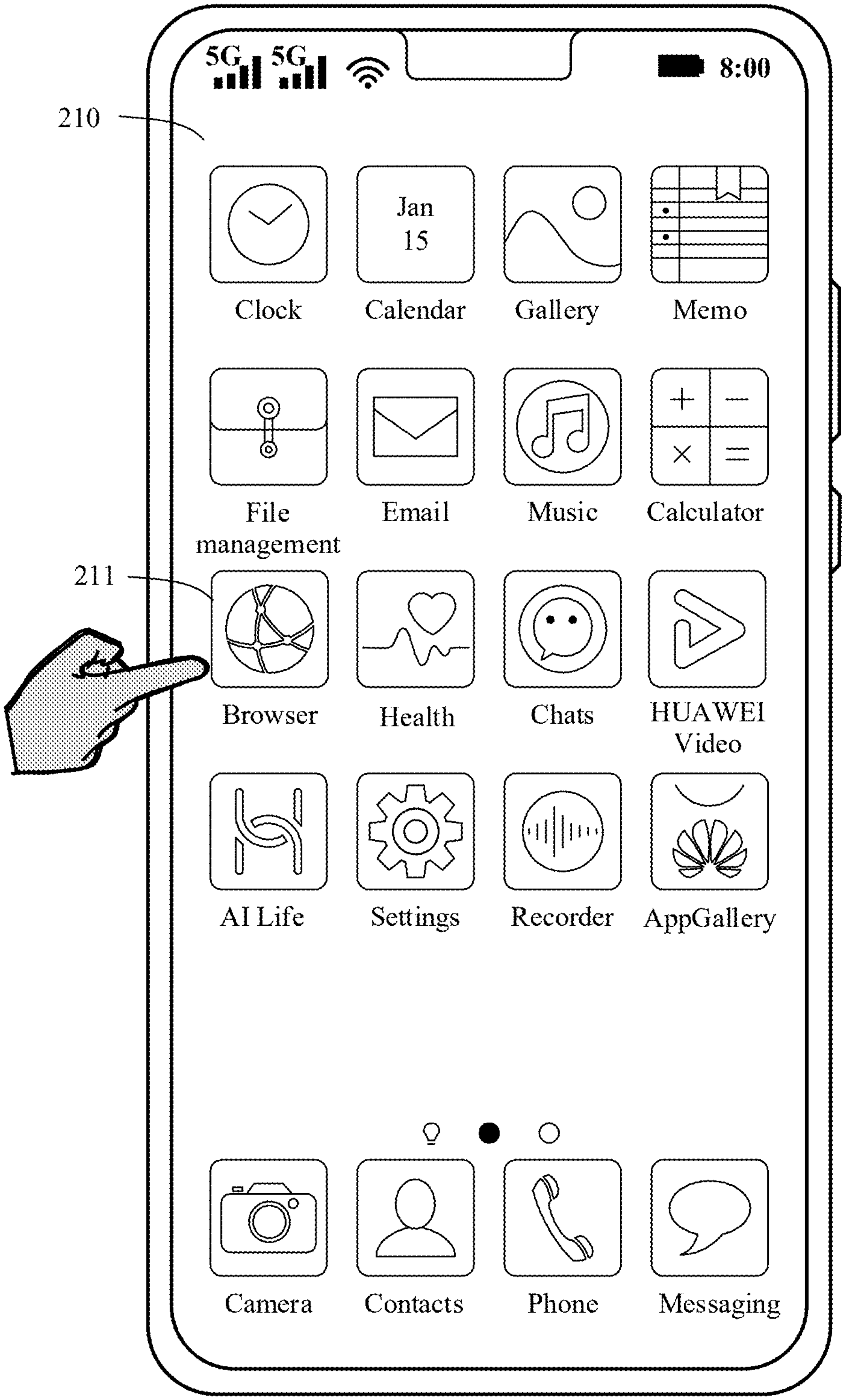
FIG. 2A to FIG. 2D are schematic diagrams of a group of user interfaces in a process in which a user accesses a web page according to an embodiment of this application.

For example, as shown in FIG. 2A, a user interface 210 shown in FIG. 2A may be a user interface provided by a desktop application of the electronic device 100. The user interface may include icons of one or more applications (for example, an icon 211 of the browser application). The electronic device 100 may detect an operation (for example, a tap operation) performed by the user on the icon 211 of the browser application. In response to the operation, the electronic device 100 may open the browser application, and display a user interface 220 shown as an example in FIG. 2B.

Figure 2B:
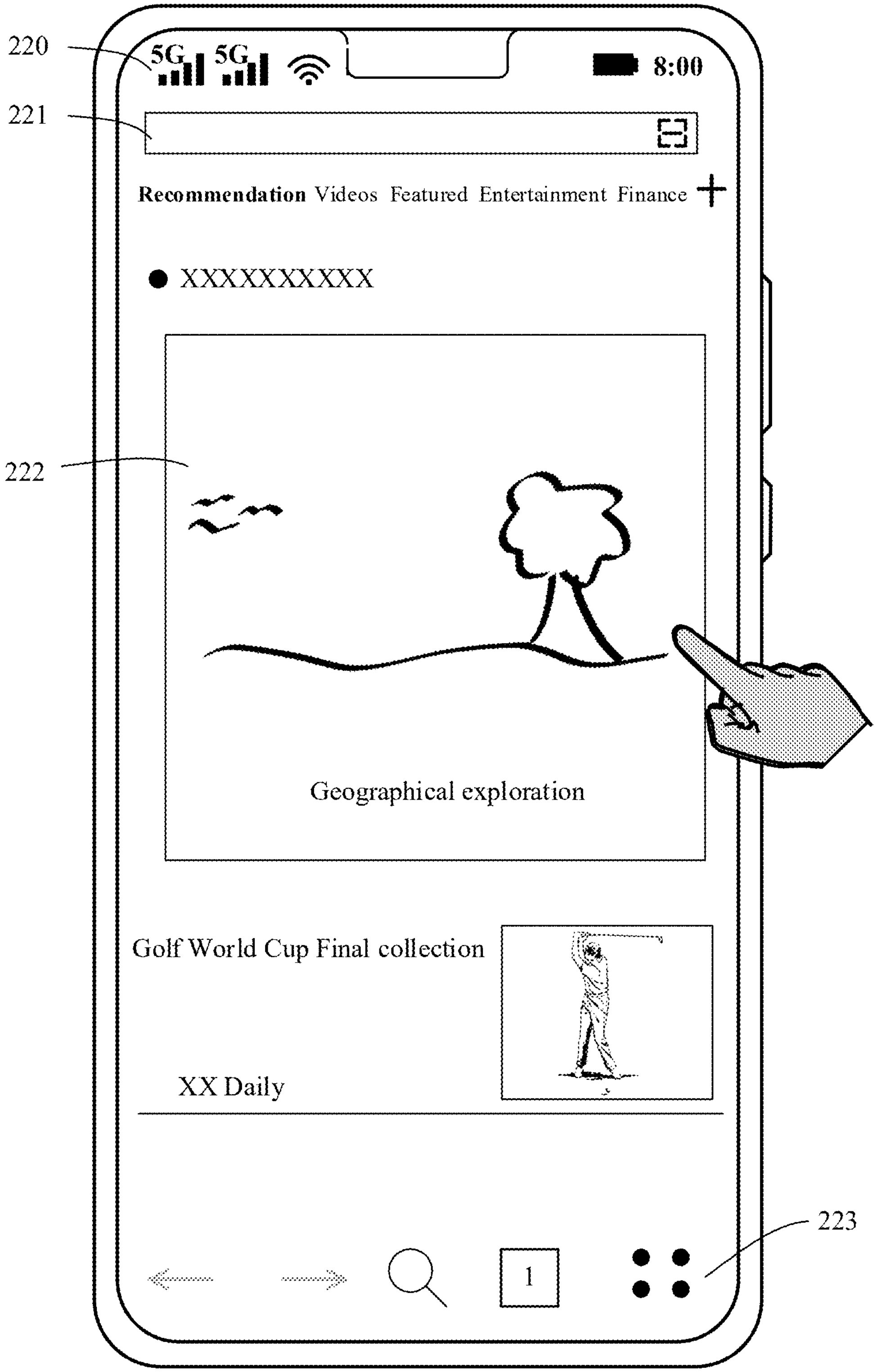

As shown in FIG. 2B, the user interface 220 shown in FIG. 2B may be a user interface provided by the browser application of the electronic device 100. The user interface may include options corresponding to one or more web pages (for example, an option 222 corresponding to a "geographical exploration" web page). The options corresponding to the one or more web pages may be used by the user to open a corresponding web page to view specific content on the web page.

Still as shown in FIG. 2B, the user interface 220 may further include a search box 221. The search box 221 may be used by the user to enter a website address corresponding to a web page, so that the electronic device 100 may open the corresponding web page based on the website address, and the user can view content on the web page.

Still as shown in FIG. 2B, the user interface 220 may further include an option 223. The option 223 may be used by the user to use more functions of the browser application, perform more setting on the browser application, and the like.

For example, the web page 1 is the "geographical exploration" web page. Still as shown in FIG. 2B, the browser application of the electronic device 100 may detect an operation (for example, an operation of tapping the option 222 corresponding to the "geographical exploration" web page by the user, or an operation of entering a website address corresponding to the "geographical exploration" web page in the search box 221 by the user) of accessing the web page 1 by the user. In response to the operation, the browser application of the electronic device 100 may send the request 1 to the server 200, where the request may be used to obtain the information about the web page 1 from the server 200. After receiving the request 1, the server 200 may send the information about the web page 1 to the browser application of the electronic device 100. The information about the web page 1 may include an HTML and a JS script.

S105: The browser application of the electronic device 100 displays the web page 1 based on the HTML.

Specifically, after the browser application of the electronic device 100 obtains the information about the web page 1 from the server 200 (that is, download the information about the web page 1 locally), the browser application of the electronic device 100 may parse the information about the web page 1, render content on the web page 1 based on the HTML included in the information about the web page 1, and display the web page 1.

Figure 2C:
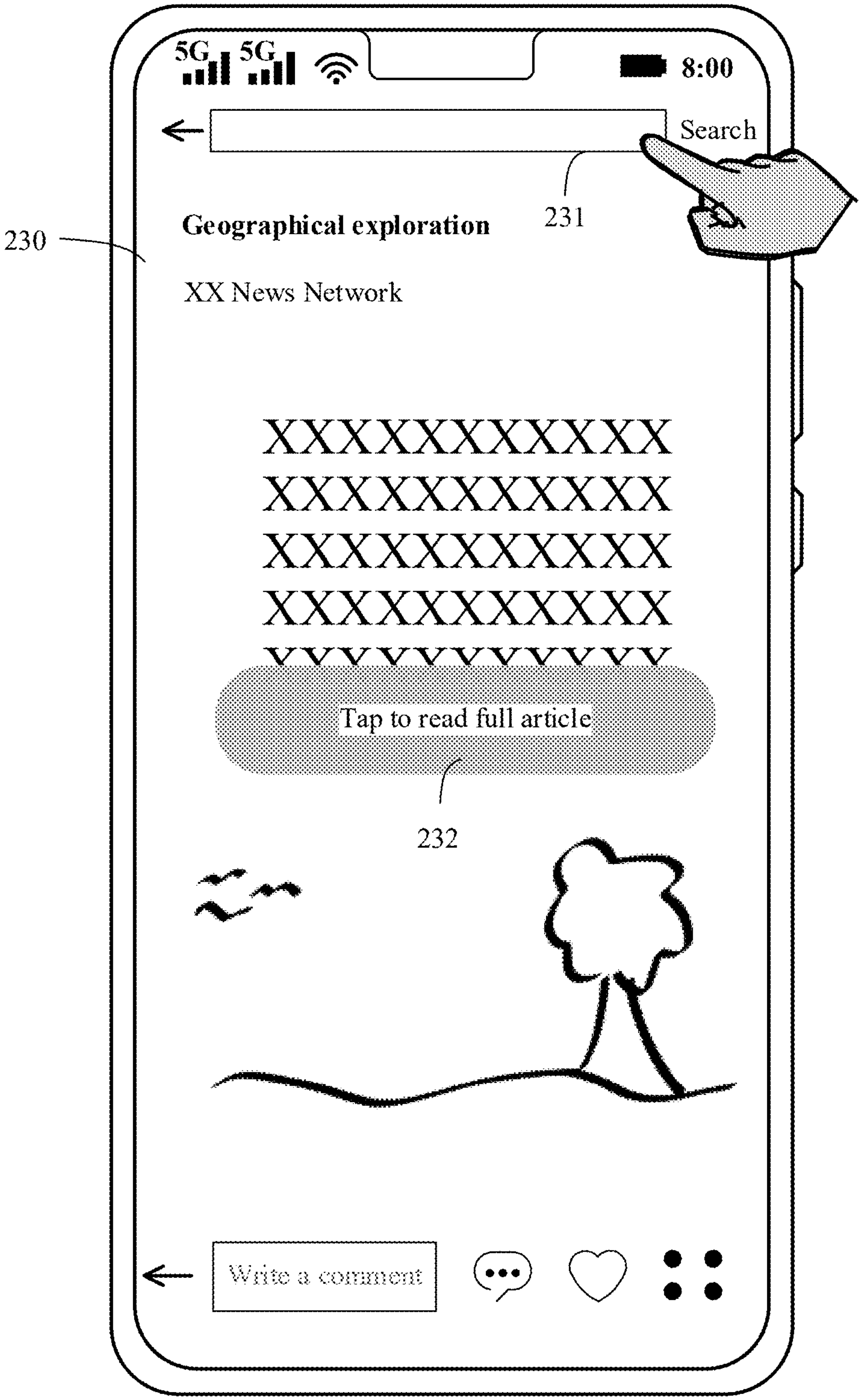

For example, as shown in FIG. 2C, a user interface 230 shown in FIG. 2C may be a user interface used by the electronic device 100 to display the web page 1, and the user interface may include the content on the web page 1.

Still as shown in FIG. 2C, the user interface 230 may further include a search box 231. The search box 231 may be used by the user to enter a website address or a keyword, so that the electronic device 100 may open a corresponding web page based on the website address or the keyword.

Still as shown in FIG. 2C, the user interface 230 may further include an option 232, and the option 232 may be used by the user to view the full-text content on the web page 1.

S106: The browser application of the electronic device 100 determines content 1 by executing the JS script, and writes the content 1 into the clipboard, where the content 1 includes content read from the clipboard and/or generated code of the promotion information.

Specifically, after the browser application of the electronic device 100 obtains the information about the web page 1 from the server 200 (that is, download the information about the web page 1 locally), the browser application of the electronic device 100 may parse the information about the web page 1. If the information about the web page 1 includes the JS script, the browser application of the electronic device 100 may determine the content 1 by executing the JS script, where the content 1 may include the content read from the clipboard and/or the generated code of the promotion information. In other words, the browser application of the electronic device 100 may execute the JS script, to read the content on the clipboard, and/or generate the code of some information (for example, promotion information) required by the web page provider.

Further, the browser application of the electronic device 100 may further write the content 1 into the clipboard.

In some examples, the content 1 may further include some malicious/illegal information.

It should be noted that "writing the content 1 into the clipboard" in step S106 may be automatically executed, or may be triggered by the user. For example, the browser application of the electronic device 100 may automatically execute the step after obtaining the information about the web page 1 from the server 200. For another example, the step may be executed after the user performs an operation (for example, a tap operation) on the option 232 shown in FIG. 2C. This is not limited in embodiments of this application.

For example, a possible implementation in which the user checks whether the content 1 is written into the clipboard may include but is not limited to the following two implementations.

Implementation 1:

As shown in FIG. 2C, the browser application of the electronic device 100 may detect an operation (for example, a tap operation) performed by the user on the search box 231. In response to the operation, the electronic device 100 may display a soft keyboard 240 shown as an example in FIG. 2D.

Figure 2D:
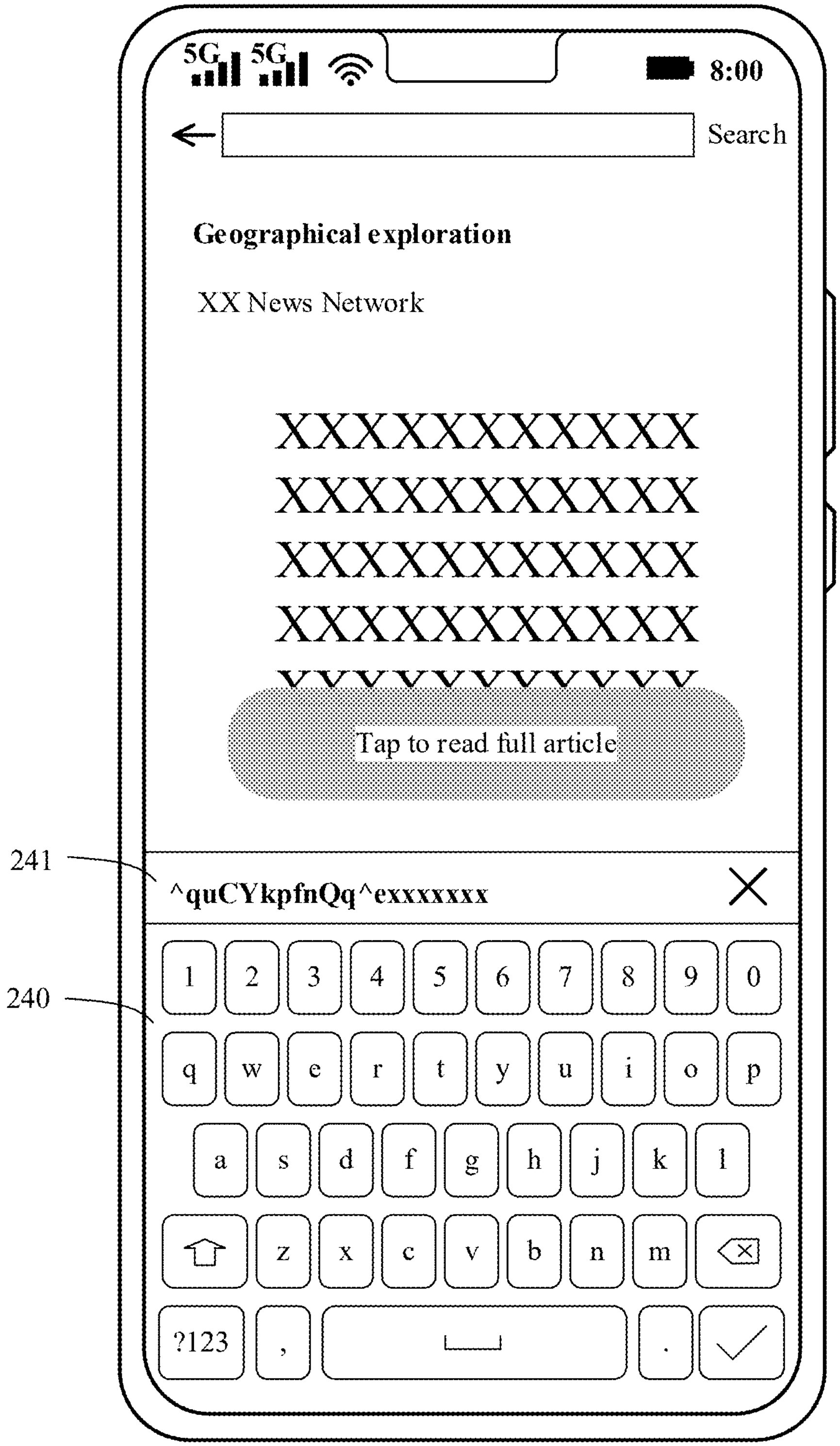

As shown in FIG. 2D, it can be learned that a piece of text information 241 (for example, ^quCYkpfnQq^exxxxxxx) is displayed on the soft keyboard 240.

It is assumed that the user does not actively perform an operation of copying the text information 241 in advance, where the text information 241 is the content 1 automatically written into the clipboard by the browser application of the electronic device 100.

Figure 3A:
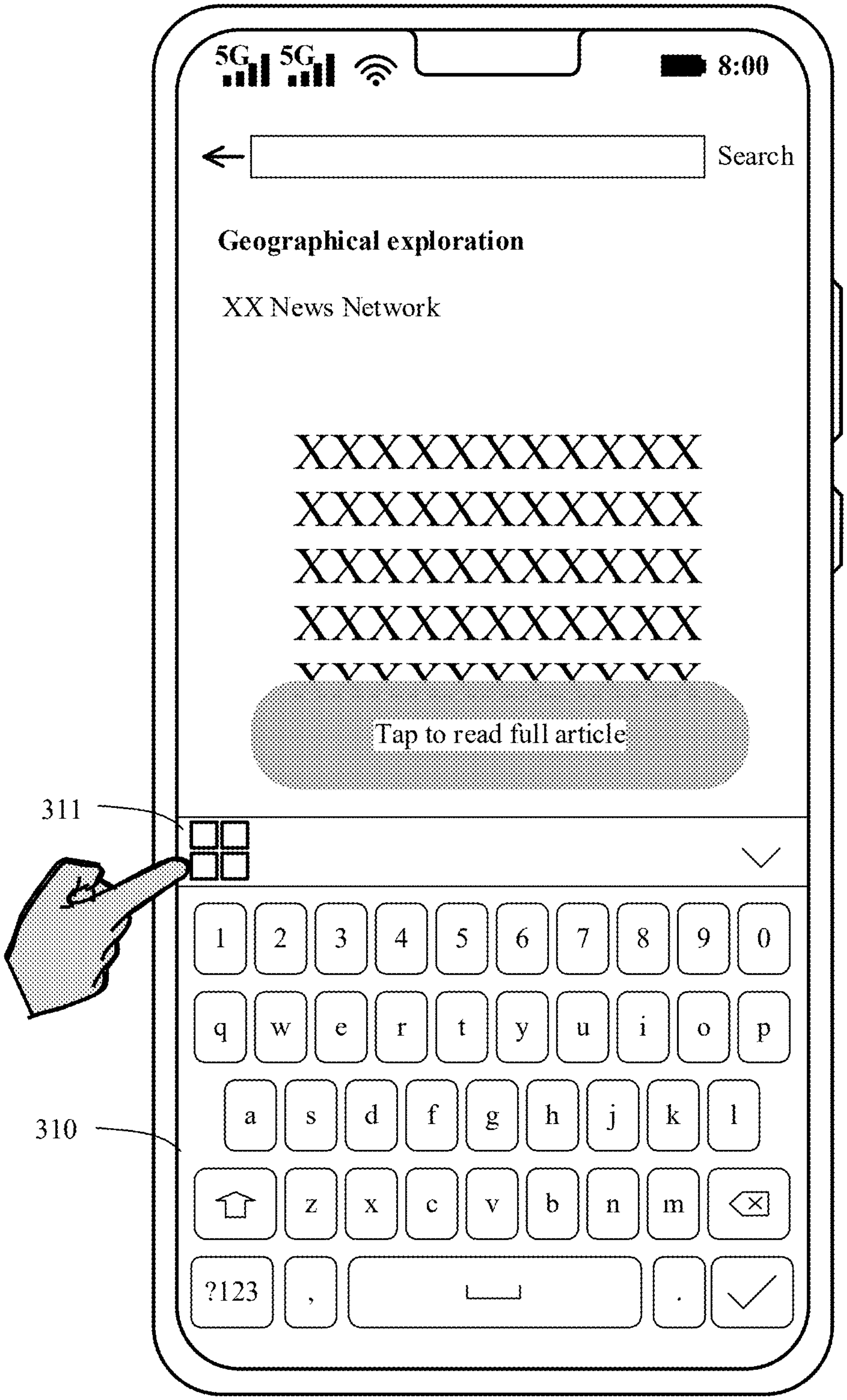
FIG. 3A to FIG. 3F are schematic diagrams of a group of user interfaces in a process in which a user views and operates a clipboard according to an embodiment of this application.

Implementation 2:

As shown in FIG. 3A, an option 311 may be displayed on a soft keyboard 310 shown in FIG. 3A. The electronic device 100 may detect an operation (for example, a tap operation) performed by the user on the option 311. In response to the operation, the electronic device 100 may display a window 320 shown as an example in FIG. 3B, where the window may include one or more options (for example, an option 321).

Figure 3B:
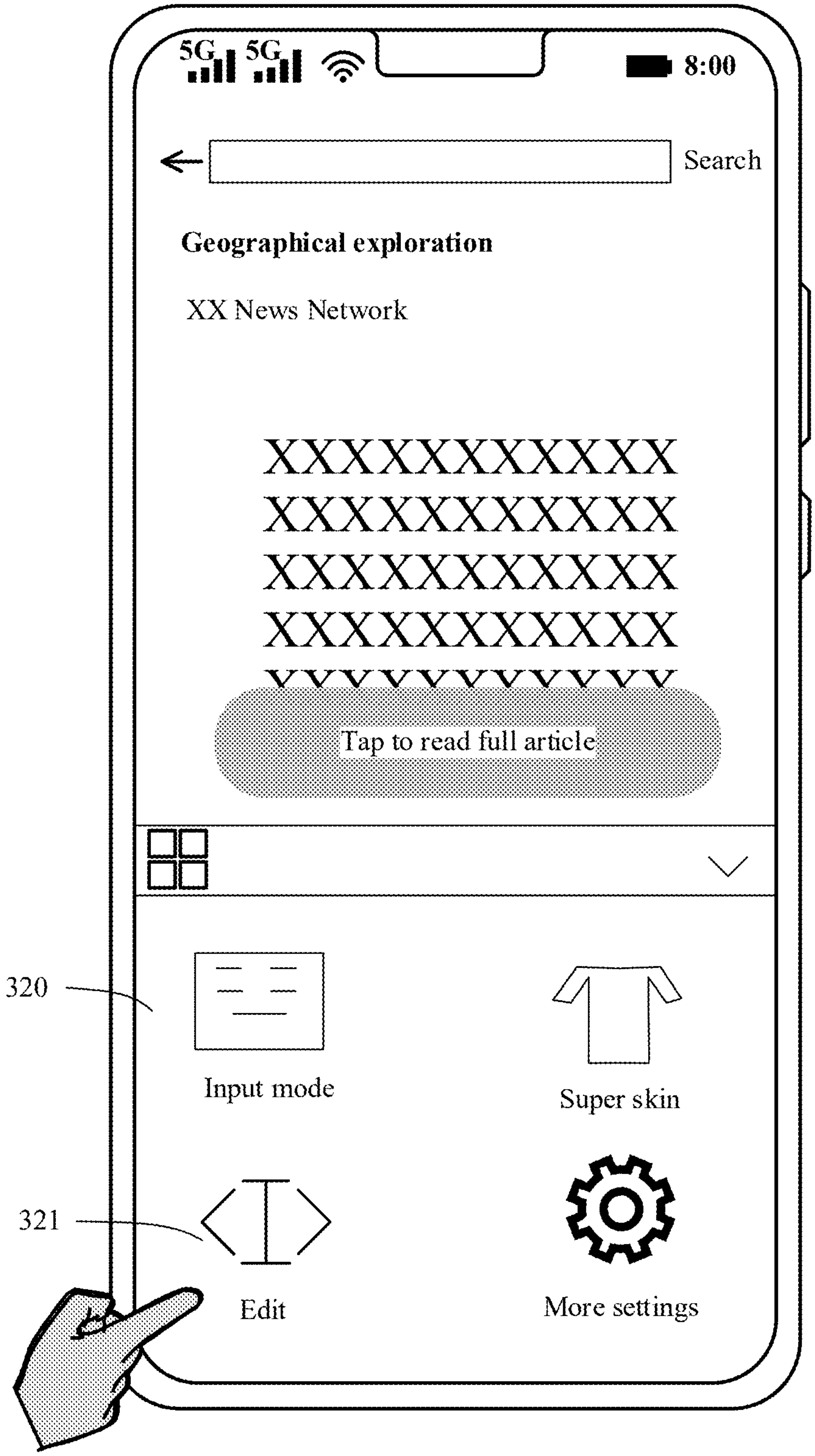

As shown in FIG. 3B, the electronic device 100 may detect an operation (for example, a tap operation) performed by the user on the option 321. In response to the operation, the electronic device 100 may display a window 330 shown as an example in FIG. 3C, where the window may also include one or more options (for example, an option 331).

Figure 3C:
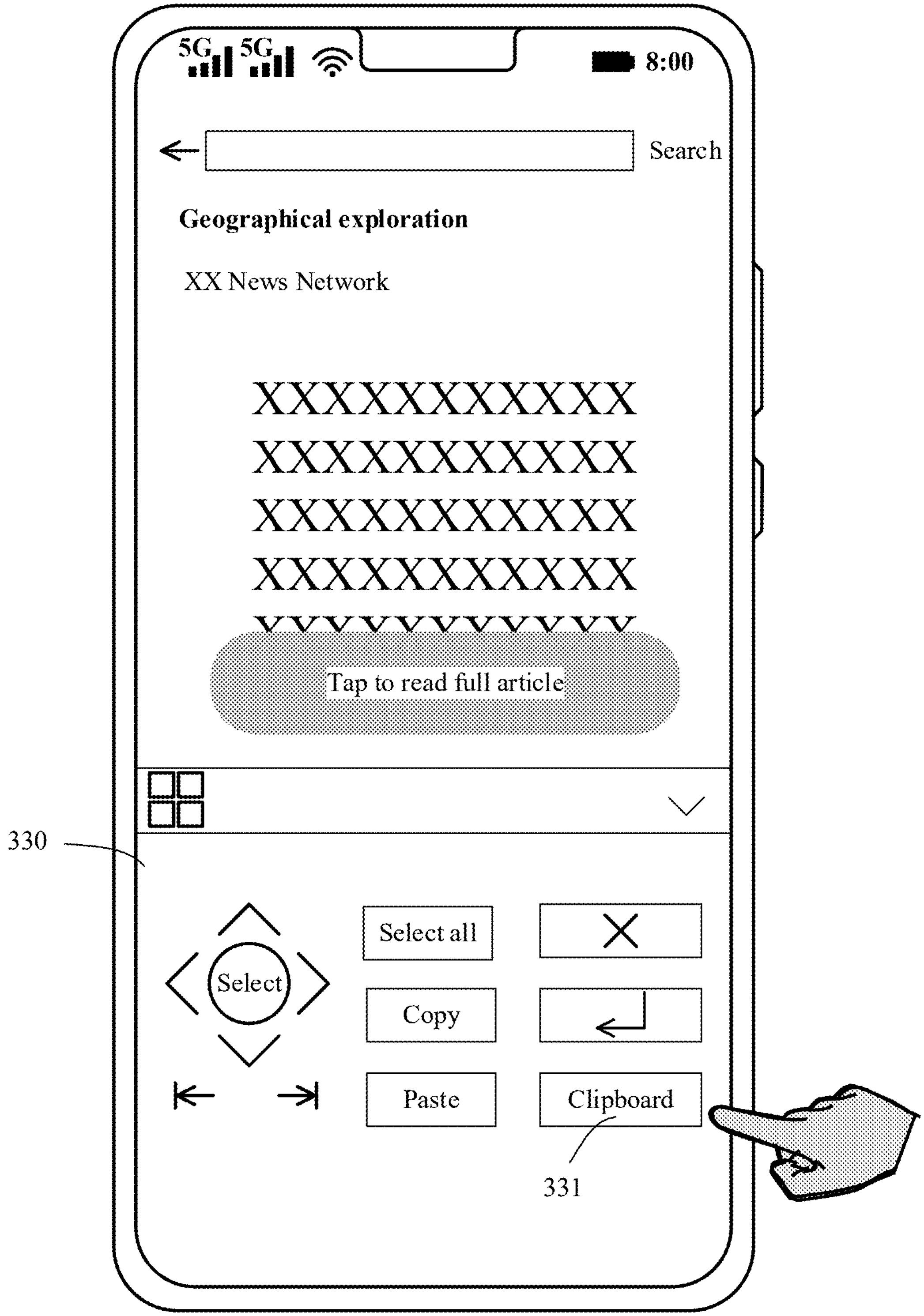

As shown in FIG. 3C, the electronic device 100 may detect an operation (for example, a tap operation) performed by the user on the option 331. In response to the operation, the electronic device 100 may display a window 340 shown as an example in FIG. 3D.

Figure 3D:
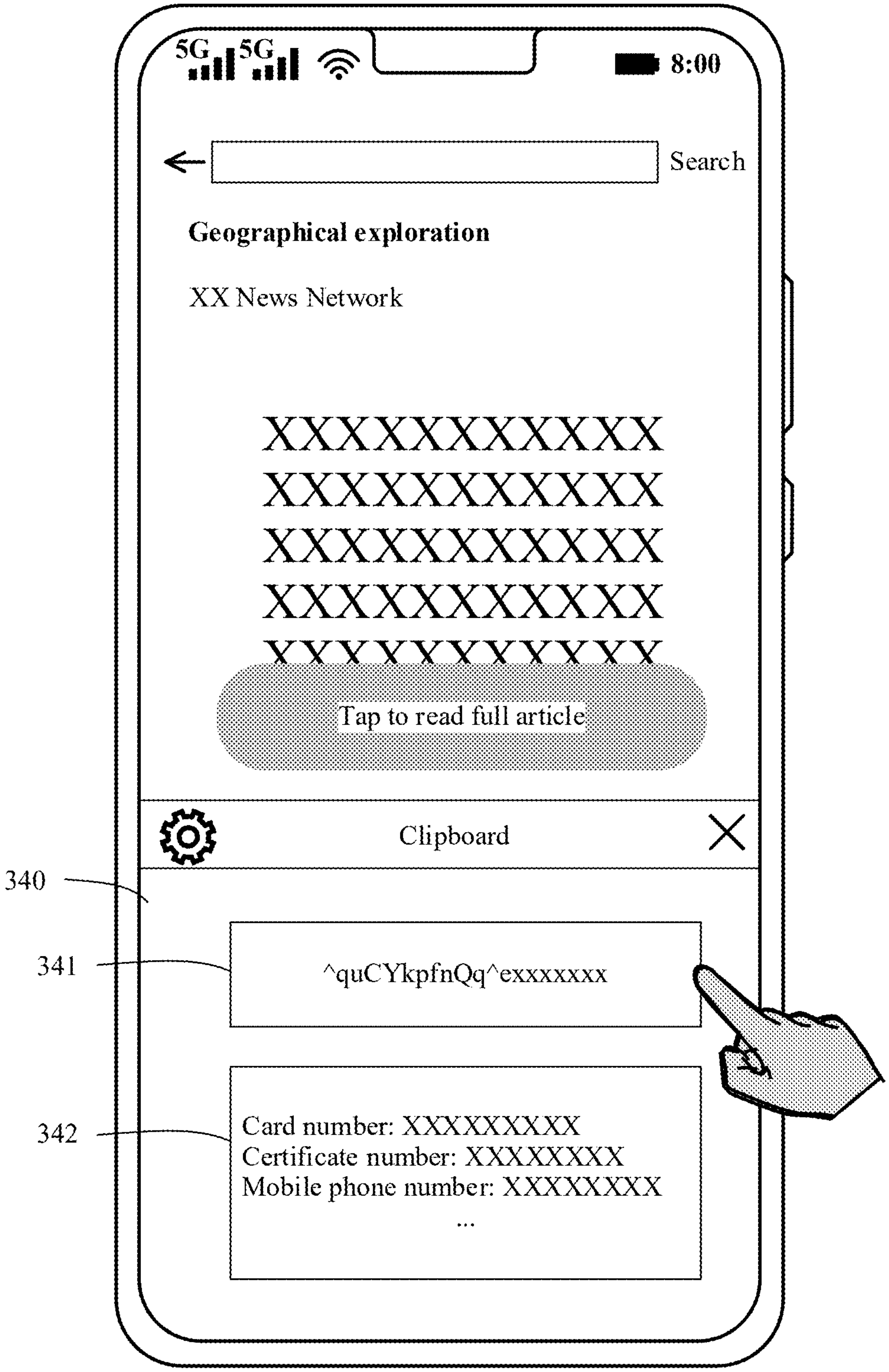

As shown in FIG. 3D, the window 340 may be a window corresponding to the clipboard, and the window may include one or more pieces of text information written into the clipboard (for example, text information 341, and text information 342).

It is assumed that the user does not actively perform an operation of copying the text information 341 in advance, where the text information 341 is the content 1 automatically written into the clipboard by the browser application of the electronic device 100.

It is assumed that the text information 342 (for example, personal sensitive information such as a card number, a certificate number, and a mobile phone number of the user) is content stored in the clipboard in advance by the user, the electronic device 100 may execute the extended JS script, to read the text information 342, and may further write the text information 342 into the clipboard again.

Still as shown in FIG. 3D, if the user wants to delete the text information 341 from the clipboard, the electronic device 100 may detect an operation (for example, a touch and hold operation) performed by the user on the text information 341. In response to the operation, the electronic device 100 may display a window 350 shown as an example in FIG. 3E.

Figure 3E:
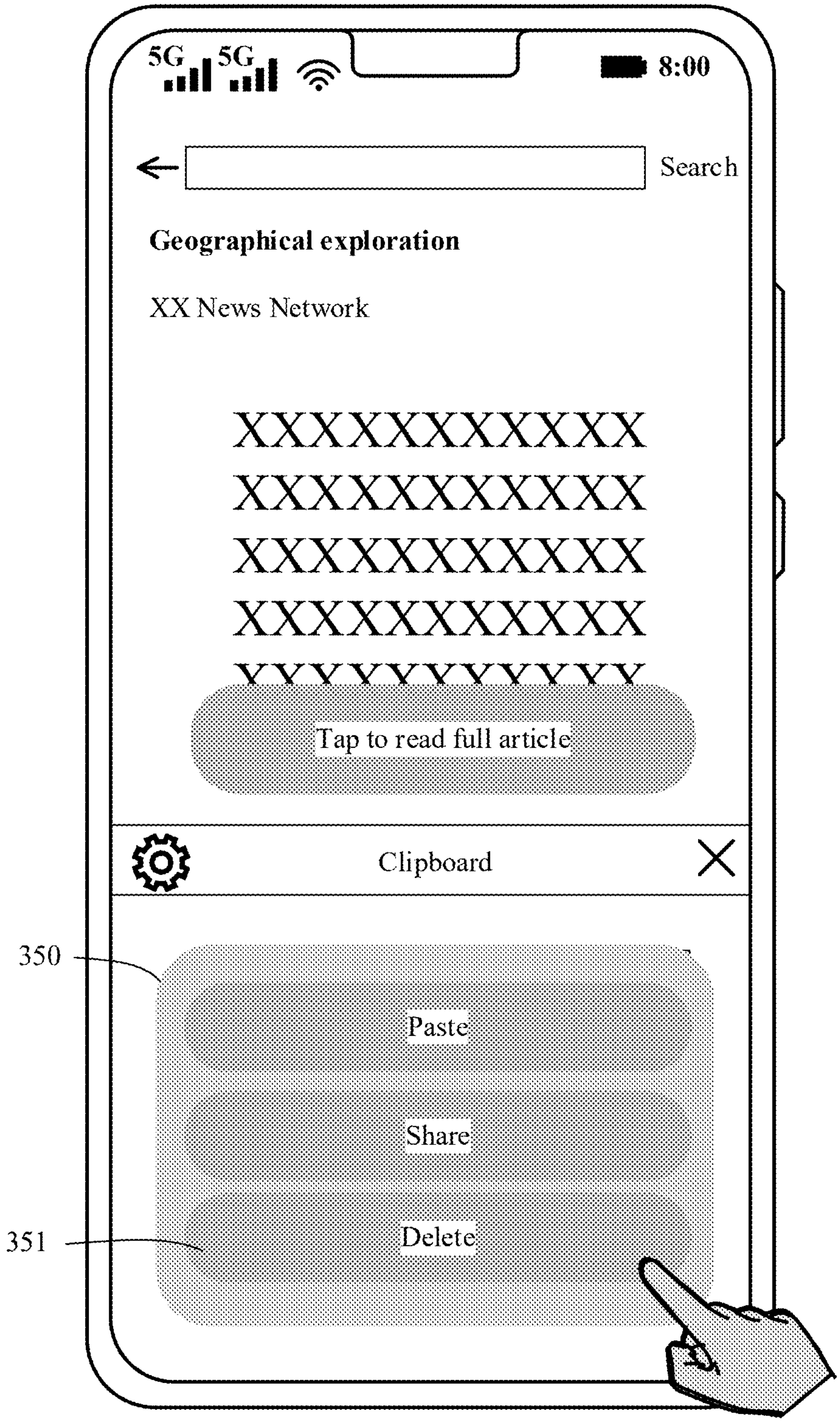
Figure 3F:
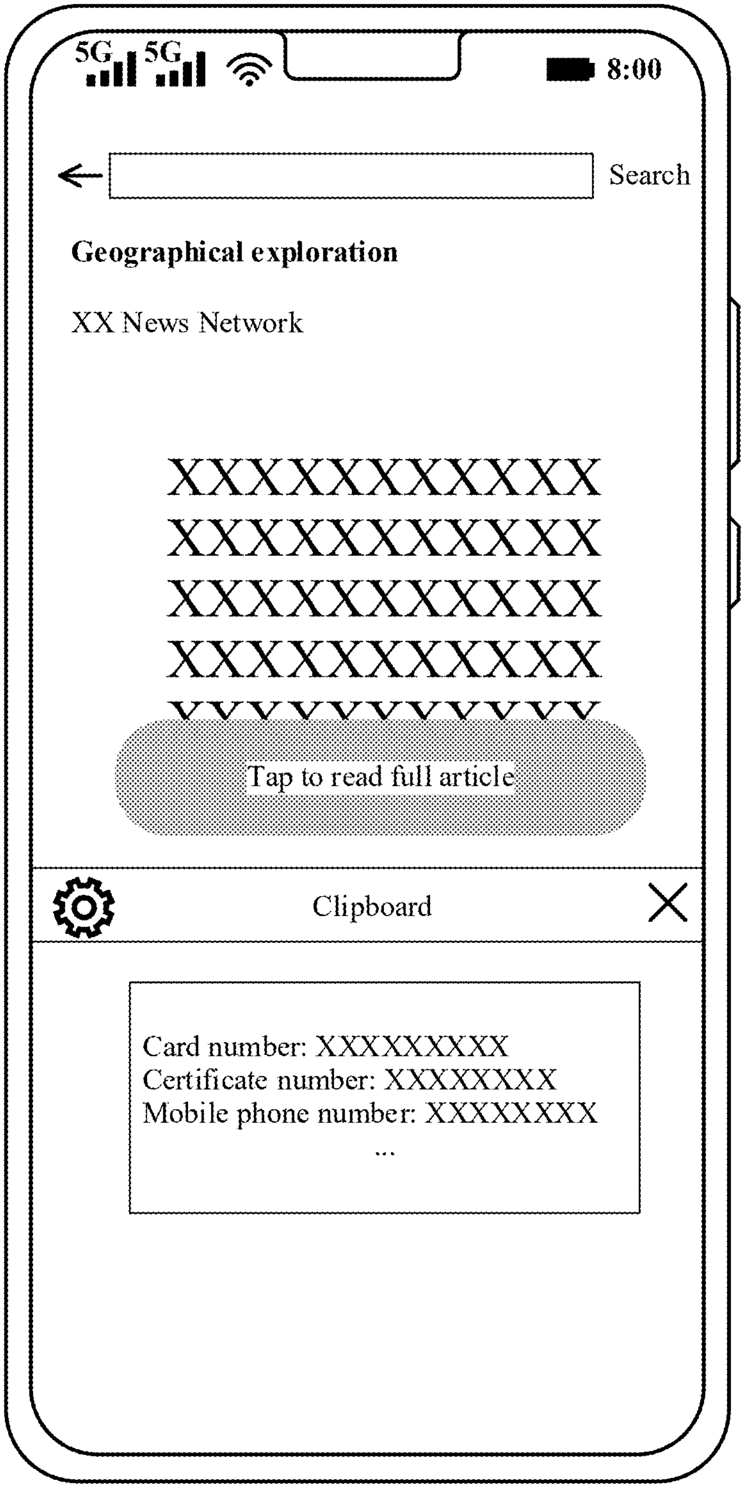

As shown in FIG. 3E, the window 350 may include one or more options (for example, an option 351). The electronic device 100 may detect an operation (for example, a tap operation) performed by the user on the option 351. In response to the operation, the electronic device 100 may delete the text information 341 from the clipboard. In addition, as shown as an example in FIG. 3F, the electronic device 100 may cancel displaying the text information 341.

S107 and S108: The browser application of the electronic device 100 detects an operation of closing the web page 1 by the user. In response to the operation, the browser application of the electronic device 100 closes the web page 1, and still stores the content 1 in the clipboard.

After closing the web page 1, the browser application of the electronic device 100 may further store the content 1 (for example, the text information 341) in the clipboard as shown as an example in FIG. 3D, and does not automatically delete the content 1 from the clipboard.

The user does not usually notice that the content on the clipboard changes after the web page is accessed each time. Even if the user notices that the content changes, as shown as an example in FIG. 3E, the user can only actively delete the content from the clipboard, to avoid a risk of information leakage.

It can be learned from FIG. 1, FIG. 2A to FIG. 2D, and FIG. 3A to FIG. 3F that currently, in a process of accessing a web page by a user, the following three problems may exist.

Problem 1:

The web page can arbitrarily read content (for example, read the text information 342 on the clipboard as shown as an example in FIG. 3D) on a clipboard without the user's consent (that is, without the user's knowledge). When the user opens the current web page, some applications or web pages previously opened by the user may still store some historical data (for example, data such as personal sensitive information of the user) in the clipboard. If the data is read by the current web page, unnecessary information leakage may be caused.

For example, if the web page can arbitrarily read content on the clipboard, and the user just stores some personal sensitive information (such as an account number, a card number, and a certificate number) in the clipboard, the information is likely to be leaked to the current web page, thereby bringing risks to the user.

In other words, currently, some web pages can arbitrarily read the content on the clipboard and/or write content into the clipboard without obtaining read and write permission on the clipboard, and the user cannot control whether the web page can obtain the read and write permission on the clipboard.

Problem 2:

The web page can write arbitrary content into the clipboard without the user's consent (that is, without the user's knowledge). The content may be malicious or illegal information, or may be user information that is stored in advance in the clipboard and that is read from the clipboard (for example, personal sensitive information such as a card number and a certificate number of the user), or maybe some promotion information. Before writing the content into the clipboard, the user needs to be prompted whether to agree to write the content, and the content can be written into the clipboard only when the user agrees to write the content. However, no solution is available to resolve this problem.

In other words, currently, the user cannot control content written by the web page into the clipboard, and cannot detect whether the content includes information of types such as malicious information, illegal information, personal sensitive information of the user, and promotion information.

If the content that the web page attempts to write into the clipboard can be detected, and when the malicious information, illegal information, personal sensitive information of the user, and promotion information are detected, the user can be prompted to perform a next action (for example, if the user agrees to write the content, the content is written into the clipboard, or if the user does not agree to write the content, the content is not written into the clipboard). In this way, user privacy can be better protected.

Problem 3:

After the web page is closed, the electronic device cannot automatically clear the content written into the clipboard to prevent information leakage. For example, if the user stores some personal sensitive information in the clipboard when accessing a web page, to prevent information leakage, when closing the web page, the user usually wants that the electronic device can automatically clear the stored personal sensitive information, or restore initial information stored in the clipboard (namely, information stored in the clipboard before the web page is accessed).

In other words, currently, the user cannot control a life cycle of the content on the clipboard, that is, when the user closes the web page, the electronic device cannot automatically clear the content written by the current web page into the clipboard. In this way, when the user opens another web page or application, the content may be leaked to the another web page or application, thereby causing unnecessary information leakage.

To resolve the foregoing problems, embodiments of this application provide a privacy protection method. A currently existing HTML and JS are extended, so that a server may generate information about a web page based on an extended HTML and an extended JS script. In addition, an electronic device may support the extended HTML and the extended JS script, so that the electronic device can support a user in performing read and write permission setting, content detection setting, content life cycle management, and the like on a clipboard. In this way, in a process of accessing the web page by the user, privacy of the user can be effectively protected, a risk of privacy leakage is avoided, and user experience is improved.

It should be noted that the privacy protection method provided in embodiments of this application may be applied to a scenario in which a user accesses a web page. The user may access the web page by using a common browser application or another application that has a web page access capability (namely, an application that uses a browser capability, which may also be referred to as a browser-like application). This is not limited in embodiments of this application.

In addition, a manner in which the user accesses the current web page (that is, opens the current web page) may be that the user switches from another application to the current web page, or may be that the user switches from another web page in a same application to the current web page. A manner in which the user leaves the current web page (that is, closes the current web page) may be that the user switches from the current web page to another application, or may be that the user switches from the current web page to another web page in a same application.

The following describes a communication system according to embodiments of this application.

Figure 4:
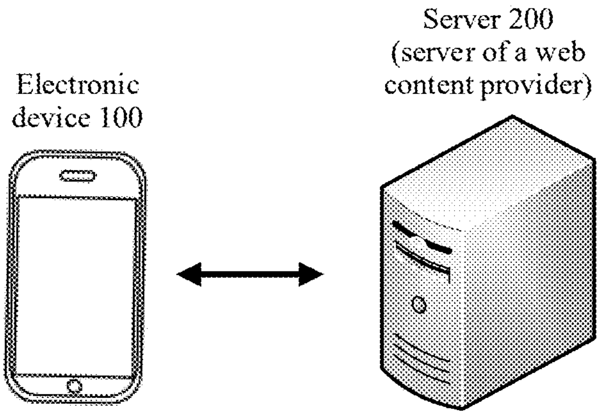
FIG. 4 is a schematic diagram of a communication system according to an embodiment of this application.

FIG. 4 is an example of a communication system according to an embodiment of this application.

As shown in FIG. 4, the communication system may include an electronic device 100 and a server 200.

The electronic device 100 may be an intelligent terminal device with a web page access capability, and supports an extended HTML and an extended JS script. The extended HTML may be obtained by extending an existing HTML, and may include related code used to describe clipboard setting (for example, clipboard permission and a life cycle policy of clipboard content) related to a web page. The extended JS script may be obtained by extending an existing JS script, and may include related code for reading clipboard setting and setting the clipboard.

The electronic device 100 may be configured to provide a user with a capability of entering a website address. The electronic device 100 may be further configured to obtain, from the server 200 based on the website address entered by the user, information about a web page corresponding to the website address, and perform rendering, to present content on the web page to the user (for example, text content, and multimedia content such as an icon and a picture). The electronic device 100 may be further configured to interpret the information about the web page, and execute a JS script included in the information about the web page.

The electronic device 100 may be of various types. A specific type of the electronic device 100 is not limited in embodiments of this application. For example, the electronic device 100 may be a mobile phone, or may be a tablet computer, a desktop computer, a laptop computer, a handheld computer, a notebook computer, or a smart screen.

The server 200 may be a server of a web content provider.

The server 200 may be configured to generate and store the information about the web page based on the extended HTML and the extended JS script. The server 200 may be further configured to perform data interaction with the electronic device 100 (for example, receiving a request for obtaining the information about the web page sent by the electronic device 100, or sending the information about the web page to the electronic device 100). The server 200 may be further configured to embed a JS script into the information about the web page based on a requirement of the web page provider (for example, an advertisement web page provider may require a JS script for generating promotion information code to be embedded in the information about the web page, so that the JS script can be written into the clipboard of the electronic device 100), so that the electronic device 100 can execute the JS script to read content on the clipboard of the electronic device 100. The server 200 may be further configured to write some information (for example, promotion information) into the clipboard of the electronic device 100.

The server 200 may be a conventional server, or may be a cloud server. This is not limited in embodiments of this application.

Specific functions of the electronic device 100 and the server 200 are described in detail in subsequent embodiments, and are not described herein.

It should be understood that FIG. 4 is merely a schematic diagram of an architecture of the communication system, and should not constitute a limitation on this application. A quantity of electronic devices and servers included in the communication system is not limited in embodiments of this application.

Scenario 1: A User Accesses a Web Page by Using a Browser Application

The following describes a specific execution process of the privacy protection method according to embodiments of this application in a scenario in which the user accesses the web page by using the browser application.

Figure 5A:
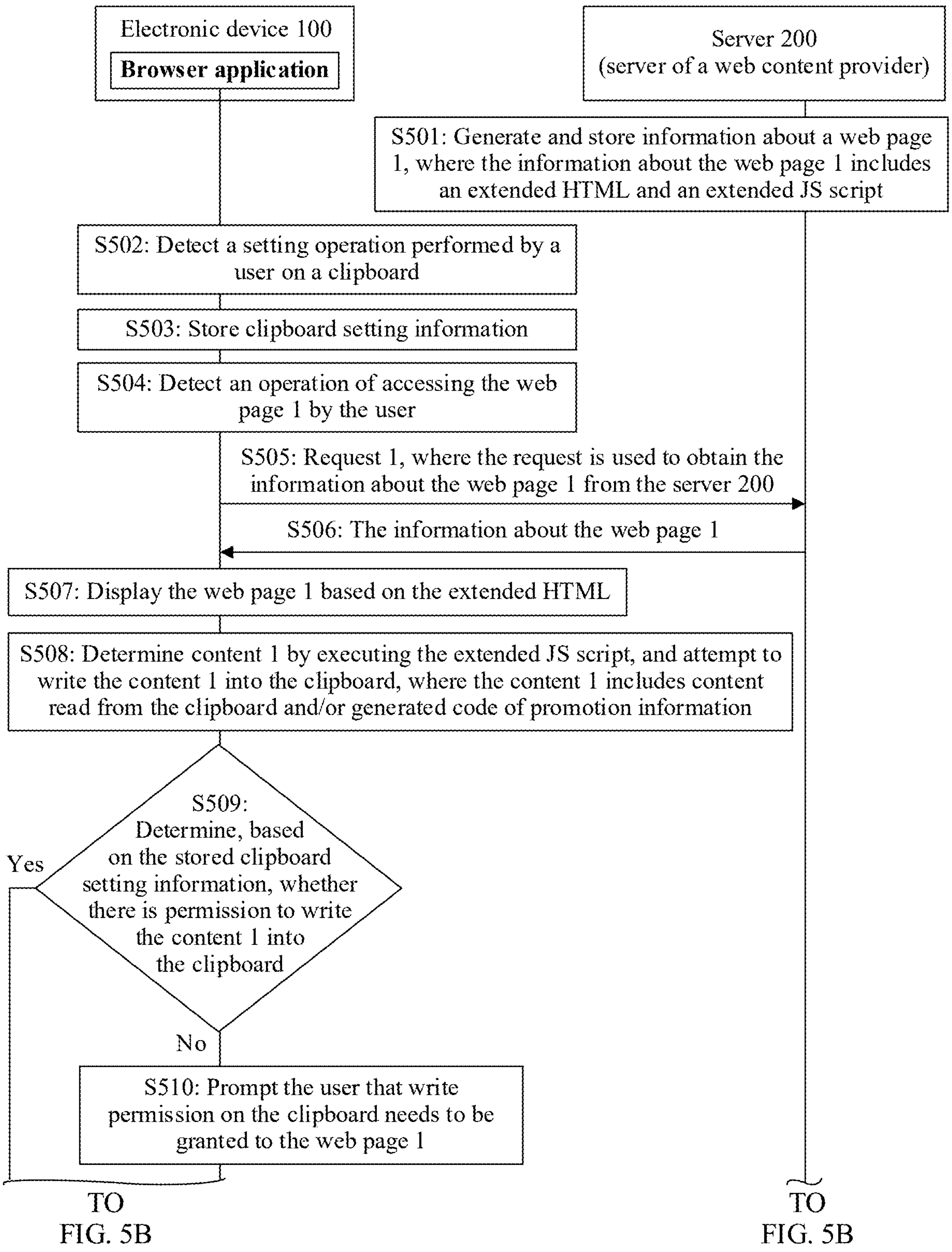
FIG. 5A and FIG. 5B are a schematic flowchart of a privacy protection method in a scenario in which a user accesses a web page by using a browser application according to an embodiment of this application.
Figure 5B:
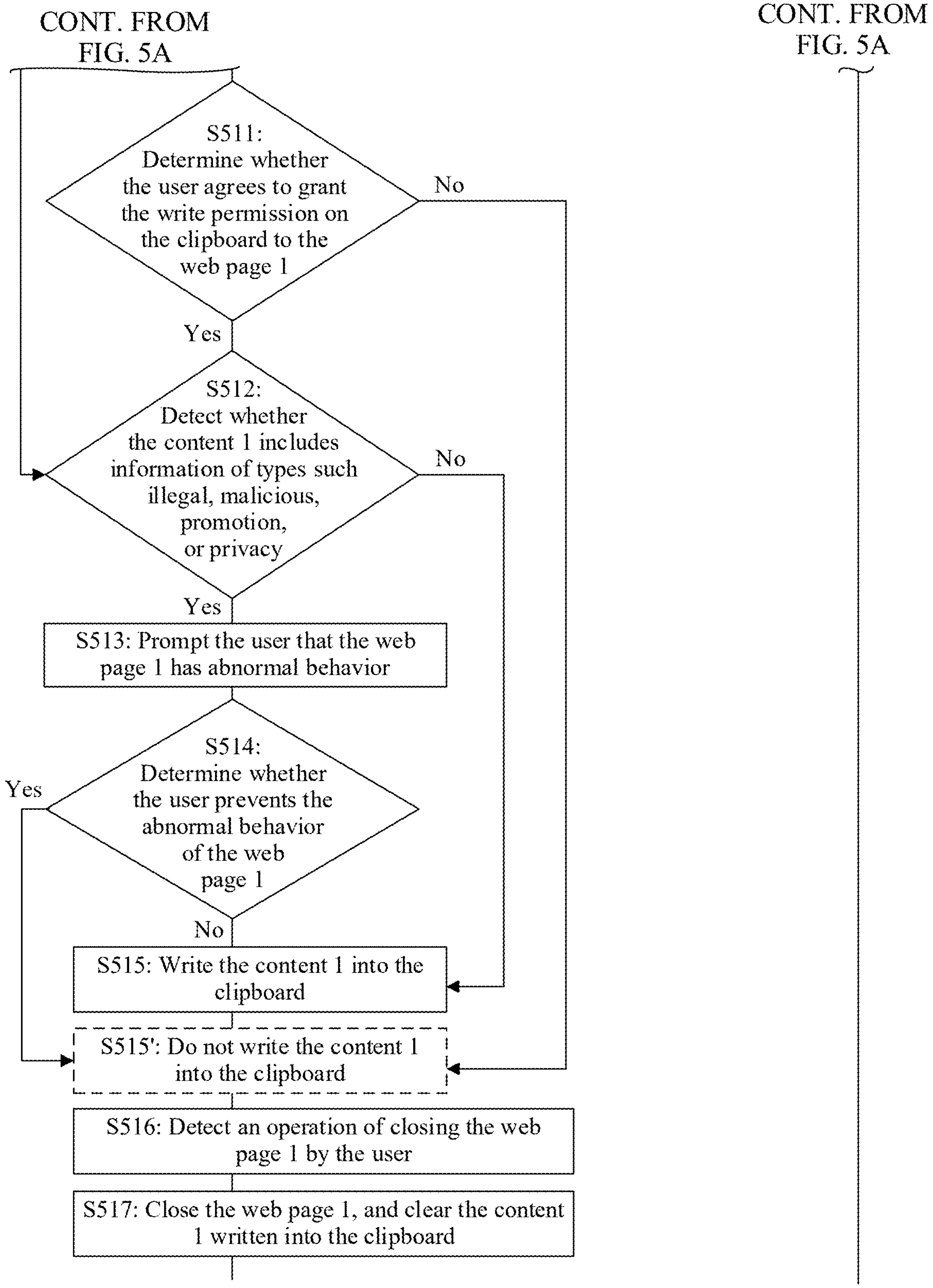

FIG. 5A and FIG. 5B are an example of a specific process of the privacy protection method in the scenario in which the user accesses the web page by using the browser application according to an embodiment of this application.

As shown in FIG. 5A and FIG. 5B, the method may be applied to a communication system that includes an electronic device 100 and a server 200. The browser application may be installed on the electronic device 100, and the server 200 may be a server of a web content provider. Both the electronic device 100 and the server 200 may support an extended HTML and an extended JS script. Specific steps of the method are described in detail below.

S501: The server 200 generates and stores information about a web page 1, where the information about the web page 1 includes an extended HTML and an extended JS script.

Specifically, after an HTML and JS are extended, the server 200 may generate information about a web page (for example, the information about the web page 1) based on the extended HTML and the extended JS script.

The extended HTML may include related code used to describe clipboard setting (for example, clipboard permission and a life cycle policy of clipboard content) related to the web page 1. An HTML document is defined by an HTML element, and the HTML element can be tagged with an HTML tag. Most HTML elements can have attributed, and the attributes are additional information provided by the HTML elements.

In embodiments of this application, an attribute of the clipboard setting related to the web page 1 may be specified in a meta element tagged by a <meta> tag (a tag for defining metadata in the HTML document), and may be parsed by the browser application.

For example, the clipboard permission related to the web page 1 may be specified in an attribute clipboardRightLvl, and an attribute value corresponding to the attribute may include but is not limited to: read only (read only, ro), write only (write only), read and write (read and write, rw), and write appending (write appending, wa). The clipboard permission may be set by the user independently. For example, the user may independently set the clipboard permission to read only, write only, read and write, or write appending.

For example, the life cycle policy of the clipboard content related to the web page 1 may be specified in an attribute clipboardContentLifePolicy, and an attribute value corresponding to the attribute may include but is not limited to: auto clear (auto-clear, that is, content on the clipboard is automatically cleared after the web page is closed), default (default, that is, content on the clipboard is still retained but not cleared after the web page is closed, which is an insecure policy), and restore (restore, that is, content on the clipboard is recorded when the web page is entered, and after the web page is closed, content on the clipboard is restored to the content on the clipboard when the web page is entered).

It should be noted that in this embodiment of this application, that the attribute of the clipboard setting related to the web page 1 is specified in the meta element tagged by the <meta> tag is merely an example. This is not limited thereto. The attribute of the clipboard setting related to the web page 1 may alternatively be specified in an element tagged by another tag. This is not limited in embodiments of this application.

The extended JS script may include related code for reading clipboard setting and setting the clipboard. A <script> tag in the HTML document can be used to specify a script of a client, such as a JS script. Script code can be embedded in the <script> tag or a src attribute can be used to link an external script file.

In this embodiment of this application, the extended JS script may include an extended JS application programming interface (Application Programming Interface, API).

The API is a computing interface, and may define interaction between a plurality of pieces of software, a type of call (Call) or request (Request) that can be performed, how to perform a call or a request, a data format that needs to be used, a convention that needs to be followed, and the like. The API also provides an extension mechanism, so that users can extend existing functions to varying degrees in different manners. An API may be fully customized and specific to a component, or may be designed based on industry standards to ensure interoperability. Through information hiding, the API enables modular programming, and allows the user to use the interface independently.

It is easy to understand that JSAPI is an API developed for using the JS.

For example, the extended JSAPI may include but is not limited to the following four types:

readCurrentClipboardRight: This interface may be used to read current clipboard permission (for example, read only, write only, and read and write).

setClipboardRight: This interface may be used to set permission granted by the clipboard to the current web page (for example, read only, write only, and read and write).

readCurrentClipboardLifePolicy: This interface may be used to read the life cycle policy of the current clipboard content (for example, auto clear, default, and restore).

setClipboardLifePolicy: This interface may be used to set a life cycle policy of clipboard content after the current web page is closed (for example, auto clear, default, and restore).

For example, the information about the web page 1 may include but is not limited to the following code:

```
<head>
<metaclipboardRightLvl=ro>
<metaclipboardContentLifePolicy=auto-clear>
</head>
<body>
<script>
  function requireClipboardWriteRight( ) {//Start to execute the JS
  script
    var curLvl=readCurrentClipboardRight( ); //Read the permission
that is granted to the current clipboard and that is set by the user
  if(curLvl=="ro") {
        alert("Pls set Write to current site") //Display a pop-up window
to indicate that the user needs to grant the write permission on the
clipboard to the current web page
  setClipboardRight("rw"); //Set the permission granted by the clipboard
to the current web page to read and write
    }
    }
  function requireClipboardAutoclearLifePolicy ( ) {
    var curLifePolicy=readCurrentClipboardLifePolicy( ); //Read the life
cycle policy that is of the current clipboard and that is set by the user
  if(curLifePolicy=="default") {
        alert("Pls set Auto-clear to current site") //Display a pop-up
window to prompt the user to set the life cycle policy of the clipboard
to auto clear
  setClipboardLifePolicy("auto-clear"); //Set the life cycle policy of the
clipboard content to auto clear after the current web page is closed
    }
    }
</script>
<div>
</div>
</body>
```

It is easy to understand that, when executing the foregoing code, the electronic device 100 may first read current clipboard information set by the user (for example, the permission and the life cycle policy that are granted to the current clipboard and that are set by the user). If the user does not set the current clipboard information, the default clipboard information (for example, the current clipboard is granted the read only permission and the life cycle policy is auto clear) may be used.

It should be noted that the code included in the information about the web page 1 provided in this embodiment of this application is merely an example, and shall not constitute a limitation on this application.

S502 and S503: The browser application of the electronic device 100 detects a setting operation performed by the user on the clipboard, and in response to the operation, the browser application of the electronic device 100 may store clipboard setting information.

The following describes an example of a group of user interfaces in a process in which a user sets a clipboard.

For example, as shown in FIG. 2B, the electronic device 100 may detect an operation (for example, a tap operation) performed by the user on the option 223. In response to the operation, the electronic device 100 may display a window 610 shown as an example in FIG. 6A.

Figure 6A:
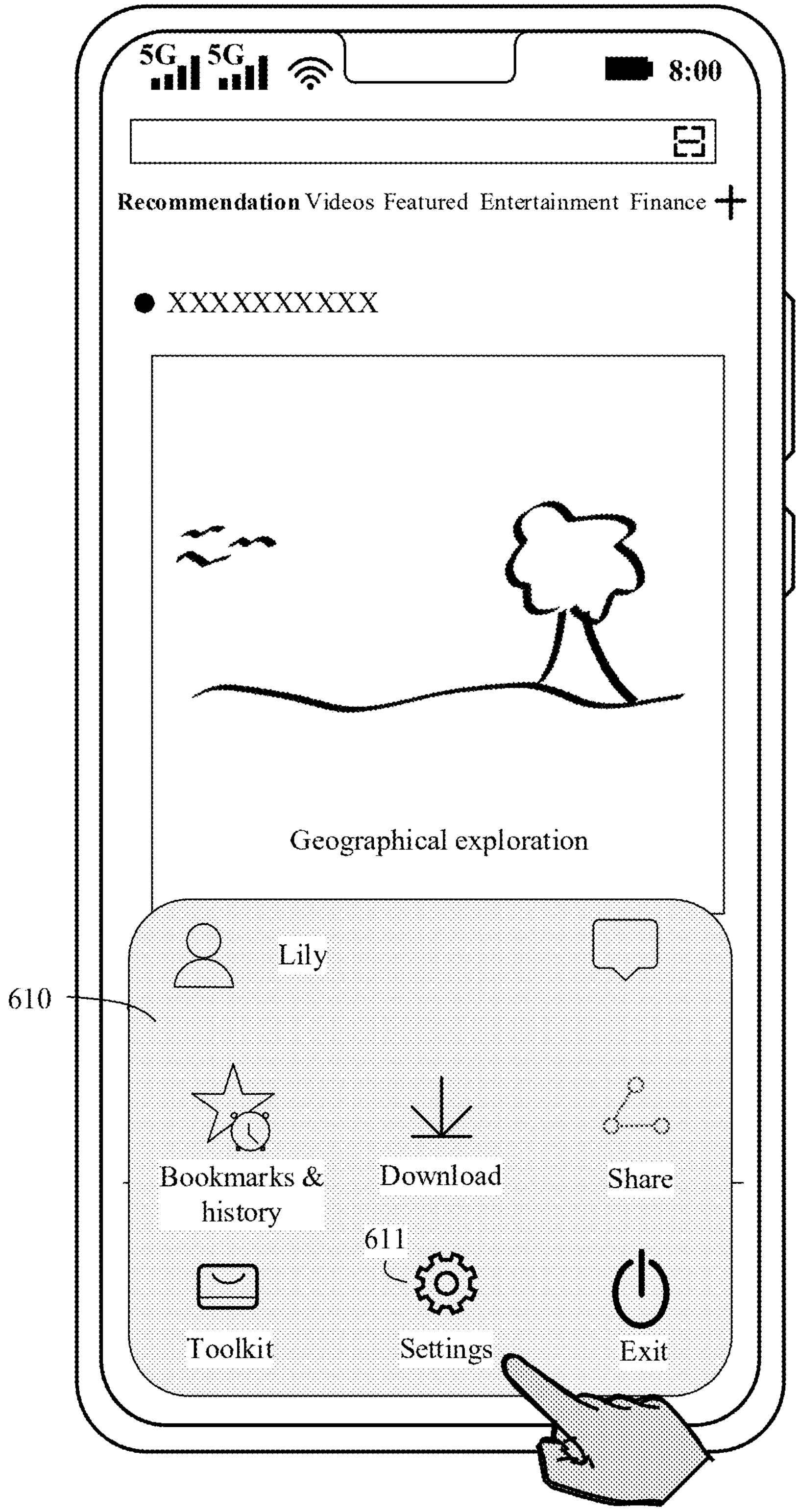
FIG. 6A to FIG. 6I are schematic diagrams of a group of user interfaces in a process in which a user accesses a web page by using a browser application according to an embodiment of this application.

As shown in FIG. 6A, the window 610 may include one or more options (for example, an option 611). The electronic device 100 may detect an operation (for example, a tap operation) performed by the user on the option 611. In response to the operation, the electronic device 100 may display a user interface 620 shown as an example in FIG. 6B. The user interface may be a user interface corresponding to the option 611 (namely, a setting option). The user interface may include one or more options (for example, an option 621).

Figure 6B:
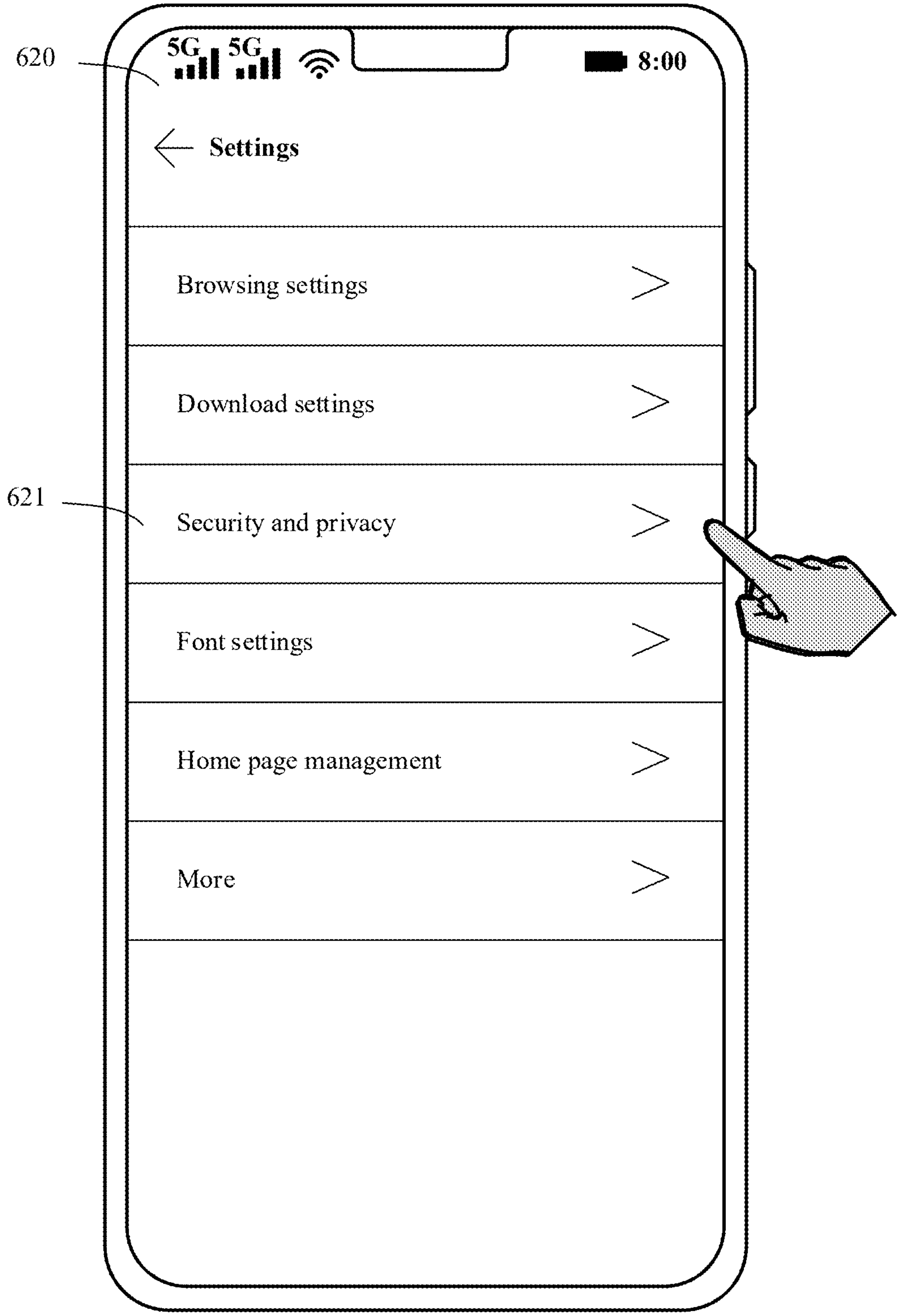

As shown in FIG. 6B, the electronic device 100 may detect an operation (for example, a tap operation) performed by the user on the option 621. In response to the operation, the electronic device 100 may display a user interface 630 shown as an example in FIG. 6C. The user interface may be a user interface corresponding to the option 621 (namely, a security and privacy option). The user interface may include one or more options (for example, an option 631). The option 631 may be used by the user to perform related setting on the clipboard.

Figure 6C:
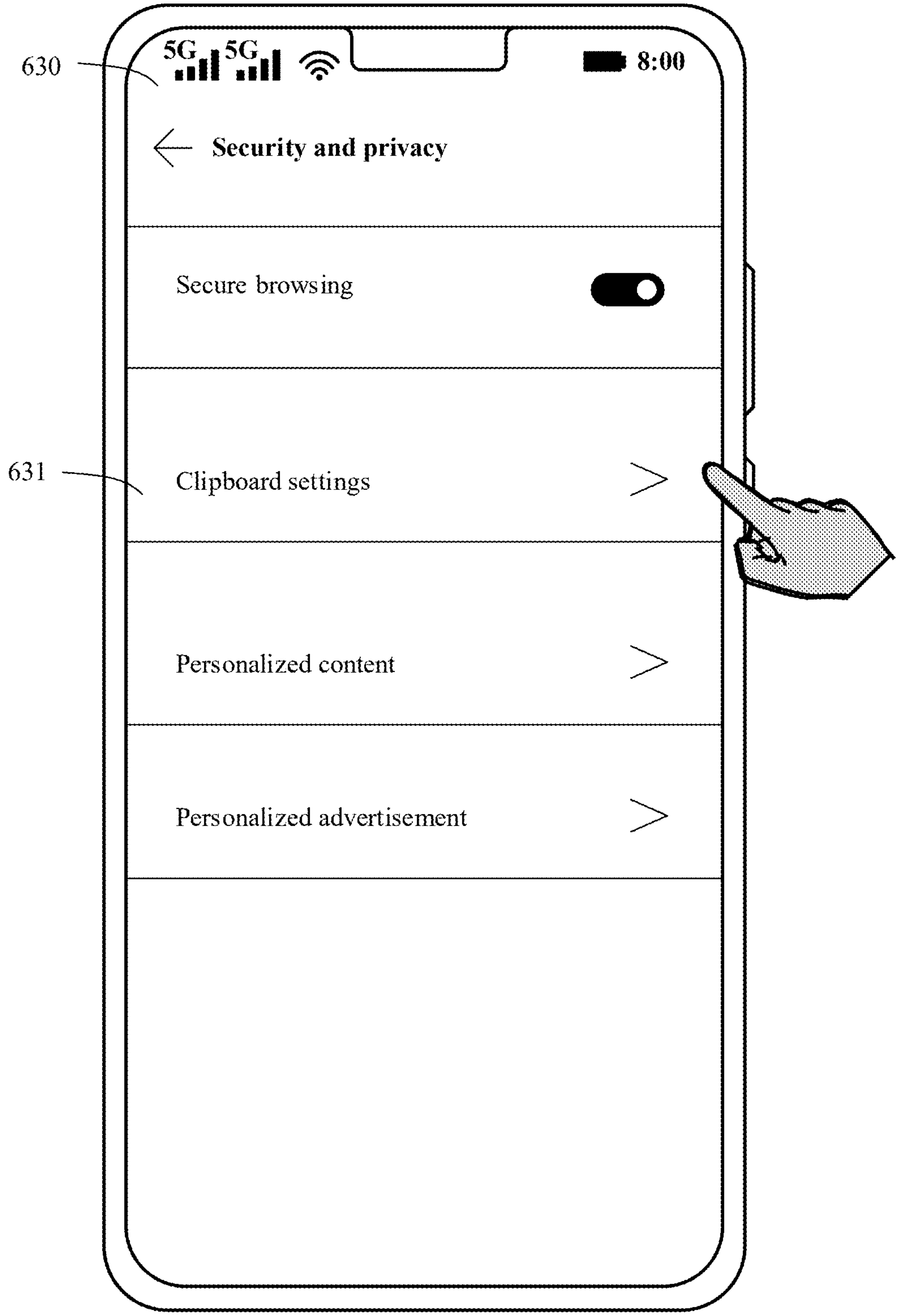

As shown in FIG. 6C, the electronic device 100 may detect an operation (for example, a tap operation) performed by the user on the option 631. In response to the operation, the electronic device 100 may display a user interface 640 shown as an example in FIG. 6D. The user interface may be a user interface corresponding to the option 631 (namely, a clipboard setting option).

Figure 6D:
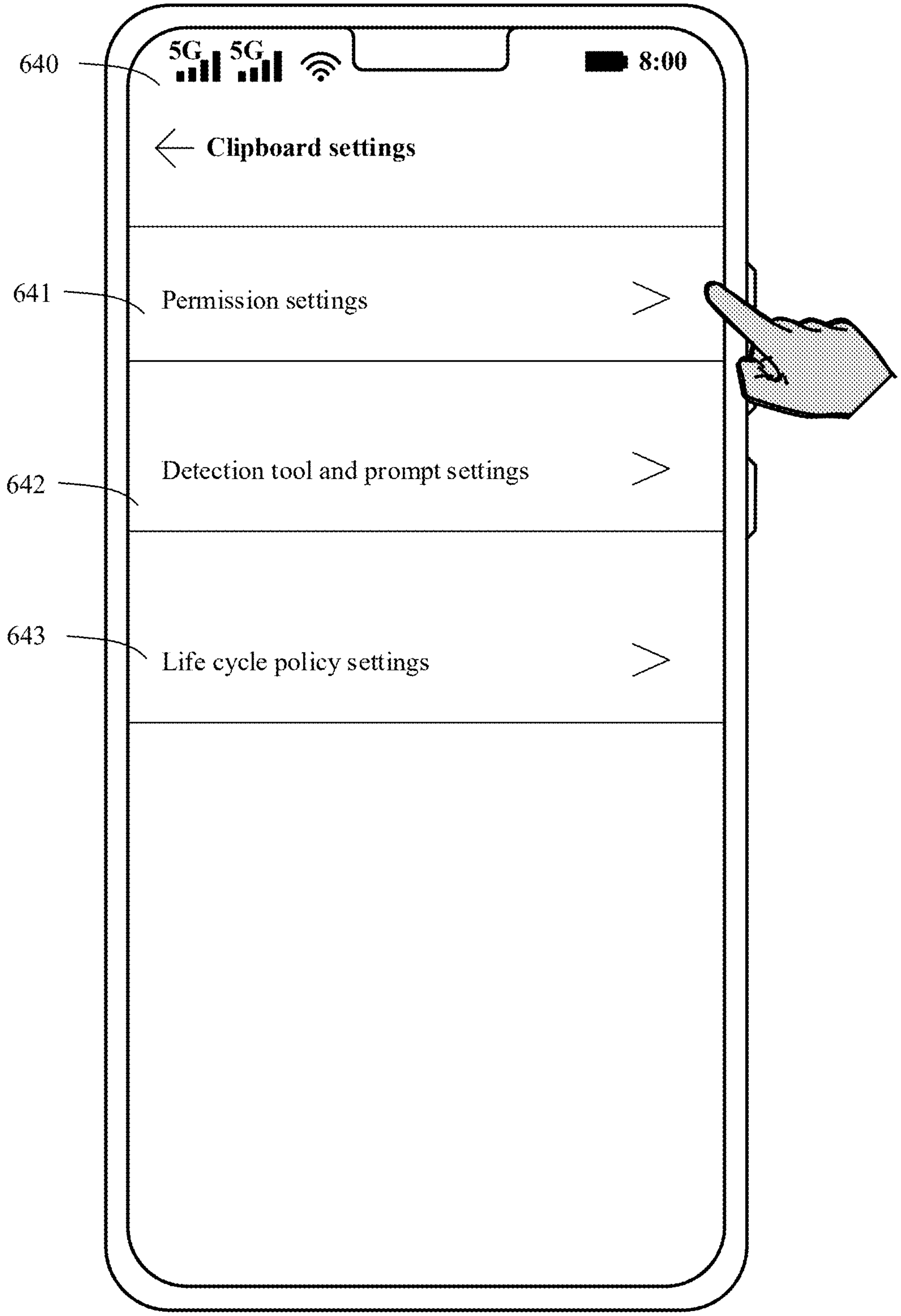

As shown in FIG. 6D, the user interface 640 may include one or more options (for example, an option 641, an option 642, and an option 643) for the user to perform related setting on the clipboard.

The option 641 may be used by the user to perform permission setting on the clipboard.

The option 642 may be used by the user to perform detection tool and prompt setting on the clipboard. The detection tool setting may be used by the user to set a tool (for example, a built-in detection tool or a third-party detection tool) for detecting content that is attempted to be written into the clipboard. The prompt setting may be used by the user to set whether to prompt the user to prevent writing the content into the clipboard when the content to be written into the clipboard includes illegal, malicious, promotion, or privacy information.

The option 643 may be used by the user to perform life cycle policy setting on the clipboard.

1. The User Performs Permission Setting on the Clipboard

For example, as shown in FIG. 6D, the electronic device 100 may detect an operation (for example, a tap operation) performed by the user on the option 641. In response to the operation, the electronic device 100 may display a user interface 650 shown as an example in FIG. 6E. The user interface may be a user interface corresponding to the option 641 (that is, a permission setting option).

Figure 6E:
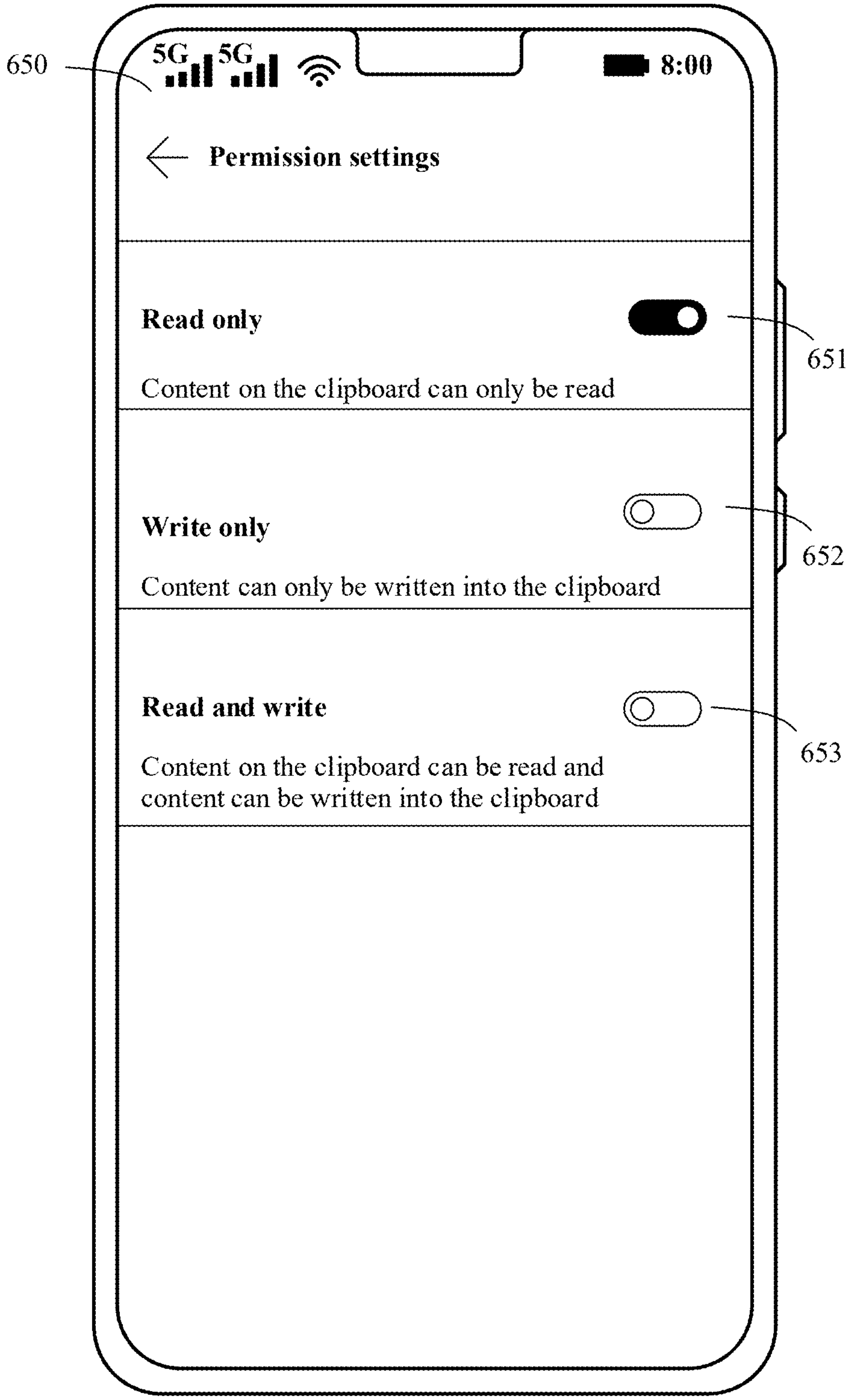

As shown in FIG. 6E, the user interface 650 may include one or more options (for example, an option 651, an option 652, and an option 653).

The option 651 may be a switch option corresponding to read only permission, and may be used by the user to set the permission on the clipboard to the read only permission. That is, when the option 651 is enabled, the permission on the clipboard is the read only permission, and the content on the clipboard can only be read.

The option 652 may be a switch option corresponding to write only permission, and may be used by the user to set the permission on the clipboard to the write only permission. That is, when the option 652 is enabled, the permission on the clipboard is the write only permission, and content can only be written into the clipboard.

The option 653 may be a switch option corresponding to read and write permission, and may be used by the user to set the permission on the clipboard to the read and write permission. That is, when the option 653 is enabled, the permission on the clipboard is the read and write permission, and the content on the clipboard can be read and content can be written into the clipboard.

In some examples, the user interface 650 may further include a switch option for setting more permission (for example, a switch option for a write appending permission).

As shown in FIG. 6E, it can be learned that the option 651 is in an enabled state, that is, the current permission on the clipboard is set to the read only permission.

It should be noted that the electronic device 100 may determine by default that the option 651 is in the enabled state (that is, the permission on the clipboard is set to the read only permission by default), or the option 651 may be in the enabled state trough a manual operation (for example, tapping the option 651) performed by the user. This is not limited in embodiments of this application.

It may be understood that, after the permission setting of the clipboard is completed, the electronic device 100 may store permission setting information of the clipboard. The electronic device 100 may store the permission setting information of the clipboard in a parameter corresponding to a clipboard permission storage interface (for example, clipboardRightLvl), so that a subsequent web page may read the parameter set by the user through a corresponding clipboard permission reading interface (for example, readCurrentClipboardRight). For example, if the option 651 (that is, the switch option corresponding to the read only permission) is set to the enabled state, the electronic device 100 may store the permission on the clipboard as the read only permission. For another example, if the option 652 (that is, the switch option corresponding to the write only permission) is set to the enabled state, the electronic device 100 may store the permission on the clipboard as the write only permission. For another example, if the option 653 (that is, the switch option corresponding to the read and write permission) is set to the enabled state, the electronic device 100 may store the permission on the clipboard as the read and write permission.

2. The User Performs Detection Tool and Prompt Setting on the Clipboard

For example, as shown in FIG. 6D, the electronic device 100 may detect an operation (for example, a tap operation) performed by the user on the option 642. In response to the operation, the electronic device 100 may display a user interface 660 shown as an example in FIG. 6F. The user interface may be a user interface corresponding to the option 642 (that is, a detection tool and prompt setting option).

The detection tool setting is associated with which detection tools (which may also be referred to as detection components) are used to perform content detection. The detection tool may be built in, that is, provided by the electronic device 100, or may be provided by a third party, that is, an external uniform resource locator (Uniform Resource Locator, URL).

Figure 6F:
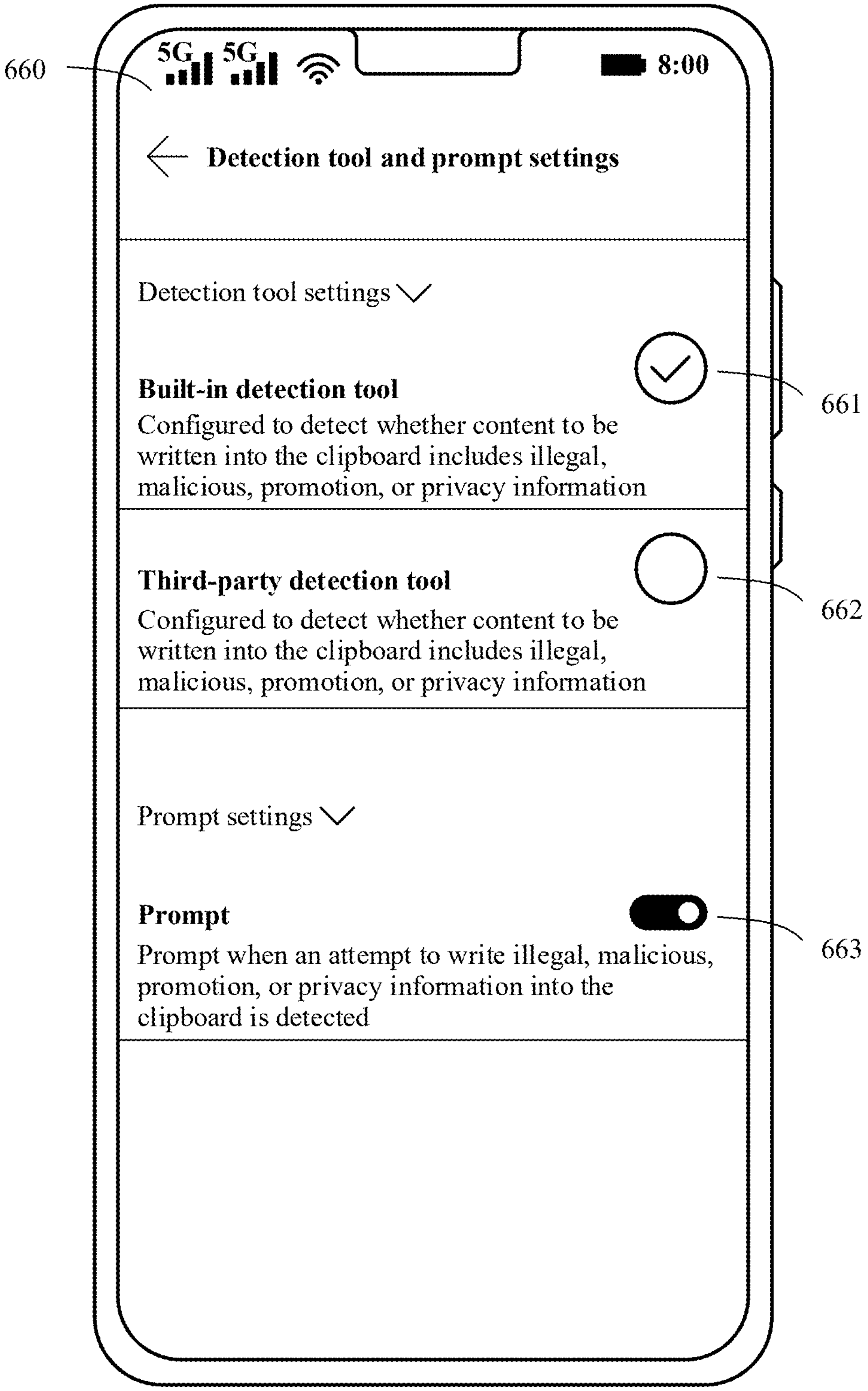

As shown in FIG. 6F, the user interface 660 may include one or more options (for example, an option 661, an option 662, and an option 663).

The option 661 may be a setting option corresponding to the built-in detection tool, and may be used by the user to set the detection tool as the built-in detection tool. That is, when the option 661 is in a selected state, the detection tool is the built-in detection tool. The built-in detection tool may be used to detect whether the content that attempts to be written into the clipboard includes illegal, malicious, promotion, or privacy information. After the detection is completed, the electronic device 100 generates a detection result.

The option 662 may be a setting option corresponding to the third-party detection tool, and may be used by the user to set the detection tool as the third-party detection tool. That is, when the option 662 is in a selected state, the detection tool is the third-party detection tool. The third-party detection tool may be used to detect whether the content that attempts to be written into the clipboard includes illegal, malicious, promotion, or privacy information. That is, the content that attempts to be written into the clipboard is sent to a URL corresponding to the third-party detection tool for detection, and a detection result may be sent to the electronic device 100 after the detection is completed.

It is easy to understand that the user can only select one of the detection tools (for example, the built-in detection tool or the third-party detection tool) to perform content detection.

The option 663 may be a switch option corresponding to prompt setting, and may be used by the user to set whether to prompt when an attempt to write illegal, malicious, promotion, or privacy information into the clipboard is detected. For example, when the option 663 is in an enabled state, the user is prompted upon detecting an attempt to write illegal, malicious, promotion, or privacy (for example, personal sensitive information such as a card number and a certificate number of the user) information into the clipboard so that writing of this content into the clipboard can be prevented. For another example, when the option 663 is in a disabled state, the user is not prompted when an attempt to write illegal, malicious, promotion, or privacy information into the clipboard is detected, and the content may be written into the clipboard.

In some examples, the detection tool needs to detect one or more of the specific types of information (for example, illegal, malicious, promotion, or privacy information) included in the content that is attempted to be written into the clipboard is optional by the user.

As shown in FIG. 6F, it can be learned that the option 661 is in a selected state, and the option 663 is in an enabled state. That is, the electronic device 100 may perform content detection by using the built-in detection tool. When an attempt to write illegal, malicious, promotion, or privacy (for example, personal sensitive information such as a card number and a certificate number of the user) information into the clipboard is detected, the user is prompted so that the content can be prevented from being written into the clipboard.

It should be noted that the electronic device 100 may determine, by default, that the option 661 is in the selected state and the option 663 is in the enabled state, or the option 661 may be in the selected state and the option 663 may be in the enabled state through a manual operation (for example, tapping the option 661, and tapping the option 663) performed by the user. This is not limited in embodiments of this application.

It may be understood that, after the detection tool and prompt setting of the clipboard is completed, the electronic device 100 may store detection tool and prompt setting information of the clipboard. For example, if the option 661 (that is, the setting option corresponding to the built-in detection tool) is set to the selected state, the electronic device 100 may store the detection tool of the clipboard as the built-in detection tool. For another example, if the option 662 (that is, the setting option corresponding to the third-party detection tool) is set to the selected state, the electronic device 100 may store the detection tool of the clipboard as the third-party detection tool. For another example, if the option 663 (that is, the switch option corresponding to the prompt setting) is set to the enabled state, the electronic device 100 may store the prompt setting of the clipboard as a prompt to the user when an attempt to write illegal, malicious, promotion, or privacy information into the clipboard is detected.

3. The User Performs Life Cycle Policy Setting on the Clipboard

For example, as shown in FIG. 6D, the electronic device 100 may detect an operation (for example, a tap operation) performed by the user on the option 643. In response to the operation, the electronic device 100 may display a user interface 670 shown as an example in FIG. 6G. The user interface may be a user interface corresponding to the option 643 (that is, a life cycle policy setting option).

Figure 6G:
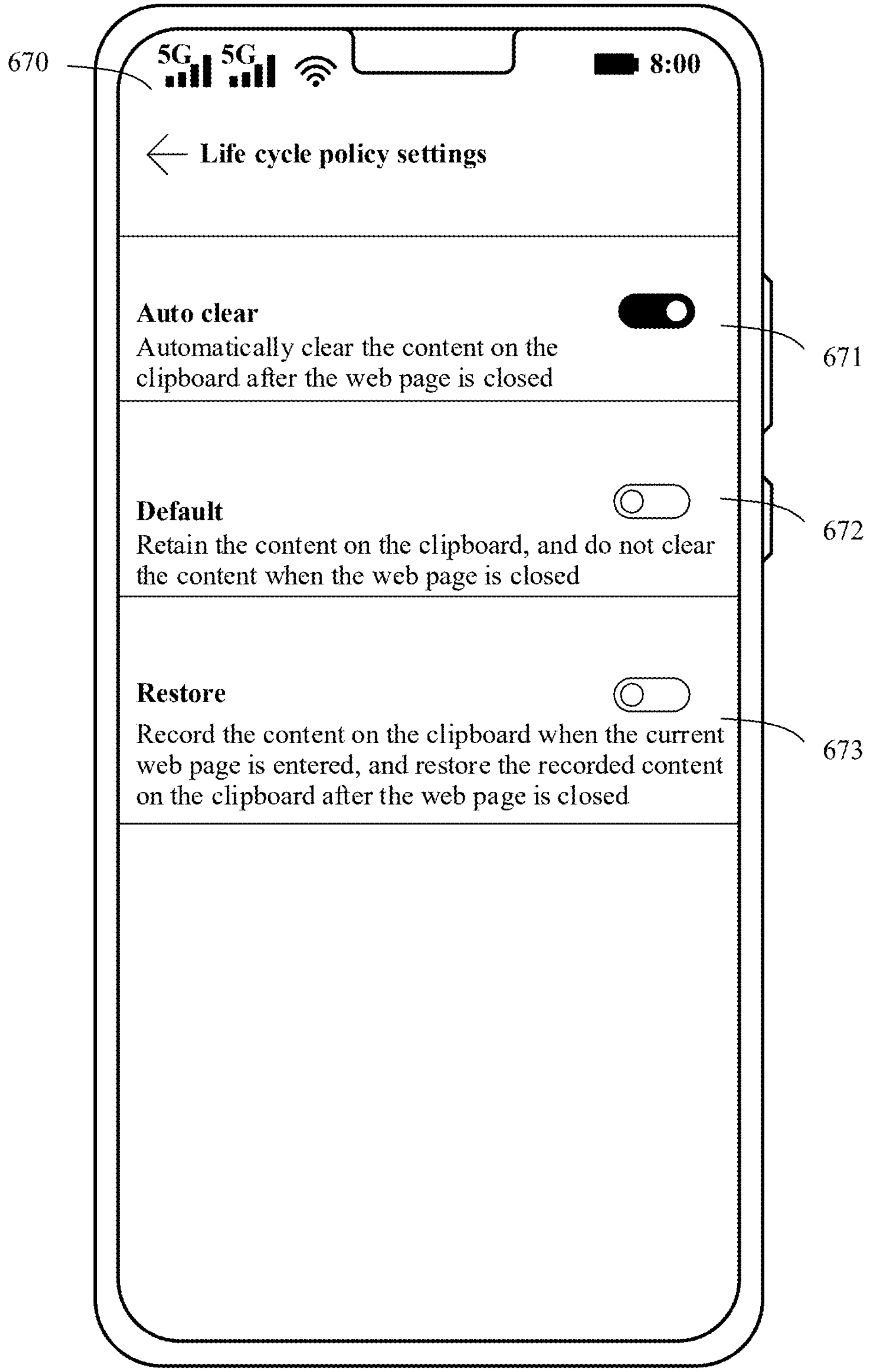

As shown in FIG. 6G, the user interface 670 may include one or more options (for example, an option 671, an option 672, and an option 673).

The option 671 may be a switch option corresponding to "auto clear", and may be used by the user to set the life cycle policy of the clipboard to "auto clear", that is, when the option 671 is in an enabled state, the life cycle policy of the clipboard is "auto clear". After the web page is closed, the content on the clipboard may be automatically cleared.

The option 672 may be a switch option corresponding to "default", and may be used by the user to set the life cycle policy of the clipboard to "default", that is, when the option 672 is in an enabled state, the life cycle policy of the clipboard is "default". After the web page is closed, the content on the clipboard is retained and not cleared.

The option 673 may be a switch option corresponding to "restore", and may be used by the user to set the life cycle policy of the clipboard to "restore", that is, when the option 673 is in an enabled state, the life cycle policy of the clipboard is "restore". When the user accesses the web page, the content on the clipboard is recorded, and after the web page is closed, the recorded content (that is, the recorded content on the clipboard when the web page is accessed) of the clipboard is restored. That is, in this case, when the current web page is closed, only the latest content written into the clipboard by the current web page is deleted, and the existing content on the clipboard before the current web page is displayed is retained.

It should be noted that the life cycle policy of the clipboard is not limited to the foregoing "auto clear", "default", and "restore", and may further include another life cycle policy. This is not limited in embodiments of this application.

As shown in FIG. 6G, it can be learned that the option 671 is in the enabled state, that is, the current life cycle policy of the clipboard is set to "auto clear".

It should be noted that the electronic device 100 may determine by default that the option 671 is in the enabled state (that is, the life cycle policy of the clipboard is set to "auto clear" by default), or the option 671 may be in the enabled state through a manual operation (for example, tapping the option 671) performed by the user. This is not limited in embodiments of this application.

It may be understood that, after the life cycle policy setting of the clipboard is completed, the electronic device 100 may store life cycle policy setting information of the clipboard. The electronic device 100 may store the life cycle policy setting information of the clipboard in a parameter corresponding to a clipboard life cycle policy storage interface (for example, clipboardContentLifePolicy), so that a subsequent web page may read the parameter set by the user through a corresponding clipboard life cycle policy reading interface (for example, readCurrentClipboardLifePolicy). For example, if the option 671 (that is, the switch option corresponding to "auto clear") is set to the enabled state, the electronic device 100 may store the life cycle policy of the clipboard as "auto clear". For another example, if the option 672 (that is, the switch option corresponding to "default") is set to the enabled state, the electronic device 100 may store the life cycle policy of the clipboard as "default". For another example, if the option 673 (that is, the switch option corresponding to "restore") is set to the enabled state, the electronic device 100 may store the life cycle policy of the clipboard as "restore".

The foregoing process in which the user sets the clipboard may be that the electronic device 100 uniformly sets the clipboard based on all websites by default.

In some examples, the electronic device 100 may further support the user in selecting whether to uniformly set the clipboard based on all websites, or independently set the clipboard based on a single website.

Figure 6H:
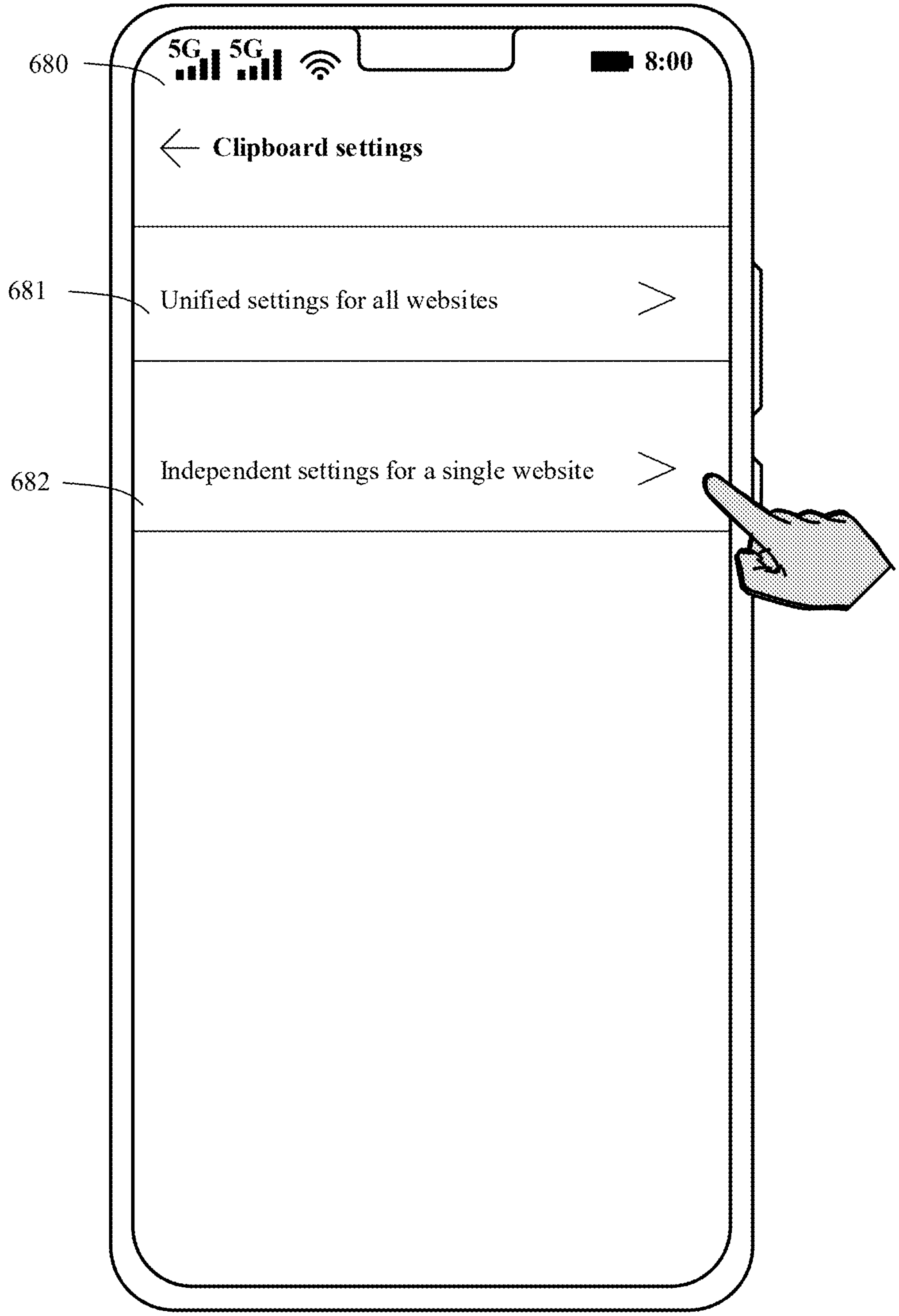

As shown in FIG. 6H, a user interface 680 shown in FIG. 6H may be displayed after the electronic device 100 detects an operation (for example, a tap operation) performed by the user on the option 631 shown in FIG. 6C. The user interface 680 may include an option 681 and an option 682. The option 681 may be used by the user to uniformly set the clipboard based on all websites, and the option 682 may be used by the user to independently set the clipboard based on a single website.

For example, if the user chooses to uniformly set the clipboard based on all websites, the electronic device 100 may detect an operation (for example, a tap operation) performed by the user on the option 681. In response to the operation, the electronic device 100 may display the user interface 640 shown as an example in FIG. 6D. Further, the user may uniformly perform permission setting, detection tool and prompt setting, and life cycle policy setting on the clipboard based on all websites. For a specific setting process, refer to the foregoing related content, and details are not described herein again.

For example, if the user chooses to independently set the clipboard based on a single website, the electronic device 100 may detect an operation (for example, a tap operation) performed by the user on the option 682. In response to the operation, the electronic device 100 may display a user interface 690 shown as an example in FIG. 6I. The user interface may include options corresponding to one or more websites (for example, an option corresponding to a "website 1", an option corresponding to a "website 2", and an option corresponding to a "website 3"). The one or more websites displayed by the electronic device 100 may be determined based on some parameters. For example, if the one or more websites displayed by the electronic device 100 are determined based on a quantity of browsing times of the user, the one or more websites displayed by the electronic device 100 may be websites that are visited by a large quantity of browsing times of the user.

Optionally, the electronic device 100 may further support the user to independently add options corresponding to more websites. For example, the user may tap an "add more" option in FIG. 6I to add an option corresponding to another website other than the "website 1", the "website 2", and the "website 3".

Figure 6I:
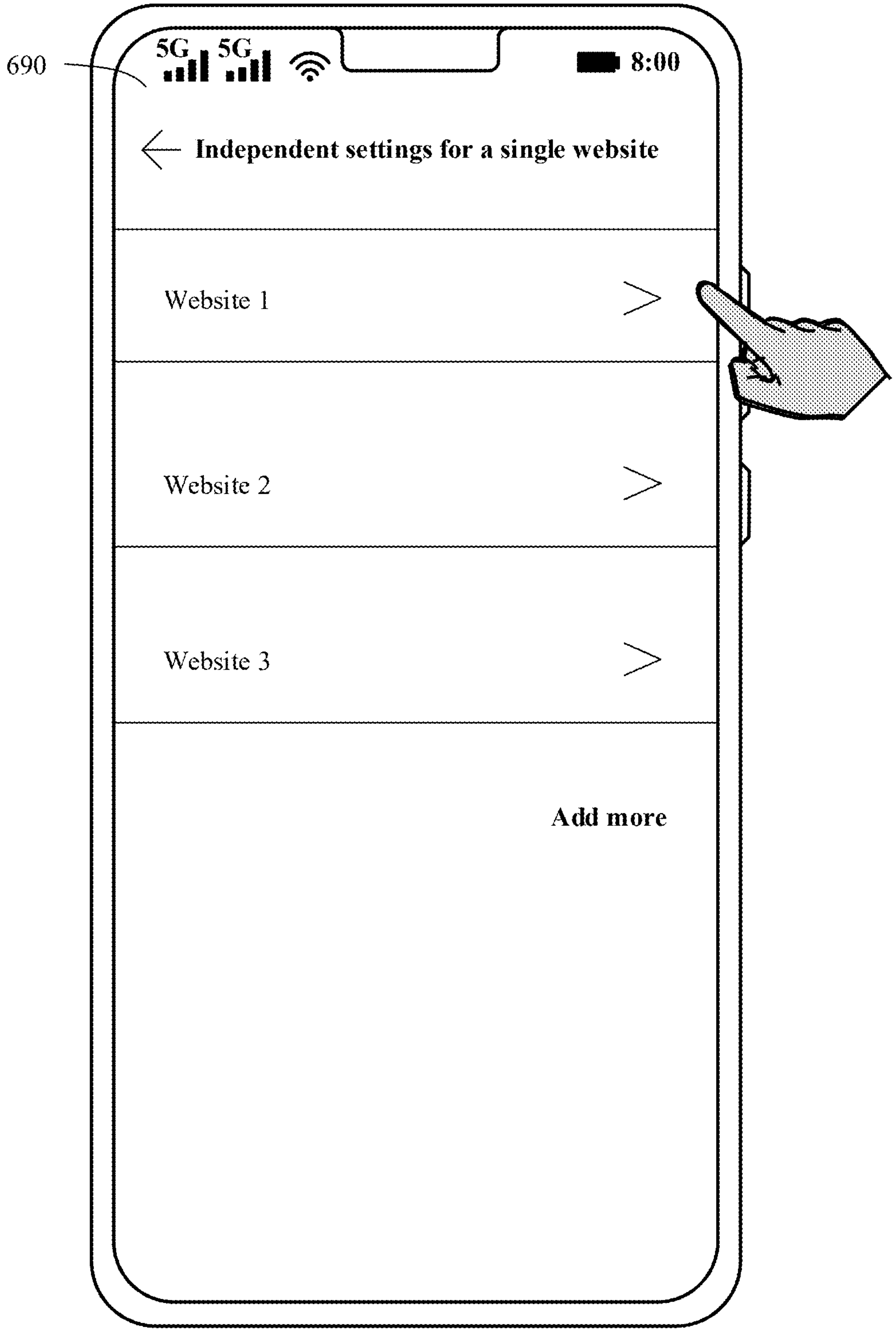

For example, the user independently sets the clipboard based on the website 1. As shown in FIG. 6I, the electronic device 100 may detect an operation (for example, a tap operation) performed by the user on the option corresponding to the "website 1". In response to the operation, the electronic device 100 may display the user interface 640 shown as an example in FIG. 6D. Further, the user may independently perform permission setting, detection tool and prompt setting, and life cycle policy setting on the clipboard based on the website 1. For a specific setting process, refer to the foregoing related content, and details are not described herein again.

It should be noted that the foregoing process of setting the clipboard by the user and the user interface related to the process are merely examples, and should not constitute a limitation on this application.

S504 to S506: The browser application of the electronic device 100 detects an operation of accessing the web page 1 by the user. In response to the operation, the browser application of the electronic device 100 may send a request 1 to the server 200, where the request is used to obtain the information about the web page 1 from the server 200. After the server 200 receives the request 1, the server 200 may send the information about the web page 1 to the browser application of the electronic device 100.

For example, similar to step S102 to step S104 in FIG. 1, the web page 1 is a "geographical exploration" web page. As shown in FIG. 2B, the browser application of the electronic device 100 may detect an operation (for example, an operation of tapping the option 222 corresponding to the "geographical exploration" web page by the user, or an operation of entering a website address corresponding to the "geographical exploration" web page in the search box 221 by the user) of accessing the web page 1 by the user. In response to the operation, the browser application of the electronic device 100 may send the request 1 to the server 200, where the request may be used to obtain the information about the web page 1 from the server 200. After receiving the request 1, the server 200 may send the information about the web page 1 to the browser application of the electronic device 100. The information about the web page 1 may include the extended HTML and the extended JS script.

S507: The browser application of the electronic device 100 displays the web page 1 based on the extended HTML.

Specifically, after the browser application of the electronic device 100 obtains the information about the web page 1 from the server 200 (that is, download the information about the web page 1 locally), the browser application of the electronic device 100 may parse the information about the web page 1, render content on the web page 1 based on the extended HTML included in the information about the web page 1, and display the web page 1.

For example, as shown in FIG. 2C, the user interface 230 shown in FIG. 2C may be a user interface used by the electronic device 100 to display the web page 1. For description of the user interface 230, refer to the foregoing related content. Details are not described herein again.

S508: The browser application of the electronic device 100 determines content 1 by executing the extended JS script, and attempts to write the content 1 into the clipboard, where the content 1 may include content read from the clipboard and/or generated code of the promotion information.

Specifically, after the browser application of the electronic device 100 obtains the information about the web page 1 from the server 200 (that is, download the information about the web page 1 locally), the browser application of the electronic device 100 may parse the information about the web page 1. If the information about the web page 1 includes the extended JS script, the browser application of the electronic device 100 may determine the content 1 by executing the extended JS script, where the content 1 may include the content read from the clipboard and/or the generated code of the promotion information. In other words, the browser application of the electronic device 100 may execute the extended JS script, to read the content on the clipboard, and/or generate the code of some information (for example, promotion information) required by the web page provider.

Further, the browser application of the electronic device 100 may further attempt to write the foregoing content 1 into the clipboard. In this case, the browser application of the electronic device 100 may perform the following step S509.

In some examples, the foregoing content 1 may further include some malicious/illegal information.

It should be noted that "attempting to write the content 1 into the clipboard" in step S508 may be automatically executed, or may be triggered by the user. For example, the browser application of the electronic device 100 may automatically execute the step after obtaining the information about the web page 1 from the server 200. For another example, the step may be executed after the user performs an operation (for example, a tap operation) on the option 232 shown in FIG. 2C. This is not limited in embodiments of this application.

In some examples, if the user actively wants to store some content in the web page 1 to the clipboard, the browser application of the electronic device 100 may be triggered to perform the following step S509.

S509: The browser application of the electronic device 100 determines, based on the stored clipboard setting information, whether the browser application has permission to write the content 1 into the clipboard. If the browser application has the permission, the following step S512 is performed. If the browser application does not have the permission, the following step S510 is performed.

Specifically, because the clipboard setting information is stored in the foregoing step S503, when step S509 is triggered to be performed, the browser application of the electronic device 100 may determine, based on the permission setting information of the clipboard in the stored clipboard setting information, whether the browser application has the permission to write the content 1 into the clipboard. If the browser application has the permission (that is, the permission that is on the clipboard and that is set by the user includes the write permission, for example, the read and write permission), the following step S512 is performed. If the browser application does not have the permission (that is, the permission that is on the clipboard and that is set by the user does not include the write permission, for example, the read only permission), the following step S510 is performed.

S510 and S511: The browser application of the electronic device 100 prompts the user that the write permission on the clipboard needs to be granted to the web page 1, and determines whether the user agrees to grant the write permission on the clipboard to the web page 1. If the user agrees, the following step S512 is performed. If the user does not agree, the following step S515' is performed.

Figure 7:
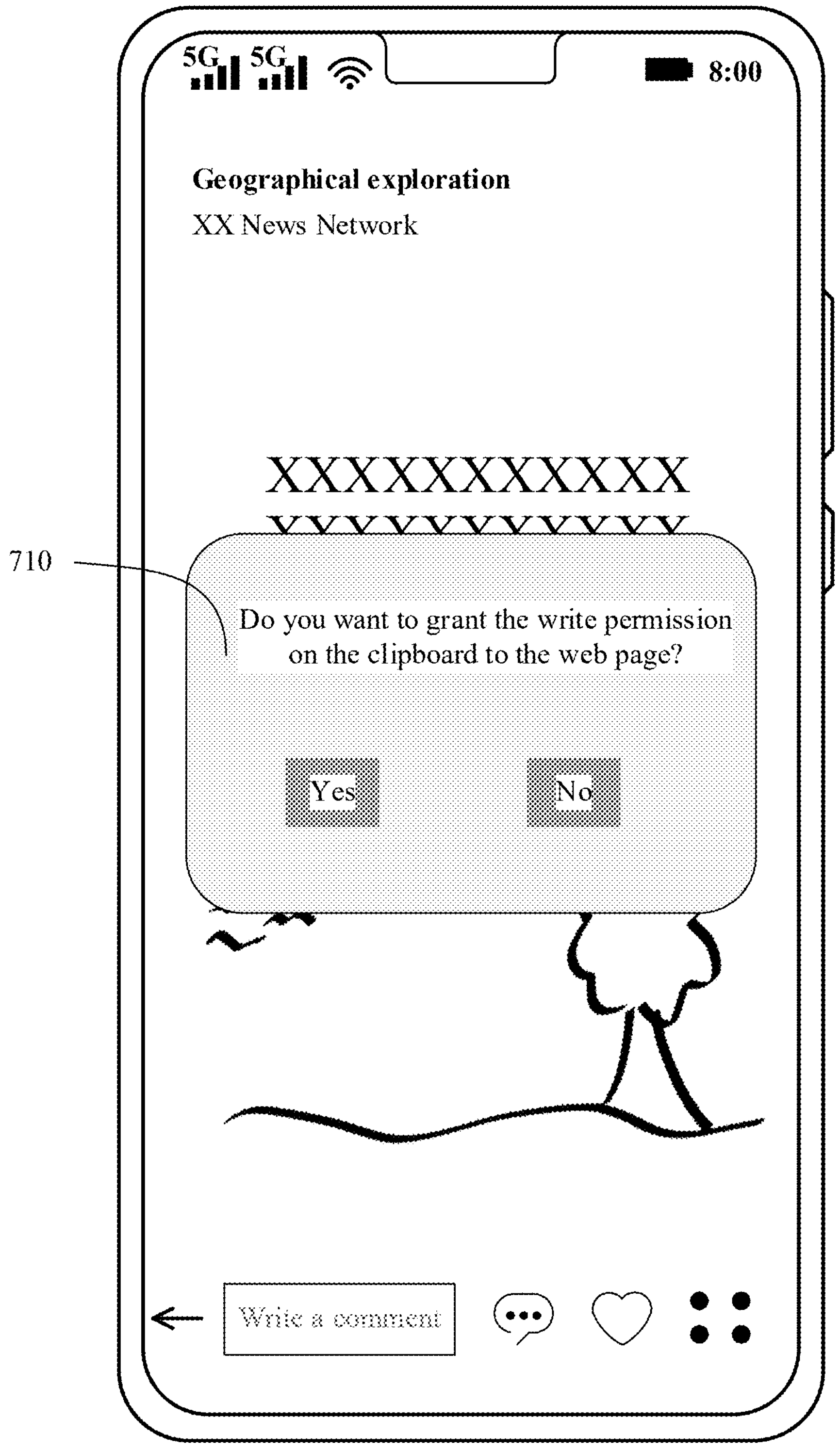
FIG. 7 is a schematic diagram of a user interface on which an electronic device prompts, by using a browser application, a user whether to grant write permission on a clipboard to a web page according to an embodiment of this application.

For example, when the browser application of the electronic device 100 determines, based on the stored clipboard setting information, that the browser application does not have the permission to write the content 1 into the clipboard, the electronic device 100 may display a window 710 shown as an example in FIG. 7. The window may prompt the user that the web page 1 needs to be granted the write permission on the clipboard (for example, prompting the user whether to grant the write permission on the clipboard to the web page). In addition, the browser application of the electronic device 100 may further determine whether the user agrees to grant the write permission on the clipboard to the web page 1. If the user agrees (for example, the user taps a "yes" option in the window 710), the web page 1 may be granted the write permission on the clipboard (for example, the permission on the clipboard is set to the read and write permission), it may be preliminarily determined that the browser application has the permission to write the content 1 into the clipboard, and the following step S512 may be performed. If the user does not agree (for example, the user taps a "no" option in the window 710), the web page 1 cannot be granted the write permission on the clipboard, and it may be determined that the browser application does not have the permission to write the content 1 into the clipboard, that is, the following step S515' is performed, and the content 1 is not written into the clipboard.

Step S509 to step S511 may be implemented by the browser application of the electronic device 100 by executing the following code:

```
function requireClipboardWriteRight( ) {
    var curLvl=readCurrentClipboardRight( ); //Read the permission that
is granted to the current clipboard and that is set by the user
  if(curLvl == "ro") {
        alert("Pls set Write to current site") //Display a pop-up window to
indicate that the user needs to grant the write permission on the clipboard
to the current web page
  setClipboardRight("rw"); //Set the permission granted by the clipboard
to the current web page to read and write
      }
      }
```

It is easy to understand that the foregoing step S509 may be implemented by the electronic device 100 by executing "var curLvl=readCurrentClipboardRight( ); if(curLvl=="ro")" in the foregoing code. In step S510, "prompting the user to grant the write permission on the clipboard to the web page 1" may be implemented by the electronic device 100 by executing "alert ("Pls set Write to current site")" in the foregoing code. After the user agrees to grant the write permission on the clipboard to the web page 1, the setting the permission on the clipboard to the read and write permission may be implemented by the electronic device 100 by executing "setClipboardRight("rw") in the foregoing code.

S512: The browser application of the electronic device 100 detects whether the content 1 includes illegal, malicious, promotion, or privacy information. If the content 1 includes the illegal, malicious, promotion, or privacy information, the following step S513 is performed. If the content 1 does not include the illegal, malicious, promotion, or privacy information, the following step S515 is performed.

Specifically, since the clipboard setting information is stored in the foregoing step S503, when step S512 is triggered to be performed, the browser application of the electronic device 100 may detect, by using a built-in detection tool or a third-party detection tool based on the detection tool and prompt setting information of the clipboard in the stored clipboard setting information, whether the content 1 includes the illegal, malicious, promotion, or privacy information. If the content 1 includes the illegal, malicious, promotion, or privacy information (for example, the content 1 includes one or more types of the illegal, malicious, promotion, or privacy information), the following step S513 may be performed to prompt the user that the web page 1 has abnormal behavior. If the content 1 does not include the illegal, malicious, promotion, or privacy information (for example, the content 1 does not include any type of the illegal, malicious, promotion, or privacy information), the following step S515 may be performed, and the content 1 is written into the clipboard.

S513 and S514: The browser application of the electronic device 100 prompts the user that the web page 1 has the abnormal behavior, and determines whether the user prevents the abnormal behavior of the web page 1. If the user prevents the abnormal behavior of the web page 1, the following step S515' is performed. If the user does not prevent the abnormal behavior of the web page 1, the following step S515 is performed.

Figure 8:
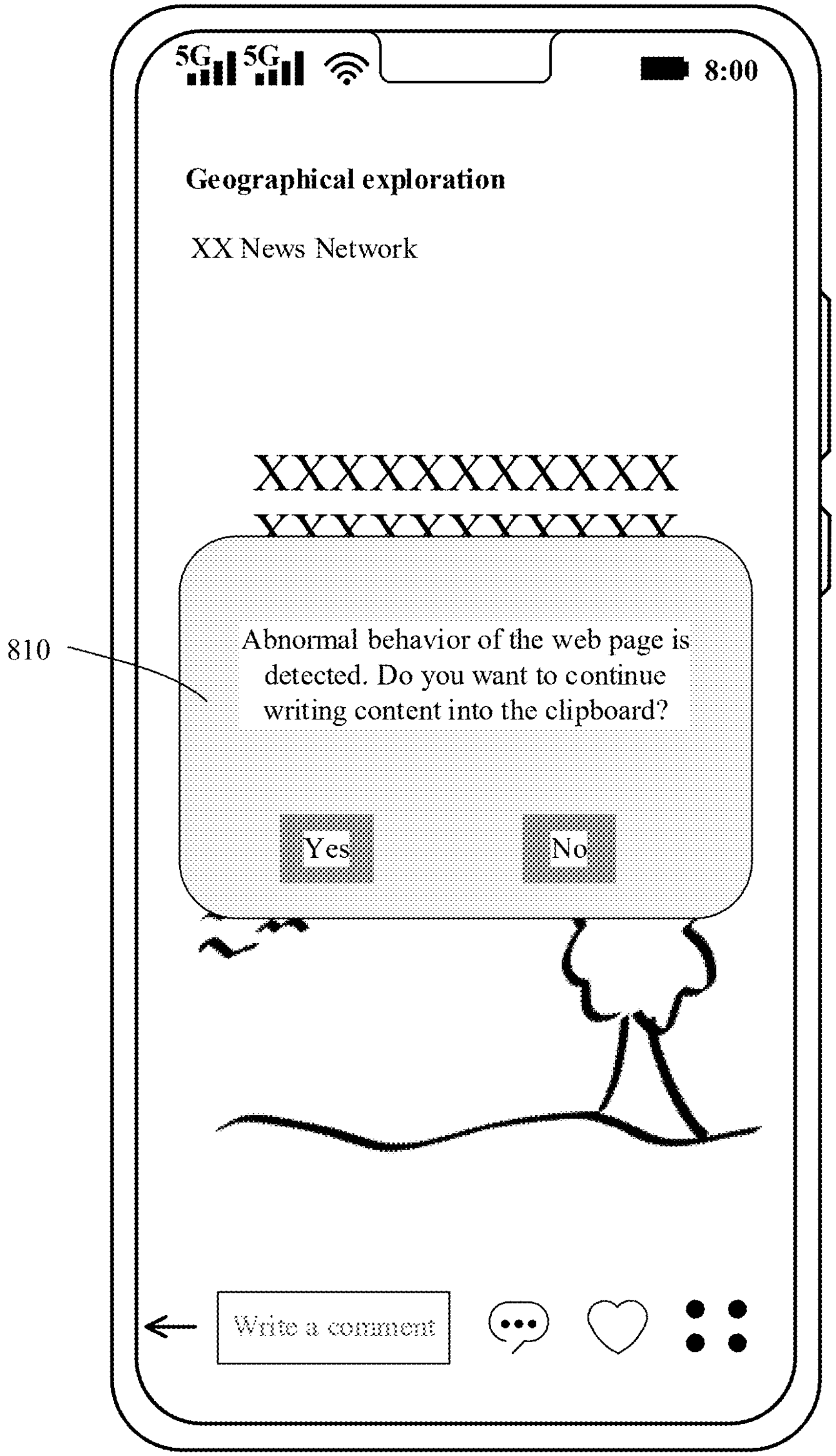
FIG. 8 is a schematic diagram of a user interface on which an electronic device prompts, by using a browser application, a user whether to continue writing content into a clipboard when abnormal behavior of a web page is detected according to an embodiment of this application.

For example, when the browser application of the electronic device 100 detects that the content 1 includes one or more types of the illegal, malicious, promotion, or privacy information, the electronic device 100 may display a window 810 shown as an example in FIG. 8. The window may prompt the user that the web page 1 has the abnormal behavior (for example, prompting the user whether to continue writing content into the clipboard when the abnormal behavior of the web page is detected). In addition, the browser application of the electronic device 100 may further determine whether the user prevents the abnormal behavior of the web page 1. If the user prevents the abnormal behavior of the web page 1 (for example, the user taps a "yes" option in the window 810), the following step S515' may be performed, and the content 1 is not written into the clipboard. If the user does not prevent the abnormal behavior of the web page 1 (for example, the user taps a "no" option in the window 810), the following step S515 may be performed, and the content 1 is written into the clipboard.

In some examples, step S512 to step S514 may be performed before step S509 (that is, step S512 is performed after step S508 is performed). If the user does not agree to prevent the abnormal behavior of the web page 1, the foregoing step S509 may be performed to determine whether the browser application has the permission to write the content 1 into the clipboard. If the browser application has the permission to write the content 1 into the clipboard, the following step S515 is performed. If the browser application does not have the permission to write the content 1 into the clipboard, the following step S515' is performed.

In some other examples, step S512 to step S514 may not be performed. That is, in step S511, it is determined whether the user agrees to grant the write permission on the clipboard to the web page 1. If the user agrees, the following step S515 may be directly performed, and step S512 to step S514 do not need to be performed.

S515: The browser application of the electronic device 100 writes the content 1 into the clipboard.

S515': The browser application of the electronic device 100 does not write the content 1 into the clipboard.

The user may check whether the browser application of the electronic device 100 writes the content 1 into the clipboard. For a specific implementation, refer to the related text description of "a possible implementation in which the user checks whether the content 1 is written into the clipboard" in step S106. Details are not described herein again.

S516 and S517: The browser application of the electronic device 100 detects an operation of closing the web page 1 by the user, and in response to the operation, the browser application of the electronic device 100 closes the web page 1, and clears the content 1 written into the clipboard.

Specifically, because the clipboard setting information is stored in the foregoing step S503, after the browser application of the electronic device 100 detects the operation of closing the web page 1 by the user, the browser application of the electronic device 100 may determine, based on the life cycle policy setting information of the clipboard in the stored clipboard setting information, whether the life cycle policy of the clipboard is set to "auto clear", or "default", or "restore". If the life cycle policy of the clipboard is set to "auto clear", the browser application of the electronic device 100 may automatically clear the content written into the clipboard (including the content 1 and other written content, that is, all written content on the clipboard). If the life cycle policy of the clipboard is set to "default", the browser application of the electronic device 100 may still retain the content written into the clipboard (including the content 1 and other written content, that is, all written content on the clipboard). If the life cycle policy of the clipboard is set to "restore", the browser application of the electronic device 100 may retain only content on the clipboard when the web page is accessed (that is, the content 1 is cleared but the content on the clipboard when the web page is accessed is retained).

It is easy to understand that, to better protect privacy of the user, the user is advised to set the life cycle policy of the clipboard to "auto clear". Therefore, in some examples, when the life cycle policy that is of the clipboard and that is set by the user is not "auto clear" but another policy (for example, "default"), the browser application of the electronic device 100 may prompt the user to set the life cycle policy of the clipboard to "auto clear" when the user closes the web page. For example, the electronic device 100 may display a window 910 shown as an example in FIG. 9. The window may prompt the user to set the life cycle policy of the clipboard to "auto clear". In addition, the browser application of the electronic device 100 may further determine whether the user agrees to set the life cycle policy of the clipboard to "auto clear". If the user agrees (for example, the user taps a "yes" option in the window 910), the browser application of the electronic device 100 may set the life cycle policy of the clipboard to "auto clear", and automatically clear all content written into the clipboard. If the user does not agree (for example, the user taps a "no" option in the window 910), the browser application of the electronic device 100 does not set the life cycle policy of the clipboard to "auto clear", still retains the life cycle policy that is of the clipboard and that is previously set by the user, and performs a corresponding operation based on the life cycle policy that is of the clipboard and that is previously set by the user (for example, if the life cycle policy that is of the clipboard and that is previously set by the user is "default", the content on the clipboard is still retained; for another example, if the life cycle policy that is of the clipboard and that is previously set by the user is "restore", only the content on the clipboard when the web page is accessed is retained).

Figure 9:
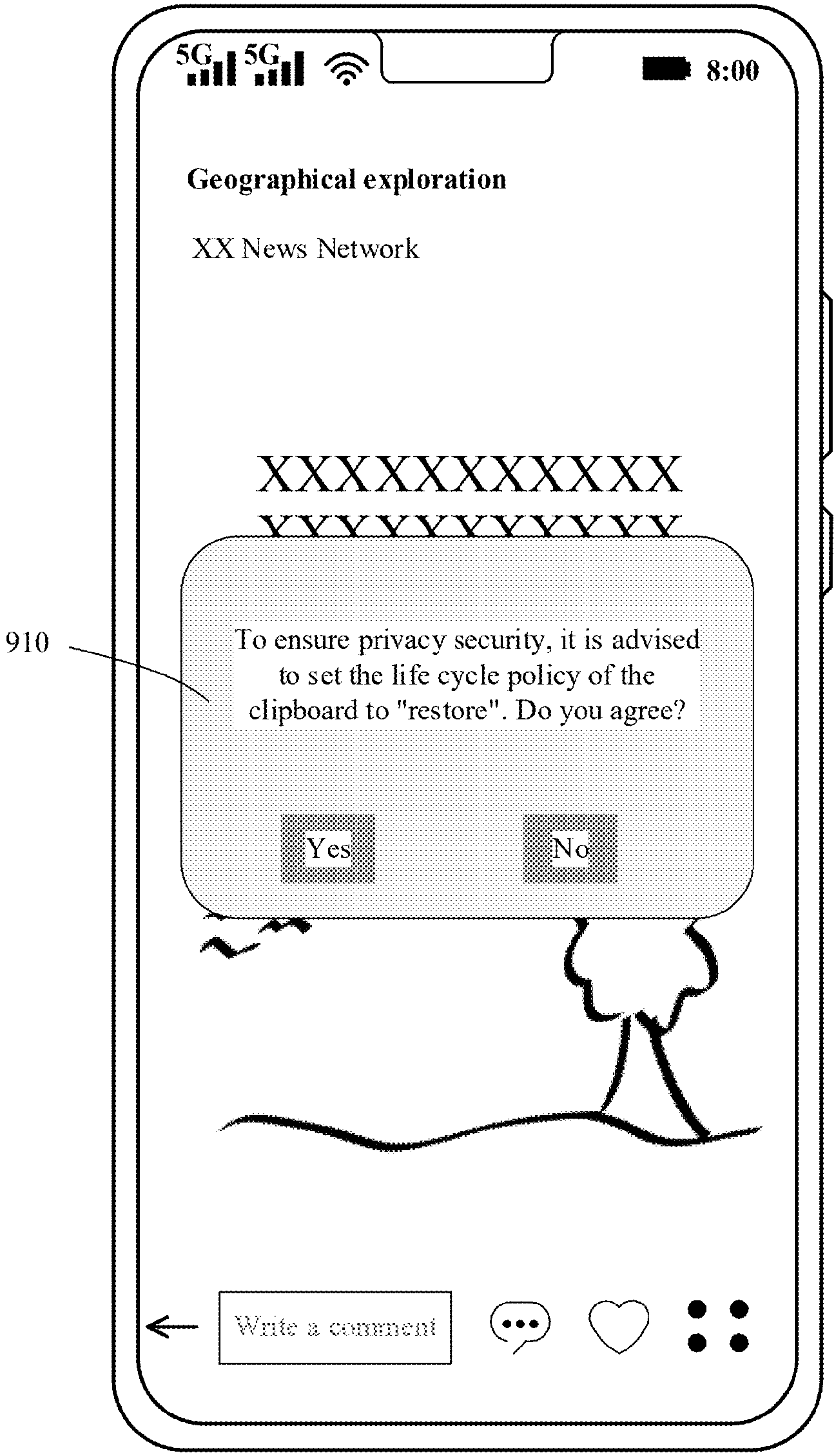
FIG. 9 is a schematic diagram of a user interface on which an electronic device prompts, when closing a web page by using a browser application, a user to set a life cycle policy of a clipboard to "auto clear" according to an embodiment of this application.

In some examples, similar to the window 910 shown in FIG. 9, when the life cycle policy of the clipboard is not "restore" but another policy (for example, "default"), the user may be prompted to set the life cycle policy of the clipboard to "restore" (for example, to ensure privacy security, it is advised to set the life cycle policy of the clipboard to "restore". Do you agree?).

The foregoing process of prompting the user and setting the life cycle policy of the clipboard to "auto clear" may be implemented by the browser application of the electronic device 100 by executing the following code:

```
function requireClipboardAutoclearLifePolicy ( ) {
  var curLifePolicy=readCurrentClipboardLifePolicy( ); //Read the life
cycle policy that is of the current clipboard and that is set by the user
if(curLifePolicy == "default") {
```

-continued

```
        alert("Pls set Auto-clear to current site") //Display a pop-up win-
dow
   to prompt the user to set the life cycle policy of the clipboard to auto
   clear
   setClipboardLifePolicy("auto-clear"); //Set the life cycle policy of
clipboard content to auto clear after the current page is closed
      }
    }
```

It is easy to understand that after the browser application of the electronic device 100 detects the operation of closing the web page 1 by the user, the electronic device 100 may read the current life cycle policy of the clipboard by executing "var curLifePolicy=readCurrentClipboardLifePolicy( ); if(curLifePolicy=="default")" in the foregoing code. If the current life cycle policy of the clipboard is "default", the electronic device 100 may prompt the user to set the life cycle policy of the clipboard to "auto clear" by executing "alert("Pls set Auto-clear to current site")" in the foregoing code. When the user agrees to set the life cycle policy of the clipboard to "auto clear", the electronic device 100 may execute "setClipboardLifePolicy("auto-clear") in the foregoing code to set the life cycle policy of the clipboard to auto clear.

The method according to the embodiment shown in FIG. 5A and FIG. 5B is implemented, so that in the scenario in which the user accesses the web page through the browser application, the server 200 may generate the information about the web page based on the extended HTML and the extended JS script, and mark whether the web page requires the read and write permission on the clipboard. The electronic device 100 may provide the user with a capability of setting the clipboard (for example, clipboard permission setting, detection tool and prompt setting, and life cycle policy setting). When the user accesses the web page through the browser application, the electronic device 100 may obtain the information about the web page from the server 200, can support the extended HTML and the extended JS script, and can achieve the following technical effects.

1. In the case of attempting to read the content on the clipboard or attempting to write the content into the clipboard, the clipboard permission set by the user may be read, and the user may be explicitly prompted (for example, in a form of a pop-up window) whether to grant the related permission on the clipboard. The content on the clipboard can be read and/or the content can be written into the clipboard only after the explicit consent of the user is obtained. In this way, the user can control whether the web page can read the content on the clipboard or write the content into the clipboard, to prevent user information leakage caused by arbitrary reading of content on the clipboard by some web pages, or writing content into the clipboard for malicious promotion, and improve a user privacy protection effect. Therefore, a problem that the web page reads the content on the clipboard or writes the content into the clipboard without the user's consent and without the user's control is resolved.

2. In the case of attempting to write the content into the clipboard, a corresponding detection tool (for example, the built-in detection tool or the third-party detection tool) may be used to detect, based on the detection tool and the prompt that are of the clipboard and that are set by the user, whether the content that attempts to be written into the clipboard includes the illegal, malicious, promotion, or privacy information. If the content includes the illegal, malicious, promotion, or privacy information, the user may be prompted that the web page has abnormal behavior and whether to continue writing the content into the clipboard. If the user chooses to refuse to write the content into the clipboard, the content is not allowed to be written into the clipboard. In this way, after the write permission on the clipboard is obtained, content may be detected to avoid the content including the illegal, malicious, promotion, or privacy information from being written into the clipboard, better protect user privacy, avoid serious consequences, and ensure normal browsing experience of the user.

3. When closing the web page or jumping to another web page/application, the user may determine, based on the life cycle policy that is of the clipboard and that is set by the user, whether the content written into the clipboard needs to be automatically cleared. In this way, the user may control whether the content written into the clipboard is automatically cleared. Therefore, the content written into the clipboard can be prevented from being leaked to the another web page/application, and a risk of information leakage can be reduced.

Scenario 2: A User Accesses a Web Page by Using a Browser-Like Application

The following describes a specific execution process of the privacy protection method according to embodiments of this application in a scenario in which the user accesses the web page by using the browser-like application.

Figure 10A:
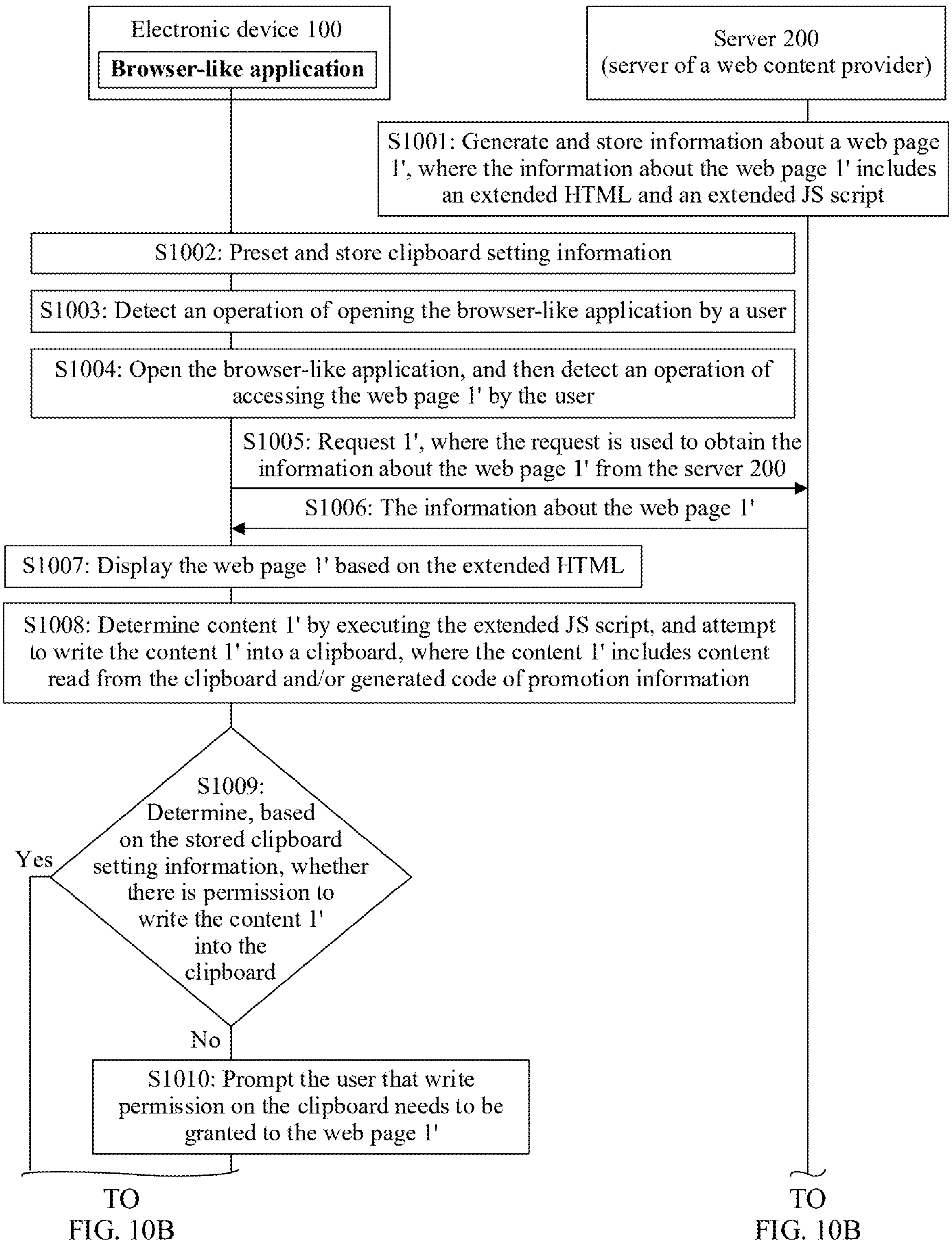
FIG. 10A and FIG. 10B are a schematic flowchart of a privacy protection method in a scenario in which a user accesses a web page by using a browser-like application (namely, another application with a browser capability other than a browser application) according to an embodiment of this application.
Figure 10B:
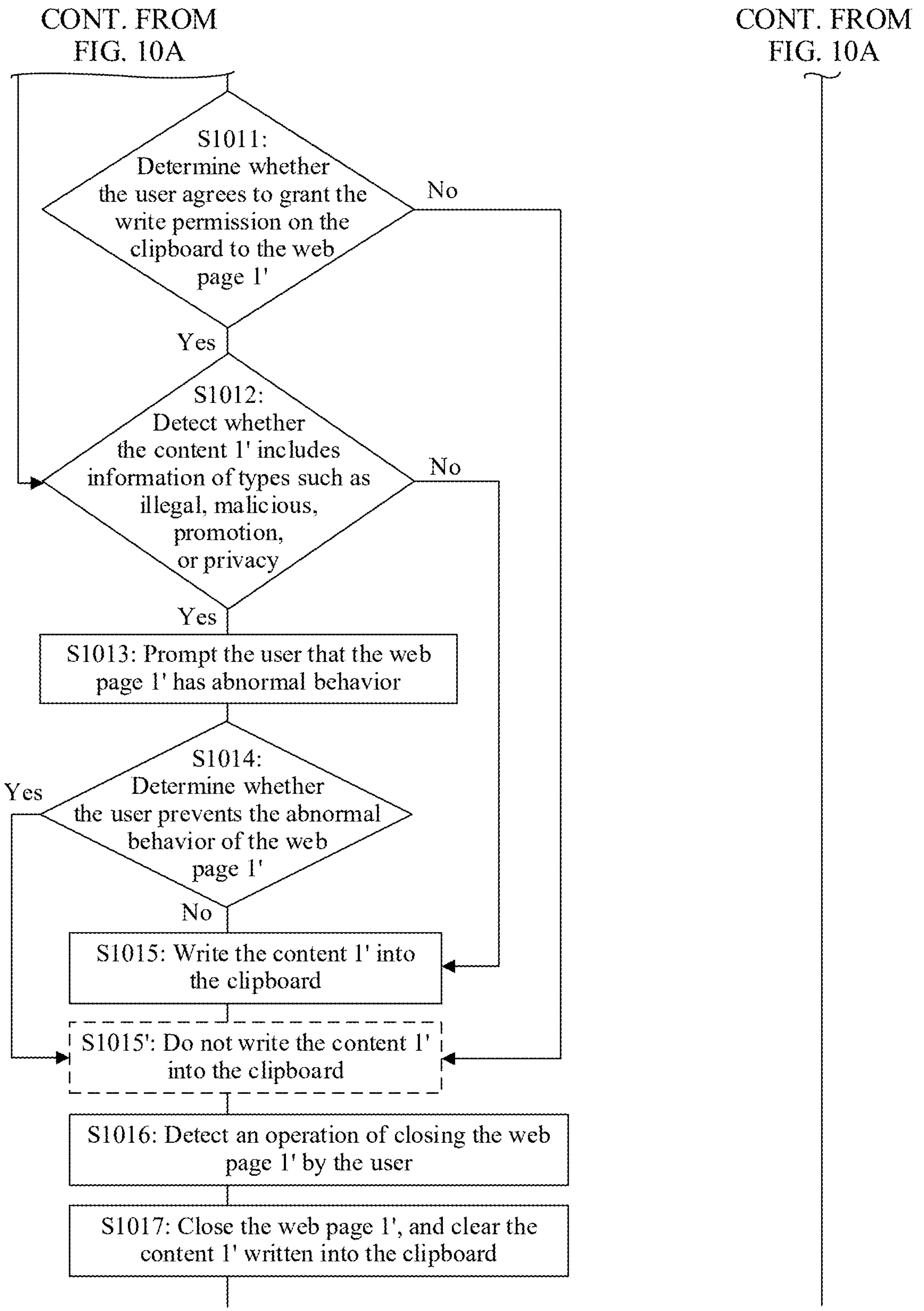

FIG. 10A and FIG. 10B are an example of a specific process of the privacy protection method in the scenario in which the user accesses the web page by using the browser-like application according to an embodiment of this application.

As shown in FIG. 10A and FIG. 10B, the method may be applied to a communication system that includes an electronic device 100 and a server 200. The browser-like application may be installed on the electronic device 100, and the server 200 may be a server of a web content provider. Both the electronic device 100 and the server 200 may support an extended HTML and an extended JS script. Specific steps of the method are described in detail below.

S1001: The server 200 generates and stores information about a web page 1', where the information about the web page 1' includes an extended HTML and an extended JS script.

Step S1001 is similar to step S501 shown in FIG. 5A. For a specific execution process of step S1001, refer to related text descriptions in step S501 shown in FIG. 5A. Details are not described herein again.

S1002: The browser-like application of the electronic device 100 presets and stores clipboard setting information.

Generally, the browser-like application of the electronic device 100 does not provide a user interface for setting a clipboard by the user. Therefore, the browser-like application of the electronic device 100 may preset the clipboard setting information (for example, permission setting information of the clipboard, detection tool and prompt setting information of the clipboard, and life cycle policy setting information of the clipboard), and store the clipboard setting information.

In some examples, the clipboard setting information in the browser-like application may be generated by the system for general setting for webview.

For example, the browser-like application of the electronic device 100 may set the permission setting information of the clipboard in advance that all websites are granted read only permission on the clipboard. If write permission on the clipboard is required, a pop-up window is displayed to prompt the user whether to grant the write permission on the clipboard.

For example, the browser-like application of the electronic device 100 may perform detection tool and prompt setting of the clipboard in advance. A detection tool may be a built-in detection tool/a third-party detection tool. The prompt setting may prompt the user whether to prevent writing of content into the clipboard when it is detected that the content attempted to be written includes illegal, malicious, promotion, or privacy information.

For example, the browser-like application of the electronic device 100 may set life cycle policy setting information of the clipboard to "auto clear" in advance, content on the clipboard may be automatically cleared after the user closes the web page, and the user does not need to manually clear the content on the clipboard.

In some examples, the browser-like application the electronic device 100 may also be the same as the browser application shown in FIG. 5A and FIG. 5B, and may provide a user interface for setting the clipboard for the user, and the user may independently set the clipboard. For a specific setting process, refer to related text descriptions of step S502 and step S503 shown in FIG. 5A. Details are not described herein again.

S1003 to S1006: The browser-like application of the electronic device 100 detects an operation of opening the browser-like application by the user. In response to the operation, the electronic device 100 opens the browser-like application. Then, the browser-like application of the electronic device 100 detects an operation of accessing the web page 1' by the user. In response to the operation, the browser-like application of the electronic device 100 may send a request 1' to the server 200, where the request is used to obtain the information about the web page 1' from the server 200. After receiving the request 1', the server 200 may send the information about the web page 1' to the browser application of the electronic device 100.

Specifically, for example, the browser-like application is a chat application. The electronic device 100 may detect the operation of opening the browser-like application by the user (for example, the user taps an icon of the chat application shown in FIG. 2A). In response to the operation, the electronic device 100 may open the browser-like application, and display a user interface 1110 shown as an example in FIG. 11A, where the user interface may be a user interface provided by the browser-like application.

Figure 11A:
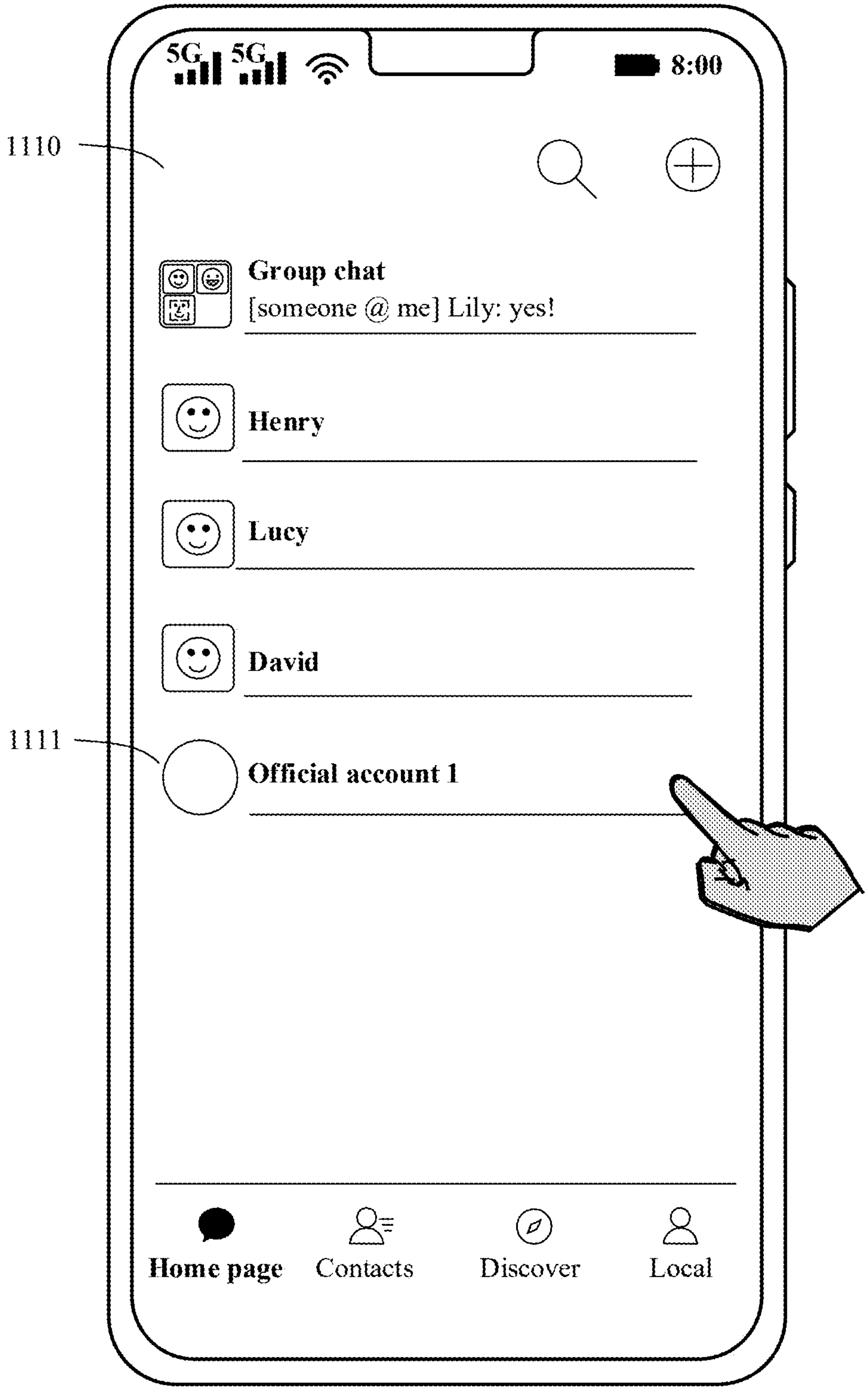
FIG. 11A to FIG. 11C are schematic diagrams of a group of user interfaces in a process in which a user accesses a web page by using a browser-like application according to an embodiment of this application.

As shown in FIG. 11A, the user interface 1110 may include options corresponding to one or more official accounts (for example, an option 1111, where the option 1111 may be an option corresponding to an official account 1). For example, the electronic device 100 may detect an operation (for example, a tap operation) performed by the user on the option 1111. In response to the operation, the electronic device 100 may display a user interface 1120 shown as an example in FIG. 11B.

Figure 11B:
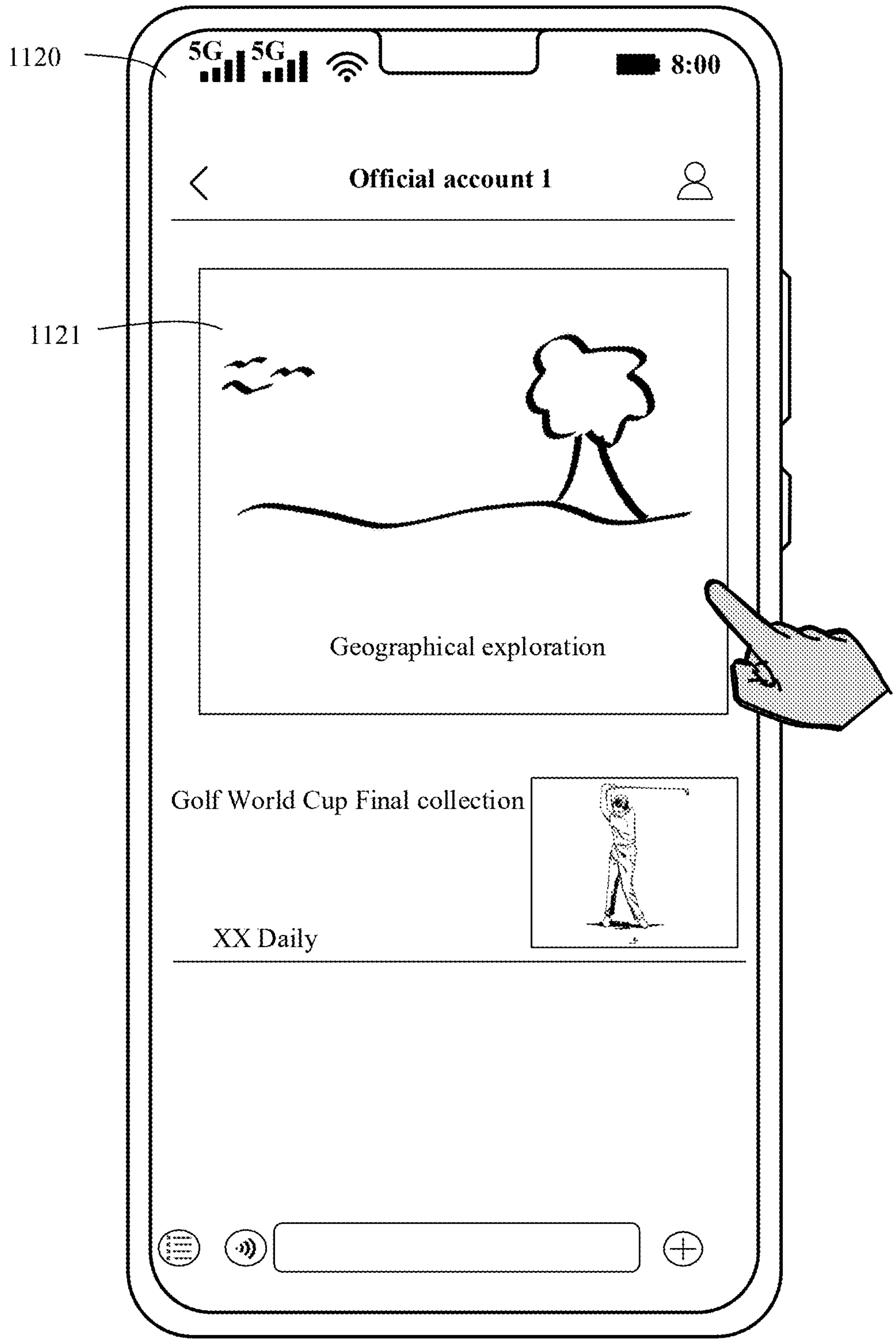

As shown in FIG. 11B, the user interface 1120 may be the user interface corresponding to the official account 1. The user interface may include one or more options (for example, an option 1121) corresponding to push messages of the official account 1. The user may access a web page (for example, a web page corresponding to the option 1121 may be a "geographical exploration" web page) corresponding to the option by tapping the corresponding option to view specific content on the push message. For example, the web page 1' is a "geographical exploration" web page. The browser-like application of the electronic device 100 may detect an operation (for example, an operation of tapping the option 1121 by the user) of accessing the web page 1' by the user. In response to the operation, the browser-like application of the electronic device 100 may send the request 1' to the server 200, where the request is used to obtain the information about the web page 1' from the server 200. After receiving the request 1', the server 200 may send the information about the web page 1' to the browser-like application of the electronic device 100. The information about the web page 1' may include the extended HTML and the extended JS script.

In some examples, a browser-like application of the electronic device 100 may also support the user to access a web page through an applet. The applet may be an application that can be used without being downloaded or installed, and may be invoked by the browser-like application.

S1007: The browser-like application of the electronic device 100 displays the web page 1' based on the extended HTML.

Specifically, after the browser-like application of the electronic device 100 obtains the information about the web page 1' from the server 200 (that is, download the information about the web page 1' locally), the browse-like application of the electronic device 100 may parse the information about the web page 1', render content on the web page 1' based on the extended HTML included in the information about the web page 1', and display the web page 1'.

Figure 11C:
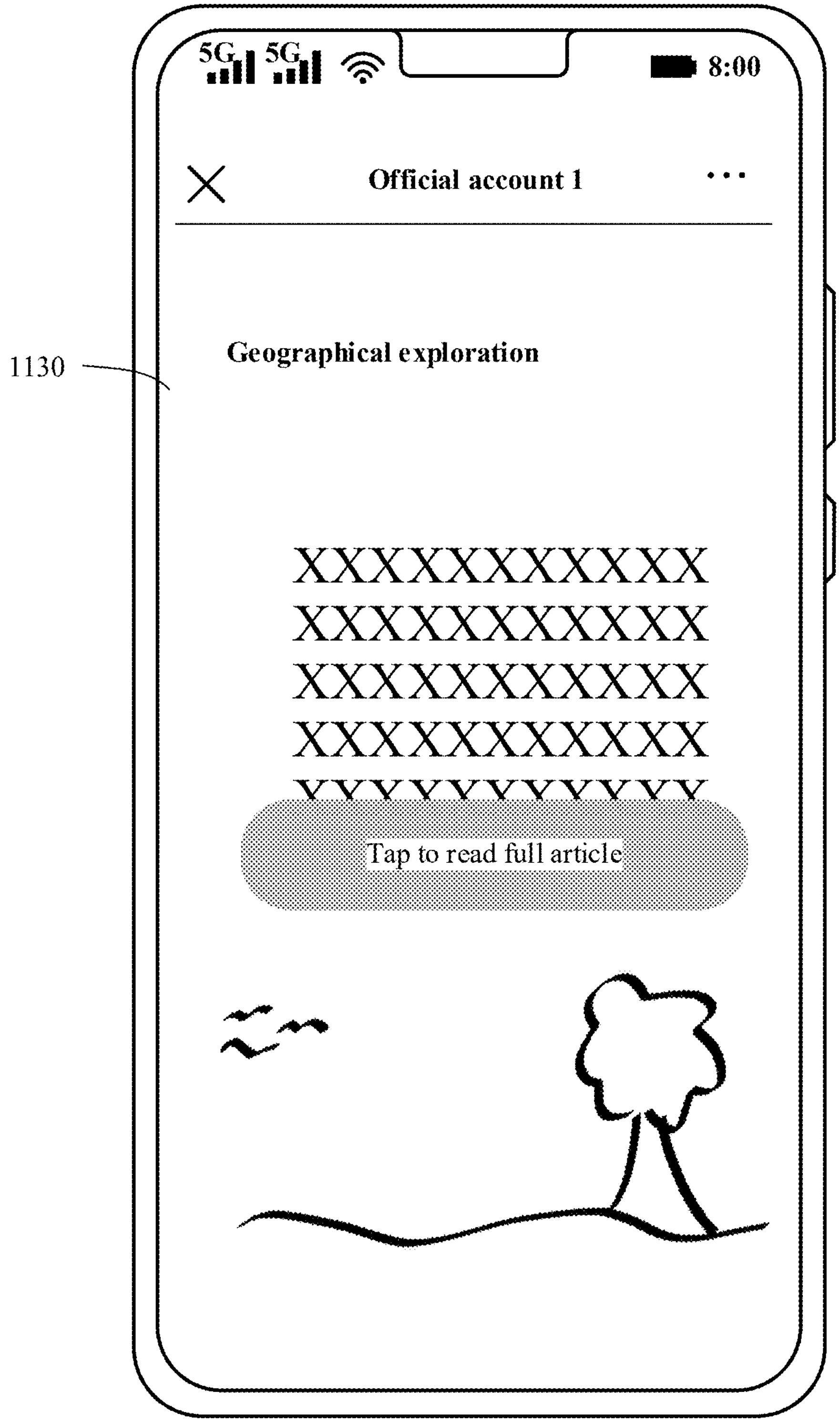

For example, as shown in FIG. 11C, a user interface 1130 shown in FIG. 11C may be a user interface used by the electronic device 100 to display the web page 1'. The user interface 1130 is similar to the user interface 230 shown in FIG. 2C. For a description of the user interface 1130, refer to the foregoing related content. Details are not described herein again.

S1008: The browser-like application of the electronic device 100 determines content 1' by executing the extended JS script, and attempts to write the content 1' into the clipboard, where the content 1' may include content read from the clipboard and/or generated code of the promotion information.

S1009: The browser-like application of the electronic device 100 determines, based on the stored clipboard setting information, whether the browser-like application has permission to write the content 1' into the clipboard. If the browser-like application has the permission, the following step S1012 is performed. If the browser-like application does not have the permission, the following step S1010 is performed.

Step S1008 and step S1009 are similar to step S508 and step S509 shown in FIG. 5A. For a specific execution process of step S1008 and step S1009, refer to related text descriptions in step S508 and step S509 shown in FIG. 5A. Details are not described herein again.

S1010 and S1011: The browser-like application of the electronic device 100 prompts the user that the write permission on the clipboard needs to be granted to the web page 1', and determines whether the user agrees to grant the write permission on the clipboard to the web page 1'. If the user agrees, the following step S1012 is performed. If the user does not agree, the following step S1015' is performed.

Figure 12:
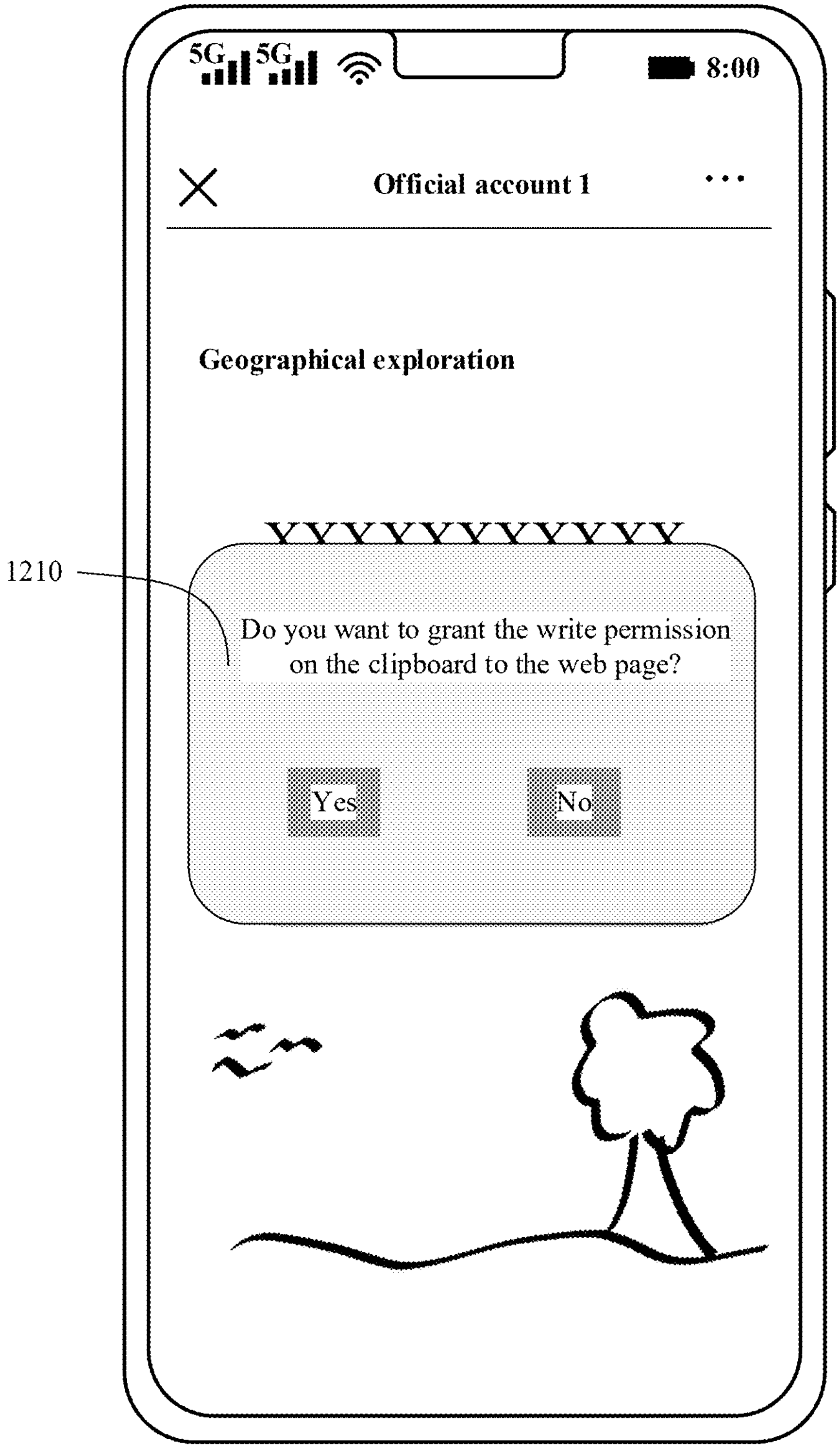
FIG. 12 is a schematic diagram of a user interface on which an electronic device prompts, by using a browser-like application, a user whether to grant write permission on a clipboard to a web page according to an embodiment of this application.

For example, when the browser-like application of the electronic device 100 determines, based on the stored clipboard setting information, that the browser-like application does not have the permission to write the content 1' into the clipboard, the electronic device 100 may display a window 1210 shown as an example in FIG. 12. The window may prompt the user that the web page 1' needs to be granted the write permission on the clipboard (for example, prompting the user whether to grant the write permission on the clipboard to the web page). In addition, the browser-like application of the electronic device 100 may further determine whether the user agrees to grant the write permission on the clipboard to the web page 1'. If the user agrees (for example, the user taps a "yes" option in the window 1210), the web page 1' may be granted the write permission on the clipboard (for example, the permission on the clipboard is set to the read and write permission), it may be preliminarily determined that the browser-like application has the permission to write the content 1' into the clipboard, and the following step S1012 may be performed. If the user does not agree (for example, the user taps a "no" option in the window 1210), the web page 1' cannot be granted the write permission on the clipboard, and it may be determined that the browser-like application does not have the permission to write the content 1' into the clipboard, that is, the following step S1015' is performed, and the content 1' is not written into the clipboard.

S1012: The browser-like application of the electronic device 100 detects whether the content 1' includes illegal, malicious, promotion, or privacy information. If the content 1' includes the illegal, malicious, promotion, or privacy information, the following step S1013 is performed. If the content 1' does not include the illegal, malicious, promotion, or privacy information, the following step S1015 is performed.

Step S1012 is similar to step S512 shown in FIG. 5B. For a specific execution process of step S1012, refer to related text descriptions in step S512 shown in FIG. 5B. Details are not described herein again.

S1013 and S1014: The browser-like application of the electronic device 100 prompts the user that the web page 1' has the abnormal behavior, and determines whether the user prevents the abnormal behavior of the web page 1'. If the user prevents the abnormal behavior of the web page 1', the following step S1015' is performed. If the user does not prevent the abnormal behavior of the web page 1', the following step S1015 is performed.

Figure 13:
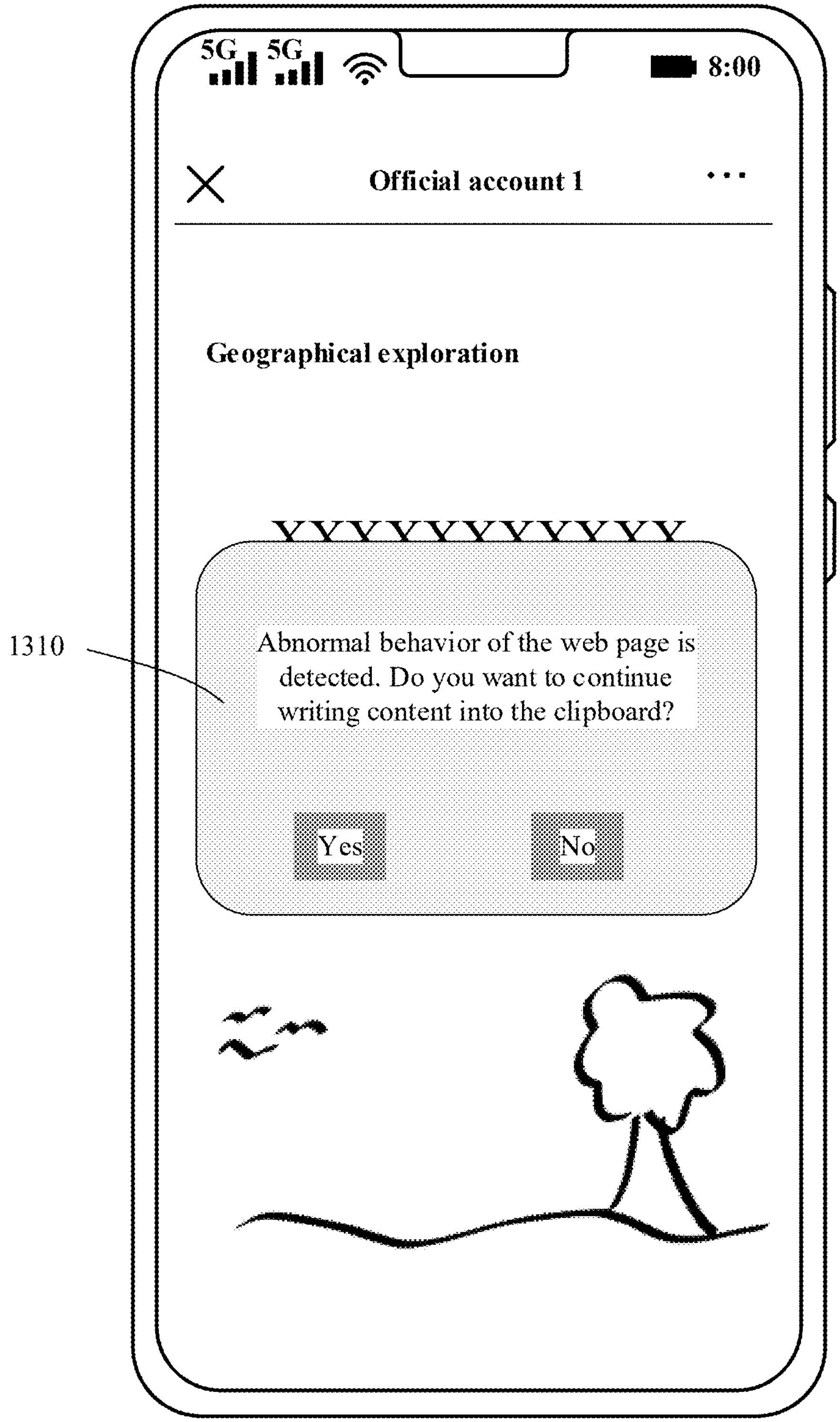
FIG. 13 is a schematic diagram of a user interface on which an electronic device prompts, by using a browser-like application, a user whether to continue writing content into a clipboard when abnormal behavior of a web page is detected according to an embodiment of this application.

For example, when the browser-like application of the electronic device 100 detects that the content 1' includes one or more types of the illegal, malicious, promotion, or privacy information, the electronic device 100 may display a window 1310 shown as an example in FIG. 13. The window may prompt the user that the web page 1' has the abnormal behavior (for example, prompting the user whether to continue writing content into the clipboard when the abnormal behavior of the web page is detected). In addition, the browser-like application of the electronic device 100 may further determine whether the user prevents the abnormal behavior of the web page 1'. If the user prevents the abnormal behavior of the web page 1' (for example, the user taps a "yes" option in the window 1310), the following step S1015' may be performed, and the content 1' is not written into the clipboard. If the user does not prevent the abnormal behavior of the web page 1' (for example, the user taps a "no" option in the window 1310), the following step S1015 may be performed, and the content 1' is written into the clipboard.

In some examples, step S1012 to step S1014 may be performed before step S1009 (that is, step S1012 is performed after step S1008 is performed). If the user does not agree to prevent the abnormal behavior of the web page 1, the foregoing step S1009 may be performed to determine whether the browser-like application has the permission to write the content 1' into the clipboard. If the browser-like application has the permission to write the content 1' into the clipboard, the following step S1015 is performed. If the browser-like application does not have the permission to write the content 1' into the clipboard, the following step S1015' is performed.

In some other examples, step S1012 to step S1014 may not be performed. That is, in step S1011, it is determined whether the user agrees to grant the write permission on the clipboard to the web page 1'. If the user agrees, the following step S1015 may be directly performed, and step S1012 to step S1014 do not need to be performed.

S1015: The browser-like application of the electronic device 100 writes the content 1' into the clipboard.

S1015': The browser-like application of the electronic device 100 does not write the content 1' into the clipboard.

S1016 and S1017: The browser-like application of the electronic device 100 detects an operation of closing the web page 1' by the user, and in response to the operation, the browser-like application of the electronic device 100 closes the web page 1', and clears the content 1' written into the clipboard.

Step S1015 to step S1017 are similar to step S515 to step S517 shown in FIG. 5B. For a specific execution process of step S1015 to step S1017, refer to related text descriptions in step S515 to step S517 shown in FIG. 5B. Details are not described herein again.

It is easy to understand that, to better protect privacy of the user, in this embodiment of this application, the life cycle policy that is of the clipboard and that is preset by the browser-like application of the electronic device 100 may be "auto clear".

In some examples, the browser-like application of the electronic device 100 may also provide the user interface for setting the clipboard for the user. It is easy to understand that, to better protect privacy of the user, the user is advised to set the life cycle policy of the clipboard to "auto clear". Therefore, when the life cycle policy that is of the clipboard and that is set by the user is not "auto clear" but another policy (for example, "default"), the browser-like application of the electronic device 100 may prompt the user to set the life cycle policy of the clipboard to "auto clear" when the user closes the web page. For example, the electronic device 100 may display a window 1410 shown as an example in FIG. 14. The window may prompt the user to set the life cycle policy of the clipboard to "auto clear". In addition, the browser-like application of the electronic device 100 may further determine whether the user agrees to set the life cycle policy of the clipboard to "auto clear". If the user agrees (for example, the user taps a "yes" option in the window 1410), the browser-like application of the electronic device 100 may set the life cycle policy of the clipboard to "auto clear", and automatically clear all content written into the clipboard. If the user does not agree (for example, the user taps a "no" option in the window 1410), the browser-like application of the electronic device 100 does not set the life cycle policy of the clipboard to "auto clear", still retains the life cycle policy that is of the clipboard and that is previously set by the user, and performs a corresponding operation based on the life cycle policy that is of the clipboard and that is previously set by the user (for example, if the life cycle policy that is of the clipboard and that is previously set by the user is "default", the content on the clipboard is still retained; for another example, if the life cycle policy that is of the clipboard and that is previously set by the user is "restore", only the content on the clipboard when the web page is accessed is retained).

Figure 14:
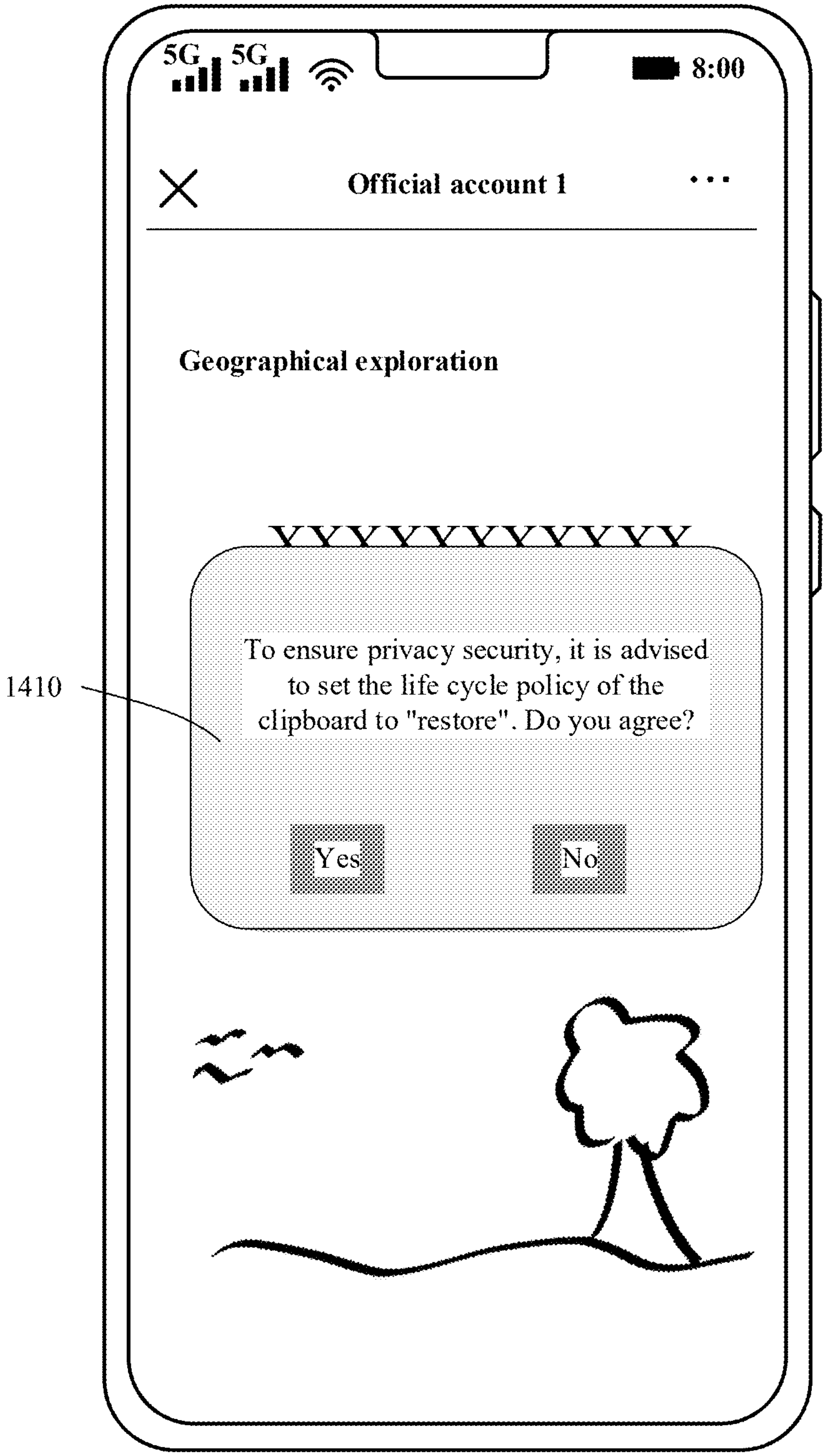
FIG. 14 is a schematic diagram of a user interface on which an electronic device prompts, when closing a web page by using a browser-like application, a user to set a life cycle policy of a clipboard to "auto clear" according to an embodiment of this application.

In some examples, similar to the window 1410 shown in FIG. 14, when the life cycle policy of the clipboard is not "restore" but another policy (for example, "default"), the user may be prompted to set the life cycle policy of the clipboard to "restore" (for example, to ensure privacy security, it is advised to set the life cycle policy of the clipboard to "restore". Do you agree?).

The method according to the embodiment shown in FIG. 10A and FIG. 10B is implemented, so that in the scenario in which the user accesses the web page through the browser-like application, the server 200 may generate the information about the web page based on the extended HTML and the extended JS script, and mark whether the web page requires the read and write permission on the clipboard. The browser-like application of the electronic device 100 may preset and store the clipboard setting information (for example, the permission setting information of the clipboard, detection tool and prompt setting information, life cycle policy setting information). When the user accesses the web page through the browser-like application, the electronic device 100 may obtain the information about the web page from the server 200, can support the extended HTML and the extended JS script, and can achieve the following technical effects.

1. In the case of attempting to read the content on the clipboard or attempting to write the content into the clipboard, the preset and stored permission setting information of the clipboard may be read, and the user may be explicitly prompted (for example, in a form of a pop-up window) whether to grant the related permission on the clipboard. The content on the clipboard can be read and/or the content can be written into the clipboard only after the explicit consent of the user is obtained. In this way, the user can control whether the web page can read the content on the clipboard or write the content into the clipboard, to prevent user information leakage caused by arbitrary reading of content on the clipboard by some web pages, or writing content into the clipboard for malicious promotion, and improve a user privacy protection effect. Therefore, a problem that the web page reads the content on the clipboard or writes the content into the clipboard without the user's consent and without the user's control is resolved.

2. In the case of attempting to write the content into the clipboard, a corresponding detection tool (for example, the built-in detection tool or the third-party detection tool) may be used to detect, based on the preset and stored detection tool and prompt setting information of the clipboard, whether the content that attempts to be written into the clipboard includes the illegal, malicious, promotion, or privacy information. If the content includes the illegal, malicious, promotion, or privacy information, the user may be prompted that the web page has abnormal behavior and whether to continue writing the content into the clipboard. If the user chooses to refuse to write the content into the clipboard, the content is not allowed to be written into the clipboard. In this way, after the write permission on the clipboard is obtained, content may be detected to avoid the content including the illegal, malicious, promotion, or privacy information from being written into the clipboard, better protect user privacy, avoid serious consequences, and ensure normal browsing experience of the user.

3. When closing the web page or jumping to another web page/application, the user may determine, based on the preset and stored life cycle policy setting information of the clipboard, whether the content written into the clipboard needs to be automatically cleared. In this way, the user may control whether the content written into the clipboard is automatically cleared. Therefore, the content written into the clipboard can be prevented from being leaked to the another web page/application, and a risk of information leakage can be reduced.

In embodiments of this application, the electronic device may be the electronic device 100. The first web page may be the web page 1 (or the web page 1'). The first setting information may be the permission setting information of the clipboard. The second setting information may be the life cycle policy setting information of the clipboard. The first content may be the content (for example, the content 1 and the content 1') written into the clipboard by the first web page. The first setting interface may be the permission setting interface (for example, the user interface shown in FIG. 6E) of the clipboard. The first operation may be the operation of performing permission setting by the user (for example, the operation of tapping one of the options shown in FIG. 6E). The first window may be the window shown in FIG. 7 or FIG. 12. The first prompt information may be the prompt information displayed in the first window. The second setting interface may be the life cycle policy setting interface (for example, the user interface shown in FIG. 6G) of the clipboard. The second operation may be the operation of performing life cycle policy setting by the user (for example, the operation of tapping one of the options shown in FIG. 6G). The second window may be the window shown in FIG. 9 or FIG. 14. The second prompt information may be the prompt information displayed in the second window. The third window may be the window shown in FIG. 8 or FIG. 13. The third prompt information may be the prompt information displayed in the third window. The server may be the server 200. The first request may be the request 1 (or the request 1'). The first JavaScript script may be the extended JS script. The third setting information may be the detection tool setting information. The fourth setting information may be the prompt setting information. The first detection tool may be the built-in detection tool or the third-party detection tool. The third setting interface may be the interface (for example, the user interface shown in FIG. 6F) in which the user performs the detection tool and prompt setting. The third operation may be the operation of performing detection tool and prompt setting by the user.

The following describes an internal module of an electronic device 100 and an internal module of a server 200 that may be related to a process of performing a privacy protection method according to an embodiment of this application.

Figure 15:
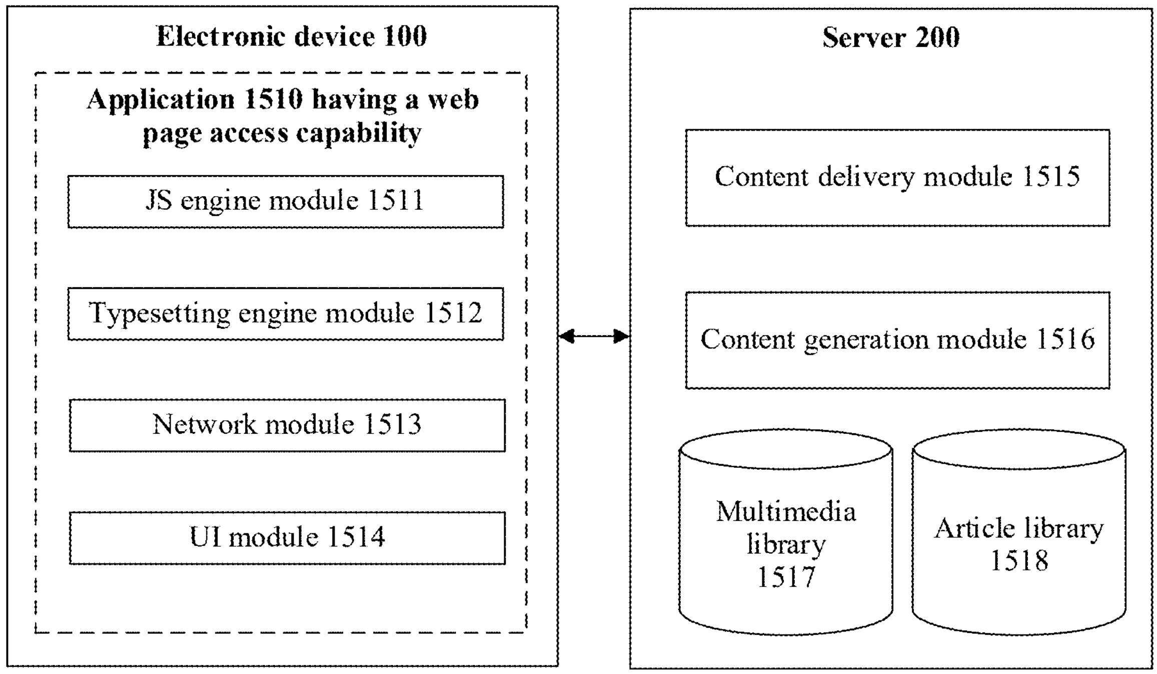
FIG. 15 is a schematic diagram of an internal module of an electronic device 100 and an internal module of a server 200 that may be related to a process of performing a privacy protection method according to an embodiment of this application.

FIG. 15 is an example of an internal module of an electronic device 100 and an internal module of a server 200 that may be related to a process of performing a privacy protection method according to an embodiment of this application.

As shown in FIG. 15, the electronic device 100 may include an application 1510 (for example, a browser application or a browser-like application) having a web page access capability. The application 1510 having the web page access capability may include a JS engine module 1511, a typesetting engine module 1512, a network module 1513, a UI module 1514, and the like. The server 200 may include a content delivery module 1515, a content generation module 1516, a multimedia library 1517, an article library 1518, and the like.

The JS engine module 1511 may be configured to parse and execute a JS script. For example, the JS script is executed to read the content on the clipboard and/or to generate code for some information (for example, promotion information) required by a web page provider. For another example, the JS script is executed to write the content read from the clipboard and/or the generated code of some information (for example, promotion information) required by the web page provider to the clipboard. For another example, the JS script is executed to read clipboard setting information (for example, permission setting information and life cycle policy setting information), set permission and a life cycle policy of the clipboard, and the like.

In some examples, the JS engine module 1511 may be a V8 engine.

The typesetting engine module 1512 may be configured to receive information that is of a web page and that is obtained by the network module 1513, and may be further configured to generate and parse a DOM (Document Object Model, document object model) tree based on the information about the web page, calculate a style and a layout of the web page, and render content on the web page, so that the rendered content on the web page can be finally presented to a user.

In some examples, the typesetting engine module 1512 may be a Blink engine.

The network module 1513 may be configured to send a network request for obtaining information about a web page to the server 200; may be further configured to receive the information about the web page sent by the server 200; and may be further configured to send the information about the web page from the server 200 to the typesetting engine module 1512.

The UI module 1514 may be configured to provide an address bar (which may also be referred to as a search box) for the user to enter a website address corresponding to a web page, so that the network module 1513 may send, based on the website address, a network request for obtaining the information about the web page to the server 200; and may be further configured to display the web page.

The content delivery module 1515 may be configured to obtain information about a web page from the content generation module 1516; and may be further configured to deliver the information about the web page to one or more electronic devices, for example, deliver the information about the web page to the electronic device 100, so that the electronic device 100 can display the web page based on the information about the web page for browsing by the user.

The content generation module 1516 may be configured to generate information about a web page; and may be further configured to embed a JS script in the information about the web page based on a requirement of the web page provider (for example, a web page provider of an advertisement type may require a JS script used to generate promotion information code to be embedded in the information about the web page, so that the JS script can be written into the clipboard of the electronic device 100).

The multimedia library 1517 may be configured to store a multimedia resource in a web page, for example, an image resource (for example, a picture or an icon), a sound resource, and a video resource.

The article library 1518 may be configured to store a text resource (for example, Chinese, English, a number, and a symbol) in a web page.

The foregoing modules may be divided according to functions. In an actual product, the foregoing modules may perform different functions of a same software module.

For more details about functions of internal modules of the electronic device 100 and the server 200, refer to related content in the foregoing embodiments. Details are not described herein again.

It may be understood that the structure shown in FIG. 15 does not constitute a specific limitation on the electronic device 100 and the server 200. In some other embodiments of this application, the electronic device 100 and the server 200 may have more or fewer components than those shown in FIG. 15, or may combine two or more components, or may have different component configurations. Components shown in the figure may be implemented by hardware that includes one or more signal processing and/or application-specific inter-integrated circuits, software, or a combination of hardware and software.

The following describes a schematic diagram of a structure of an electronic device 100 according to an embodiment of this application.

Figure 16:
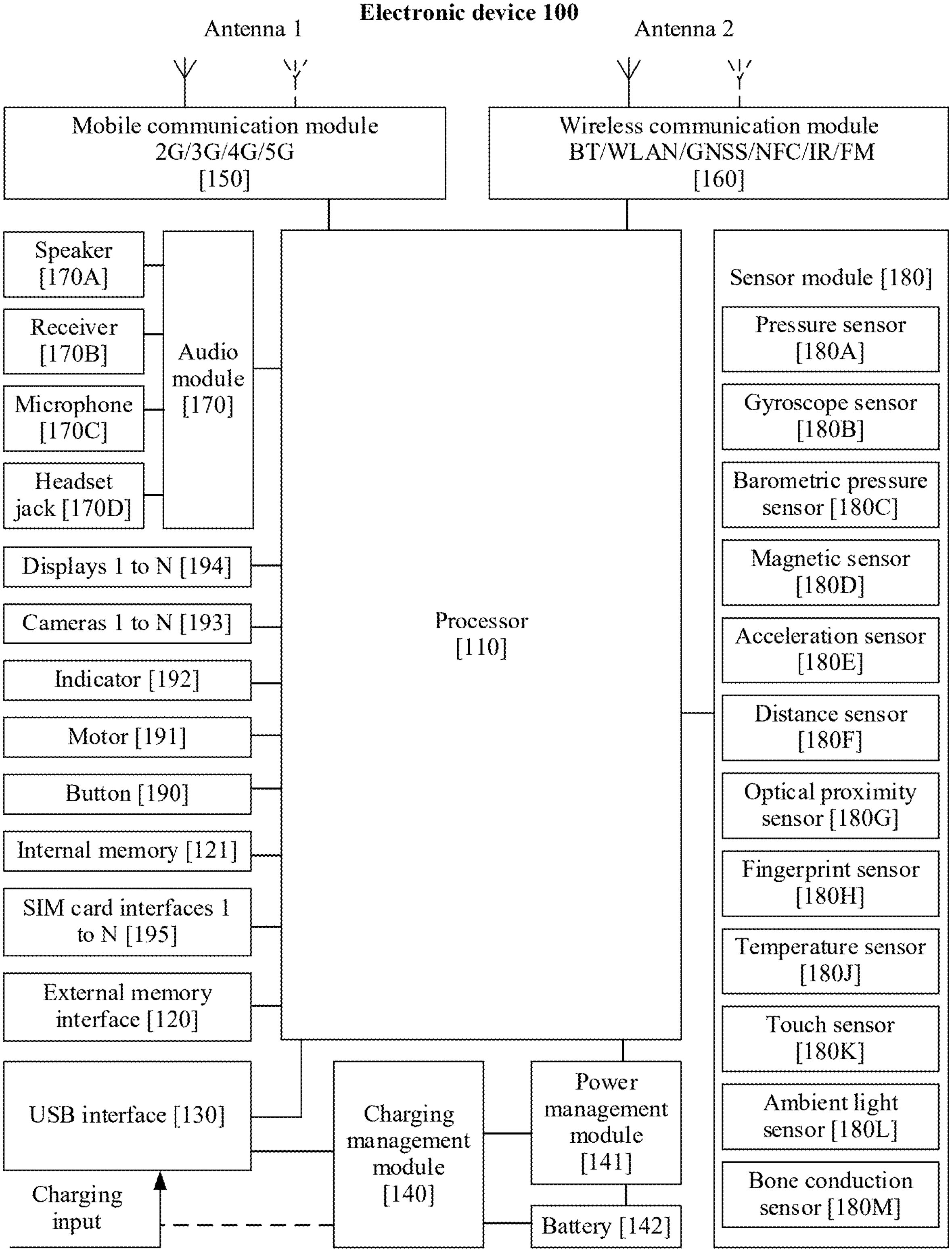
FIG. 16 is a schematic diagram of a structure of an electronic device 100 according to an embodiment of this application.

FIG. 16 is an example of a structure of an electronic device 100 according to an embodiment of this application.

As shown in FIG. 16, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, or the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-inter-integrated circuit sound (inter-inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another terminal device, for example, an AR device.

It may be understood that an interface connection relationship between the modules illustrated in embodiments of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 may further supply power to the electronic device 100 through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another function module.

The wireless communication module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation systems, SBAS).

The electronic device 100 may implement a display function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, and the one or more GPUs execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diodes, QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise and brightness of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through a lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. In this way, the electronic device 100 may play back or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external memory card, for example, a micro SD card, to extend a storage capability of the electronic device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through a mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 170D is configured to connect to a wired headset. The headset jack 170D may be the USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change of the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a moving posture of the electronic device 100. In some embodiments, angular velocities of the electronic device 100 around three axes (namely, axes x, y, and z) may be determined through the gyroscope sensor 180B. The gyroscope sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyroscope sensor 180B may also be used in a navigation scenario or a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations of the electronic device 100 in various directions (usually on three axes). A magnitude and a direction of gravity may be detected when the electronic device 100 is still. The acceleration sensor 180E may be further configured to identify a posture of the electronic device 100, and is applied to applications such as a pedometer and switching between a landscape mode and a portrait mode.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in a headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 is also compatible with different types of SIM cards. The SIM card interface 195 is also compatible with an external memory card. The electronic device 100 interacts with a network by using the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

It should be understood that the electronic device 100 shown in FIG. 16 is merely an example, and the electronic device 100 may have more or fewer components than those shown in FIG. 16, or may combine two or more components, or may have different component configurations. Various components shown in FIG. 16 may be implemented in hardware including one or more signal processing and/or application-specific integrated circuits, software, or a combination of hardware and software.

The following describes a structure of a server 200 according to an embodiment of this application.

Figure 17:
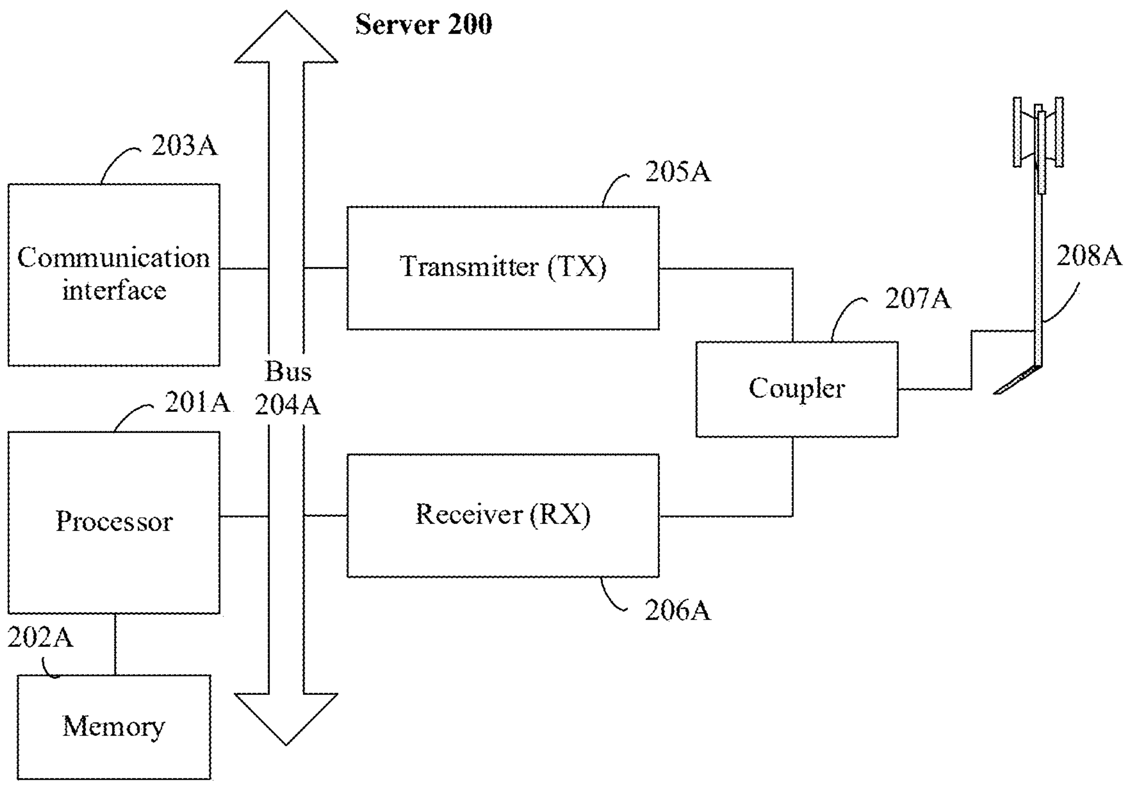
FIG. 17 is a schematic diagram of a structure of a server 200 according to an embodiment of this application.

FIG. 17 is an example of a structure of a server 200 according to an embodiment of this application.

As shown in FIG. 17, the server 200 may include one or more processors 201A, a memory 202A, a communication interface 203A, a transmitter 205A, a receiver 206A, a coupler 207A, and an antenna 208A. These components may be connected through a bus 204A or in another manner. In FIG. 17, an example in which the components are connected through the bus is used. Specifically,

- the communication interface 203A may be used by the server 200 to communicate with another communication device, for example, the electronic device 100. Specifically, the communication interface 203A may be a 3G communication interface, a 4G communication interface, a 5G communication interface, or may be a future new radio communication interface, or the like. Not limited to a wireless communication interface, the server 200 may be further provided with a wired communication interface 203A, for example, a local access network (local access network, LAN) interface. The transmitter 205A may be configured to perform transmission processing on a signal output by the processor 201A. The receiver 206A may be configured to perform reception processing on a mobile communication signal received by the antenna 208A.

In some examples of this application, the transmitter 205A and the receiver 206A may be considered as a wireless modem. In the server 200, there may be one or more transmitters 205A and receivers 206A. The antenna 208A may be configured to convert electromagnetic energy in a transmission line into an electromagnetic wave in free space, or convert an electromagnetic wave in the free space into electromagnetic energy in the transmission line. The coupler 207A is configured to split a mobile communication signal received by the antenna 208A into a plurality of subsignals, and allocate the plurality of subsignals to a plurality of receivers 206A.

The memory 202A is coupled to the processor 201A, and is configured to store various software programs and/or a plurality of sets of instructions. Specifically, the memory 202A may include a high-speed random access memory, or a non-volatile memory, for example, one or more disk storage devices, a flash memory device, or another non-volatile solid-state storage device. The memory 202A may further store a network communication program, and the network communication program may be configured to communicate with one or more adjuncts, one or more terminal devices, and one or more network devices.

In some embodiments of this application, the memory 202A may be configured to store a program for implementing the privacy protection method according to one or more embodiments of this application on the server 200 side. For implementation of the privacy protection method according to one or more embodiments of this application, refer to the foregoing embodiments.

The processor 201A may be configured to read and execute computer-readable instructions. Specifically, the processor 201A may be configured to invoke a program stored in the memory 202A, for example, the program for implementing the privacy protection method according to one or more embodiments of this application on the server 200 side, and execute instructions included in the program.

It should be noted that the server 200 shown in FIG. 17 is merely an implementation of embodiments of this application. In actual application, the server 200 may further include more or fewer components. This is not limited herein.

For more details about functions and working principles of the server 200, refer to related content in the foregoing embodiments. Details are not described herein again.

All or some of the foregoing embodiments may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

A person of ordinary skill in the art may understand that all or some of the procedures of the methods in embodiments may be implemented by a computer program instructing related hardware. The program may be stored in a computer-readable storage medium. When the program is run, the procedures of the methods in embodiments are performed. The foregoing storage medium includes any medium that can store program code, such as a ROM, a random access memory RAM, a magnetic disk, or an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method, applied to an electronic device, wherein the method comprises:

detecting, by the electronic device, an operation of accessing a first web page by a user;

obtaining, by the electronic device, first setting information for the first web page;

displaying, by the electronic device, the first web page, wherein the first setting information indicates that the first web page is granted at least one of read permission on a clipboard or write permission on the clipboard;

processing, by the electronic device, content on the clipboard based on the first setting information; and after the processing, by the electronic device, the content on the clipboard based on the first setting information:

obtaining, by the electronic device, second setting information for the first web page, wherein the second setting information indicates whether the electronic device clears the content on the clipboard after detecting a second operation of closing the first web page by the user, and when the electronic device detects the second operation of closing the first web page by the user, processing, by the electronic device, the content on the clipboard based on the second setting information.

2. The method according to claim 1, wherein the processing, by the electronic device, the content on the clipboard based on the first setting information comprises:

based on that the first setting information indicates that the first web page is granted the read permission on the clipboard, allowing, by the electronic device, the first web page to read the content on the clipboard; or based on that the first setting information indicates that the first web page is granted the write permission on the clipboard, allowing, by the electronic device, the first web page to write first content into the clipboard.

3. The method according to claim 2, wherein the processing, by the electronic device, the content on the clipboard based on the second setting information comprises:

based on that the second setting information indicates the electronic device to clear the content on the clipboard after the second operation of closing the first web page by the user is detected, cancelling, by the electronic device, the displaying the first web page, and clearing, by the electronic device, the content on the clipboard when detecting the second operation of closing the first web page by the user; or based on that the second setting information indicates the electronic device to clear the first content written into the clipboard by the first web page after the second operation of closing the first web page by the user is detected, cancelling, by the electronic device, displaying the first web page, and clearing the first content when detecting the second operation of closing the first web page by the user.

4. The method according to claim 2, wherein the obtaining, by the electronic device, the second setting information for the first web page comprises:

when the electronic device detects the second operation of closing the first web page by the user, displaying, by the electronic device, a second window, wherein the second window comprises second prompt information, and the second prompt information prompts the user whether to agree to clear the content on the clipboard or the first content after the electronic device detects the second operation of closing the first web page by the user; and based on that the electronic device determines that the user agrees to clear the content on the clipboard or the first content after the electronic device detects the second operation of closing the first web page by the user, storing, by the electronic device, the second setting information.

5. The method according to claim 2, wherein the first setting information indicates that the first web page is granted the write permission on the clipboard, and wherein the allowing, by the electronic device, the first web page to write the first content into the clipboard comprises:

detecting, by the electronic device, whether the first content comprises information of a first type, wherein the first type comprises one or more of: malicious content, illegal content, privacy content, or promotion content; and based on that the first content does not comprise the information of the first type, allowing, by the electronic device, the first web page to write the first content into the clipboard; or based on that the first content comprises the information of the first type, displaying, by the electronic device, a third window, wherein the third window comprises third prompt information, the third prompt information prompts the user whether to allow the first web page to write the first content into the clipboard; and based on that the electronic device determines that the user allows the first web page to write the first content into the clipboard, allowing, by the electronic device, the first web page to write the first content into the clipboard.

6. The method according to claim 1, wherein the first web page is any web page or a specific web page.

7. The method according to claim 1, wherein the obtaining, by the electronic device, the first setting information for the first web page comprises:

displaying, by the electronic device, a first setting interface, wherein the first setting interface is used by the user to set whether to grant the at least one of the read permission or the write permission on the clipboard to the first web page;

detecting, by the electronic device, a first operation performed by the user on the first setting interface; and storing, by the electronic device, the first setting information.

8. The method according to claim 1, wherein the obtaining, by the electronic device, the first setting information for the first web page comprises:

when the first web page accesses the clipboard, displaying, by the electronic device, a first window, wherein the first window comprises first prompt information, and the first prompt information prompts the user whether to agree to grant the write permission on the clipboard to the first web page; and based on that the electronic device determines that the user agrees to grant the write permission on the clipboard to the first web page, storing, by the electronic device, the first setting information, wherein the first setting information indicates that the first web page is granted the write permission on the clipboard.

9. The method according to claim 1, wherein the obtaining, by the electronic device, the second setting information for the first web page comprises:

displaying, by the electronic device, a second setting interface, wherein the second setting interface is used by the user to set whether to clear the content on the clipboard after the first web page is closed;

detecting, by the electronic device, a third operation performed by the user on the second setting interface; and storing, by the electronic device, the second setting information.

10. The method according to claim 1, wherein before the displaying, by the electronic device, the first web page, the method further comprises:

sending, by the electronic device to a server, a first request, wherein the first request indicates the server to send information about the first web page to the electronic device; and receiving, by the electronic device from the server, the information about the first web page, wherein the information about the first web page comprises a first JavaScript script, wherein:

the first JavaScript script comprises an application programming interface (API), and the API is used by the electronic device to read the first setting information or the second setting information.

11. The method according to claim 1, wherein the first web page is in a browser application, or the first web page is displayed by a browser-like application.

12. The method according to claim 1, the obtaining the first setting information comprises displaying a first setting interface for the first setting information, the obtaining the second setting information comprises displaying a second setting interface for the second setting information, wherein the first setting interface and the second setting interface are displayed at different times.

13. The method according to claim 12, wherein the first setting information comprises a global setting that applies to any web page accessed by the electronic device, and wherein the displaying the first setting interface and the displaying the second setting interface are before the displaying the first web page.

14. An electronic device, wherein the electronic device comprises:

one or more processors; and one or more memories, the one or more memories are coupled to the one or more processors, the one or more memories are configured to store computer program code, the computer program code comprises computer instructions, and when the one or more processors execute the computer instructions, the electronic device is enabled to perform operations including:

detecting an operation of accessing a first web page by a user;

obtaining first setting information for the first web page;

displaying the first web page, wherein the first setting information indicates that the first web page is granted at least one of read permission on a clipboard or write permission on the clipboard;

processing content on the clipboard based on the first setting information; and after the processing the content on the clipboard based on the first setting information:

obtaining second setting information for the first web page, wherein the second setting information indicates whether the electronic device clears the content on the clipboard after detecting a second operation of closing the first web page by the user, and when the electronic device detects the second operation of closing the first web page by the user, processing the content on the clipboard based on the second setting information.

15. The electronic device according to claim 14, wherein the processing the content on the clipboard based on the first setting information comprises:

based on that the first setting information indicates that the first web page is granted the read permission on the clipboard, allowing the first web page to read the content on the clipboard; or based on that the first setting information indicates that the first web page is granted the write permission on the clipboard, allowing the first web page to write first content into the clipboard.

16. The electronic device according to claim 15, wherein the processing the content on the clipboard based on the second setting information comprises:

based on that the second setting information indicates the electronic device to clear the content on the clipboard after the second operation of closing the first web page by the user is detected, cancelling the displaying the first web page, and clearing the content on the clipboard when detecting the second operation of closing the first web page by the user; or based on that the second setting information indicates the electronic device to clear the first content written into the clipboard by the first web page after the second operation of closing the first web page by the user is detected, cancelling the displaying the first web page, and clearing the first content when detecting the second operation of closing the first web page by the user.

17. The electronic device according to claim 14, wherein the obtaining the first setting information for the first web page comprises:

displaying a first setting interface, wherein the first setting interface is used by the user to set whether to grant the at least one of the read permission or the write permission on the clipboard to the first web page;

detecting a first operation performed by the user on the first setting interface; and storing the first setting information.

18. The electronic device according to claim 14, wherein the obtaining the first setting information for the first web page comprises:

when the first web page accesses the clipboard, displaying a first window, wherein the first window comprises first prompt information, and the first prompt information prompts the user whether to agree to grant the write permission on the clipboard to the first web page; and based on that the electronic device determines that the user agrees to grant the write permission on the clipboard to the first web page, storing the first setting information, wherein the first setting information indicates that the first web page is granted the write permission on the clipboard.

19. The electronic device according to claim 14, wherein the obtaining the second setting information for the first web page specifically comprises:

displaying a second setting interface, wherein the second setting interface is used by the user to set whether to clear the content on the clipboard after the first web page is closed;

detecting a third operation performed by the user on the second setting interface; and storing the second setting information.

20. A non-transitory computer storage medium, wherein the non-transitory computer storage medium stores a computer program, the computer program comprises program instructions, and when the program instructions are run on an electronic device, the electronic device is enabled to perform operations including:

detecting an operation of accessing a first web page by a user;

obtaining first setting information for the first web page;

displaying the first web page, wherein the first setting information indicates that the first web page is granted at least one of read permission on a clipboard or write permission on the clipboard;

processing content on the clipboard based on the first setting information; and after the processing the content on the clipboard based on the first setting information:

obtaining second setting information for the first web page, wherein the second setting information indicates whether the electronic device clears the content on the clipboard after detecting a second operation of closing the first web page by the user, and when the electronic device detects the second operation of closing the first web page by the user, processing the content on the clipboard based on the second setting information.

* * * * *